US011388150B2

(12) United States Patent
Winig et al.

(10) Patent No.: US 11,388,150 B2
(45) Date of Patent: Jul. 12, 2022

(54) VIRTUAL TRANSPONDER UTILIZING A HOSTED ANTENNA FOR INBAND COMMANDING

(71) Applicant: The Boeing Company, Chicago, IL (US)

(72) Inventors: Robert J. Winig, Chicago, IL (US); Kristina Miller, Chicago, IL (US); Eric Anden, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/530,887

(22) Filed: Aug. 2, 2019

(65) Prior Publication Data

US 2019/0356639 A1 Nov. 21, 2019

Related U.S. Application Data

(63) Continuation of application No. 15/451,267, filed on Mar. 6, 2017, now Pat. No. 10,419,403.

(51) Int. Cl.
*H04L 29/06* (2006.01)
*H04L 9/40* (2022.01)
(Continued)

(52) U.S. Cl.
CPC ..... *H04L 63/0428* (2013.01); *H04B 7/18515* (2013.01); *H04L 9/14* (2013.01); *H04B 7/18565* (2013.01); *H04L 2209/80* (2013.01)

(58) Field of Classification Search
CPC ... H04L 63/0428; H04L 9/14; H04L 2209/80; H04L 5/0053; H04L 63/0464;
(Continued)

(56) References Cited

U.S. PATENT DOCUMENTS 5,701,603 A    12/1997   Norimatsu
5,963,650 A    10/1999   Simionescu et al.
(Continued)

FOREIGN PATENT DOCUMENTS

CN        1512711 A    7/2004
CN    101305530 A   11/2008
(Continued)

OTHER PUBLICATIONS

Pang et al., "CHIRP Program Lessons Learned From the Contractor Program Management Team Perspective", 2012 IEEE Aerospace Conference, Mar. 3, 2012, pp. 1-7, XP032230091, DOI: 10.1109/AERO.2012.6187278, ISBN: 978-1-4577-0556-4, IEEE.
(Continued)

*Primary Examiner* — Matthew Smithers
(74) *Attorney, Agent, or Firm* — Haynes and Boone, LLP

(57) ABSTRACT

Systems, methods, and apparatus for a virtual transponder utilizing inband commanding are disclosed. A disclosed method comprises transmitting, by a hosted payload (HoP) operation center (HOC), encrypted hosted commands to a hosted receiving antenna. The method further comprises transmitting, by the hosted receiving antenna, the encrypted hosted commands to a payload antenna on a vehicle. Also, the method comprises transmitting, by a host spacecraft operations center (SOC), encrypted host commands to the vehicle. Additionally, the method comprises reconfiguring a payload on the vehicle according to unencrypted host commands and/or unencrypted hosted commands. In addition, the method comprises transmitting, by the payload antenna, payload data to a host receiving antenna and/or hosted receiving antenna. Also, the method comprises transmitting encrypted host telemetry to the host SOC, and transmitting encrypted hosted telemetry to the host SOC. Further, the
(Continued)

method comprises transmitting, by the host SOC, the encrypted hosted telemetry to the HOC.

20 Claims, 63 Drawing Sheets

(51) Int. Cl.
*H04L 9/14* (2006.01)
*H04B 7/185* (2006.01)

(58) Field of Classification Search
CPC . H04L 63/0471; H04L 63/18; H04B 7/18515; H04B 7/18502; H04B 7/18513; H04B 7/18519; H04B 7/18565; H04W 12/001
See application file for complete search history.

(56) References Cited

U.S. PATENT DOCUMENTS

| | | | |
|---|---|---|---|
| 6,125,261 A | 9/2000 | Anselmo et al. | |
| 6,684,182 B1 | 1/2004 | Gold et al. | |
| 7,542,716 B2 | 6/2009 | Bell et al. | |
| 8,200,149 B1 | 6/2012 | Chen | |
| 8,521,427 B1 | 8/2013 | Luyks | |
| 8,614,945 B2 | 12/2013 | Brunnenmeyer | |
| 8,873,456 B2 | 10/2014 | Krikorian et al. | |
| 9,042,295 B1 | 5/2015 | Balter et al. | |
| 9,337,918 B2 | 5/2016 | Bell et al. | |
| 9,876,563 B1 | 1/2018 | Coleman et al. | |
| 10,411,985 B1 | 9/2019 | Miller et al. | |
| 10,419,403 B2* | 9/2019 | Winig | H04B 7/18515 |
| 10,516,992 B2* | 12/2019 | Winig | H04L 63/0428 |
| 10,530,751 B2* | 1/2020 | Winig | H04B 1/006 |
| 10,673,825 B2* | 6/2020 | Chen | H04B 7/18513 |
| 10,728,221 B2* | 7/2020 | Chen | H04L 63/0428 |
| 2002/0104920 A1 | 8/2002 | Thompson et al. | |
| 2003/0017827 A1 | 1/2003 | Ciaburro et al. | |
| 2004/0072561 A1 | 4/2004 | LaPrade | |
| 2007/0133528 A1 | 6/2007 | Jin et al. | |
| 2007/0139143 A1 | 6/2007 | Rumer | |
| 2007/0140449 A1 | 6/2007 | Whitfield et al. | |
| 2008/0055151 A1 | 3/2008 | Hudson et al. | |
| 2008/0149776 A1 | 6/2008 | Benedict | |
| 2008/0153414 A1 | 6/2008 | Ho et al. | |
| 2009/0052369 A1 | 2/2009 | Atkinson et al. | |
| 2012/0259485 A1 | 10/2012 | Boileau et al. | |
| 2013/0046422 A1 | 2/2013 | Cabos | |
| 2013/0046819 A1 | 2/2013 | Bocirnea | |
| 2013/0077788 A1 | 3/2013 | Blanchard et al. | |
| 2013/0137365 A1 | 5/2013 | Taylor | |
| 2014/0099986 A1 | 4/2014 | Kikuchi et al. | |
| 2014/0119385 A1 | 5/2014 | Hoffmeyer et al. | |
| 2014/0303813 A1 | 10/2014 | Ihns | |
| 2015/0162955 A1 | 6/2015 | Burch | |
| 2015/0203213 A1 | 7/2015 | Levien et al. | |
| 2015/0284109 A1 | 10/2015 | Newton et al. | |
| 2015/0381263 A1 | 12/2015 | Lejnell et al. | |
| 2016/0087713 A1 | 3/2016 | Oderman et al. | |
| 2017/0012697 A1 | 1/2017 | Gong et al. | |
| 2017/0041065 A1 | 2/2017 | Goettle, Jr. et al. | |
| 2017/0134103 A1 | 5/2017 | Tessandori et al. | |
| 2018/0198516 A1 | 7/2018 | Garcia et al. | |
| 2018/0234496 A1 | 8/2018 | Ratias | |
| 2018/0254822 A1 | 9/2018 | Miller et al. | |
| 2018/0254823 A1 | 9/2018 | Miller et al. | |
| 2018/0254866 A1 | 9/2018 | Chen et al. | |
| 2018/0255024 A1 | 9/2018 | Chen et al. | |
| 2018/0255025 A1 | 9/2018 | Chen et al. | |
| 2018/0255026 A1 | 9/2018 | Winig et al. | |
| 2018/0255027 A1 | 9/2018 | Winig et al. | |
| 2018/0255455 A1 | 9/2018 | Winig et al. | |
| 2018/0316417 A1 | 11/2018 | Motoyoshi | |
| 2019/0052351 A1 | 2/2019 | Fujimura | |
| 2019/0082319 A1 | 3/2019 | Chen et al. | |

FOREIGN PATENT DOCUMENTS

| | | |
|---|---|---|
| CN | 103001952 A | 3/2013 |
| CN | 103368638 A | 10/2013 |
| CN | 103747023 A | 4/2014 |
| CN | 104702332 A | 6/2015 |
| CN | 105894773 A | 8/2016 |
| EP | 1085680 | 3/2001 |
| EP | 1936833 | 6/2008 |
| EP | 1950893 A1 | 7/2008 |
| EP | 2573956 | 3/2013 |
| EP | 2881331 | 6/2015 |
| EP | 3373476 B1 | 9/2018 |
| JP | 2000166046 | 6/2000 |
| RU | 2600564 C2 | 10/2016 |
| WO | WO 1996/032568 | 10/1996 |
| WO | WO 1999/040693 | 8/1999 |
| WO | WO 2013/130812 | 9/2013 |

OTHER PUBLICATIONS

Halimi et al., "Applicability of Asymmetric Cryptography for Space Data Links Security Systems", 2016 IEEE Aerospace Conference, Mar. 5, 2016, pp. 1-13, IEEE.
Office Action dated Mar. 3, 2021 from counterpart Russian application No. 2018103722/07(005373), 14 pages, original and English translation.
First Office Action dated Apr. 16, 2021 from related Chinese Patent Application No. 2018101911753, original and translation, 20 pages.
First Office Action dated Apr. 19, 2021, from related Chinese Application No. 2018101788763, original and translation, 12 pages.
First Office Action dated Apr. 30, 2021, from related Chinese Application No. 2018101788091, original and translation, 22 pages.
Examination Search Report dated May 12, 2021, from related Canadian Application No. 2,993,412, 3 pages.

* cited by examiner

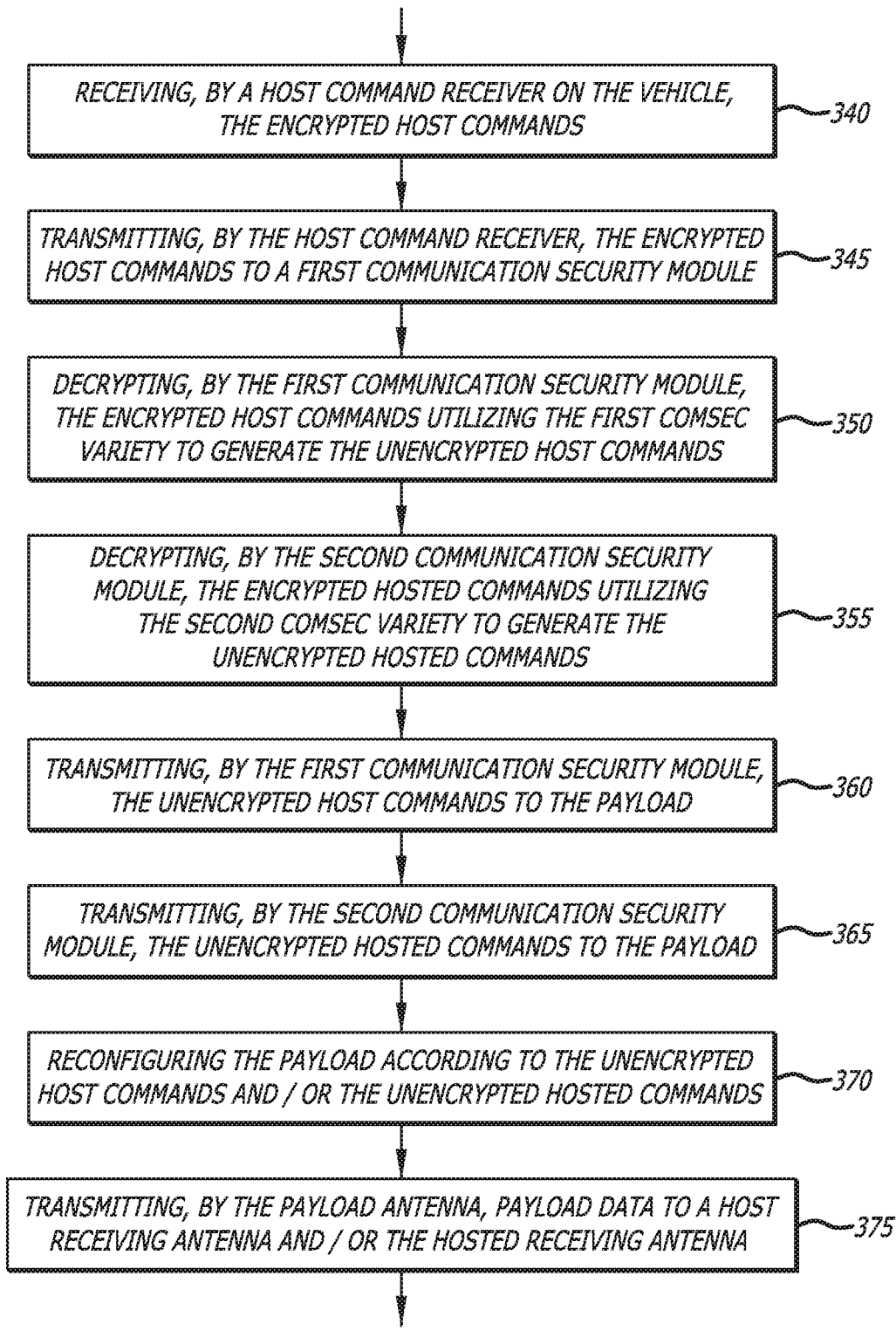

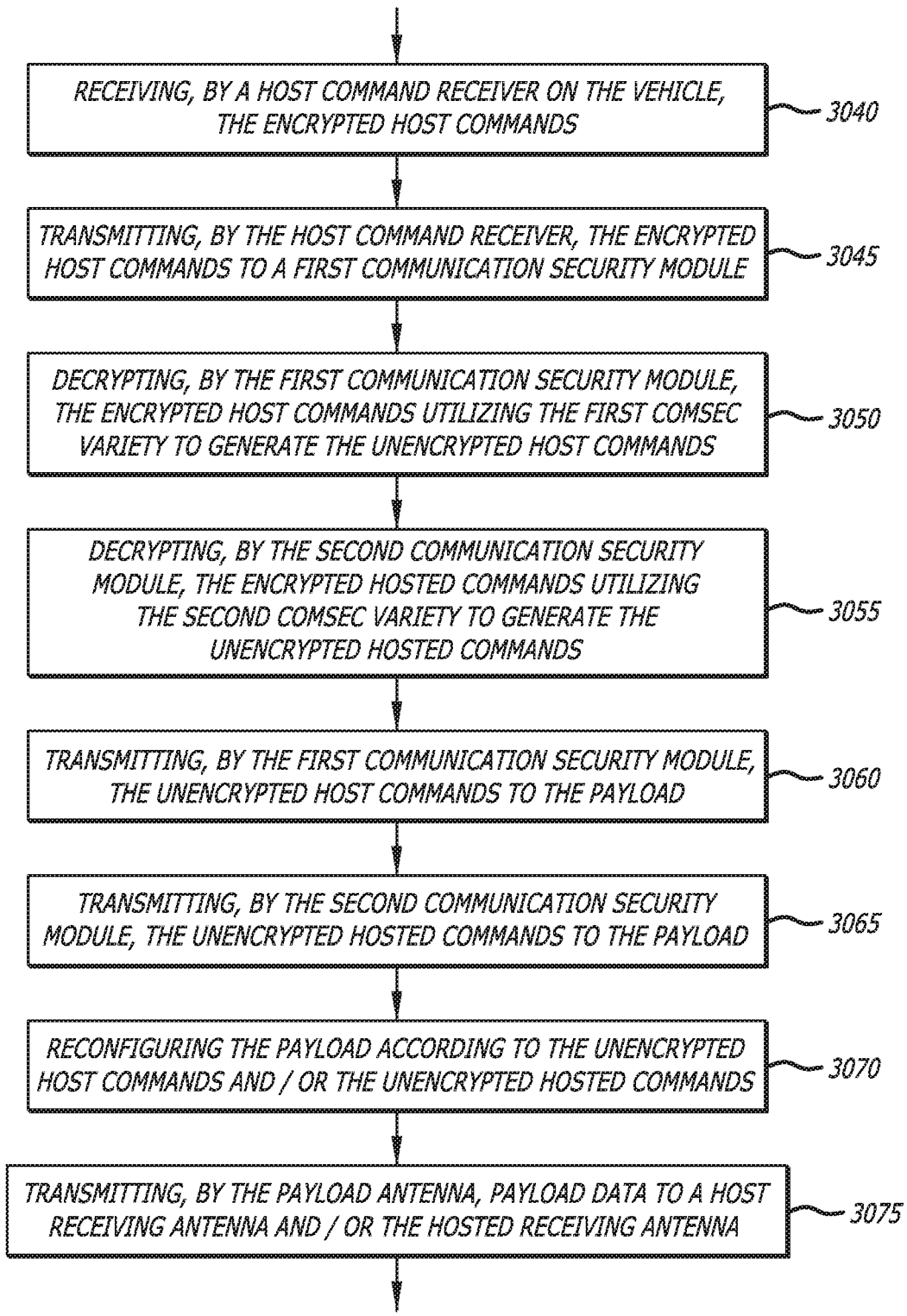

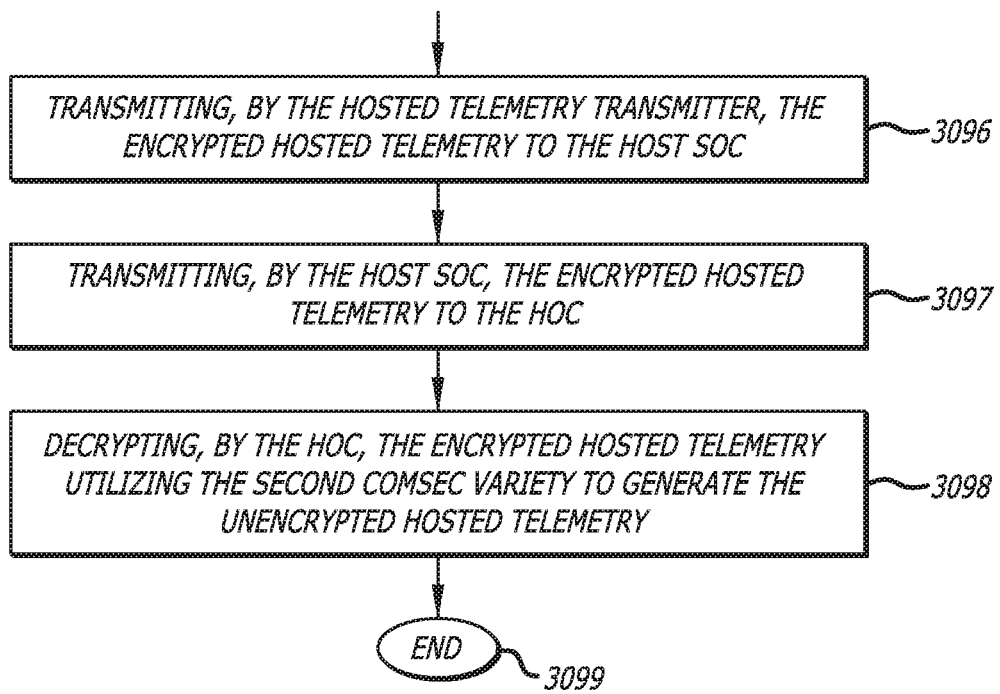

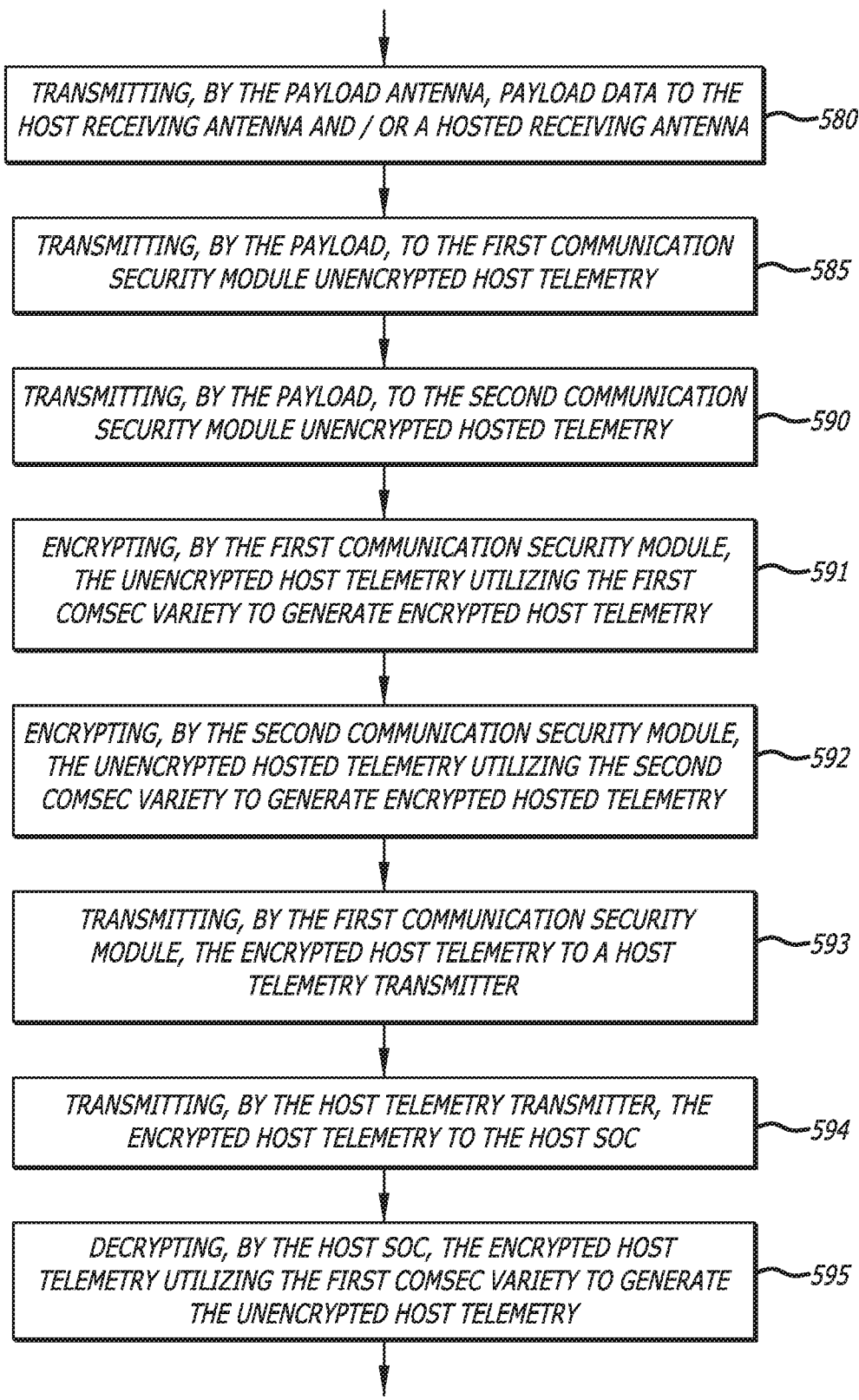

VIRTUAL TRANSPONDER UTILIZING A HOSTED ANTENNA FOR INBAND COMMANDING

CROSS-REFERENCE TO RELATED APPLICATION

This application is a Continuation application of, and claims priority to and the benefit of, U.S. patent application Ser. No. 15/451,267, filed Mar. 6, 2017, the entire disclosure of which is expressly incorporated by reference herein.

FIELD

The present disclosure relates to virtual transponders. In particular, it relates to virtual transponders utilizing inband commanding.

BACKGROUND

Currently, typical transponders on a vehicle (e.g., a satellite) have the ability to perform switching of inputs to outputs of the payload. All of this switching on the payload is commanded and controlled by a single satellite controller with no resource allocation privacy. For example, in a digital transponder, when a user request for a channel with specific bandwidth and antenna characteristics is made, the channel is then set up, used, and then disconnected.

As such, there is a need for an improved transponder design that allows for privacy in the allocation of resources on the payload.

SUMMARY

The present disclosure relates to a method, system, and apparatus for virtual transponders utilizing inband commanding. In one or more embodiments, a method for a virtual transponder utilizing inband commanding comprises transmitting, by a hosted payload (HoP) operation center (HOC), encrypted hosted commands to a hosted receiving antenna, where the encrypted hosted commands are encrypted utilizing a second communication security (COMSEC) variety. The method further comprises transmitting, by the hosted receiving antenna, the encrypted hosted commands to a payload antenna on a vehicle. Also, the method comprises transmitting, by a host spacecraft operations center (SOC), encrypted host commands to the vehicle, where the encrypted host commands are encrypted utilizing a first COMSEC variety. In addition, the method comprises decrypting, by a first communication security module, the encrypted host commands utilizing the first COMSEC variety to generate unencrypted host commands. Additionally, the method comprises decrypting, by a second communication security module, the encrypted hosted commands utilizing the second COMSEC variety to generate unencrypted hosted commands. Also, the method comprises reconfiguring a payload on the vehicle according to the unencrypted host commands and/or the unencrypted hosted commands. Additionally, the method comprises transmitting, by the payload antenna, payload data to a host receiving antenna and/or the hosted receiving antenna. Also, the method comprises encrypting, by the first communication security module, unencrypted host telemetry utilizing the first COMSEC variety to generate encrypted host telemetry. Additionally, the method comprises encrypting, by the second communication security module, unencrypted hosted telemetry utilizing the second COMSEC variety to generate encrypted hosted telemetry. In addition, the method comprises transmitting, by a host telemetry transmitter, the encrypted host telemetry to the host SOC. Also, the method comprises transmitting, by a hosted telemetry transmitter, the encrypted hosted telemetry to the host SOC. Further, the method comprises transmitting, by the host SOC, the encrypted hosted telemetry to the HOC.

In one or more embodiments, the reconfiguring of the payload according to the unencrypted host commands and/or the unencrypted hosted commands comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, and/or beam steering.

In at least one embodiment, the reconfiguring of the payload according to the unencrypted host commands and/or the unencrypted hosted commands comprises reconfiguring at least one of: at least one antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In one or more embodiments, the vehicle is an airborne vehicle. In some embodiments, the airborne vehicle is a satellite, aircraft, unmanned aerial vehicle (UAV), or space plane.

In at least one embodiment, a method for a virtual transponder utilizing inband commanding comprises transmitting, by a hosted payload (HoP) operation center (HOC), encrypted hosted commands to a host spacecraft operations center (SOC), where the encrypted hosted commands are encrypted utilizing a second communication security (COMSEC) variety. The method further comprises transmitting, by the host SOC, the encrypted hosted commands to a vehicle. Also, the method comprises transmitting, by the host SOC, encrypted host commands to a host receiving antenna, where the encrypted host commands are encrypted utilizing a first COMSEC variety. In addition, the method comprises transmitting, by the host receiving antenna, the encrypted host commands to a payload antenna on the vehicle. Additionally, the method comprises decrypting, by a first communication security module, the encrypted host commands utilizing the first COMSEC variety to generate unencrypted host commands. Also, the method comprises decrypting, by a second communication security module, the encrypted hosted commands utilizing the second COMSEC variety to generate unencrypted hosted commands. In addition, the method comprises reconfiguring a payload on the vehicle according to the unencrypted host commands and/or the unencrypted hosted commands. Additionally, the method comprises transmitting, by the payload antenna, payload data to the host receiving antenna and/or a hosted receiving antenna. Also, the method comprises encrypting, by the first communication security module, unencrypted host telemetry utilizing the first COMSEC variety to generate encrypted host telemetry. In addition, the method comprises encrypting, by the second communication security module, unencrypted hosted telemetry utilizing the second COMSEC variety to generate encrypted hosted telemetry. Additionally, the method comprises transmitting, by a host telemetry transmitter, the encrypted host telemetry to the host SOC.

Also, the method comprises transmitting, by a hosted telemetry transmitter, the encrypted hosted telemetry to the host SOC. Further, the method comprises transmitting, by the host SOC, the encrypted hosted telemetry to the HOC.

In one or more embodiments, a method for a virtual transponder utilizing inband commanding comprises transmitting, by a hosted payload (HoP) operation center (HOC), encrypted hosted commands to a hosted receiving antenna, where the encrypted hosted commands are encrypted utilizing a second communication security (COMSEC) variety. The method further comprises transmitting, by the hosted receiving antenna, the encrypted hosted commands to a payload antenna on a vehicle. Also, the method comprises transmitting, by a host spacecraft operations center (SOC), encrypted host commands to a host receiving antenna, where the encrypted host commands are encrypted utilizing a first COMSEC variety. In addition, the method comprises transmitting, by the host receiving antenna, the encrypted host commands to a payload antenna on the vehicle. Additionally, the method comprises decrypting, by a first communication security module, the encrypted host commands utilizing the first COMSEC variety to generate unencrypted host commands. Also, the method comprises decrypting, by a second communication security module, the encrypted hosted commands utilizing the second COMSEC variety to generate unencrypted hosted commands. In addition, the method comprises reconfiguring a payload on the vehicle according to the unencrypted host commands and/or the unencrypted hosted commands. Also, the method comprises transmitting, by the payload antenna, payload data to the host receiving antenna and/or the hosted receiving antenna. In addition, the method comprises encrypting, by the first communication security module, unencrypted host telemetry utilizing the first COMSEC variety to generate encrypted host telemetry. Additionally, the method comprises encrypting, by the second communication security module, unencrypted hosted telemetry utilizing the second COMSEC variety to generate encrypted hosted telemetry. Also, the method comprises transmitting, by a host telemetry transmitter, the encrypted host telemetry to the host SOC. In addition, the method comprises transmitting, by a hosted telemetry transmitter, the encrypted hosted telemetry to the host SOC. Further, the method comprises transmitting, by the host SOC, the encrypted hosted telemetry to the HOC.

In at least one embodiment, a method for a virtual transponder utilizing inband commanding comprises transmitting, by a hosted payload (HoP) operation center (HOC), encrypted hosted commands to a hosted receiving antenna, where the encrypted hosted commands are encrypted utilizing a second communication security (COMSEC) variety. The method further comprises transmitting, by the hosted receiving antenna, the encrypted hosted commands to a payload antenna on a vehicle. Also, the method comprises transmitting, by a host spacecraft operations center (SOC), encrypted host commands to a host receiving antenna, where the encrypted host commands are encrypted utilizing a first COMSEC variety. In addition, the method comprises transmitting, by the host receiving antenna, the encrypted host commands to the payload antenna on the vehicle. Additionally, the method comprises decrypting, by a first communication security module, the encrypted host commands utilizing the first COMSEC variety to generate unencrypted host commands. Also, the method comprises decrypting, by a second communication security module, the encrypted hosted commands utilizing the second COMSEC variety to generate unencrypted hosted commands. In addition, the method comprises reconfiguring a payload on the vehicle according to the unencrypted host commands and/or the unencrypted hosted commands. Additionally, the method comprises transmitting, by the payload antenna, payload data to the host receiving antenna and/or the hosted receiving antenna. Also, the method comprises encrypting, by the first communication security module, unencrypted telemetry utilizing the first COMSEC variety to generate encrypted telemetry. In addition, the method comprises transmitting, by a telemetry transmitter, the encrypted telemetry to the host SOC. Further, the method comprises transmitting, by the host SOC, the encrypted telemetry to the HOC.

In one or more embodiments, a method for a virtual transponder utilizing inband commanding comprises transmitting, by a hosted payload (HoP) operation center (HOC), encrypted hosted commands to a hosted receiving antenna, where the encrypted hosted commands are encrypted utilizing a second communication security (COMSEC) variety. The method further comprises transmitting, by the hosted receiving antenna, the encrypted hosted commands to a payload antenna on a vehicle. Also, the method comprises transmitting, by a host spacecraft operations center (SOC), the encrypted host commands to a host receiving antenna, where the encrypted host commands are encrypted utilizing a first COMSEC variety. In addition, the method comprises transmitting, by the host receiving antenna, the encrypted host commands to the payload antenna. Additionally, the method comprises decrypting, by a first communication security module, the encrypted host commands utilizing the first COMSEC variety to generate unencrypted host commands. Also, the method comprises decrypting, by a second communication security module, the encrypted hosted commands utilizing the second COMSEC variety to generate unencrypted hosted commands. In addition, the method comprises reconfiguring a payload on the vehicle according to the unencrypted host commands and/or the unencrypted hosted commands. Additionally, the method comprises transmitting, by the payload antenna, payload data to the host receiving antenna and/or the hosted receiving antenna. Also, the method comprises encrypting, by the first communication security module, unencrypted host telemetry utilizing the first COMSEC variety to generate encrypted host telemetry. In addition, the method comprises encrypting, by the second communication security module, unencrypted hosted telemetry utilizing the second COMSEC variety to generate encrypted hosted telemetry. Additionally, the method comprises transmitting, by the payload antenna, the encrypted host telemetry to the host receiving antenna. Also, the method comprises transmitting, by the host receiving antenna, the encrypted host telemetry to the host SOC. In addition, the method comprises transmitting, by the payload antenna, the encrypted hosted telemetry to the hosted receiving antenna. Further, the method comprises transmitting, by the hosted receiving antenna, the encrypted hosted telemetry to the HOC.

In at least one embodiment, a method for a virtual transponder utilizing inband commanding comprises transmitting, by a hosted payload (HoP) operation center (HOC), encrypted hosted commands to a hosted receiving antenna, where the encrypted hosted commands are encrypted utilizing a second communication security (COMSEC) variety. The method further comprises transmitting, by the hosted receiving antenna, the encrypted hosted commands to a payload antenna on a vehicle. Also, the method comprises transmitting, by a host spacecraft operations center (SOC), encrypted host commands to a host receiving antenna, where the encrypted host commands are encrypted utilizing a first COMSEC variety. In addition, the method comprises transmitting, by the host receiving antenna, the encrypted host commands to the payload antenna. Additionally, the method comprises decrypting, by a first communication security module, the encrypted host commands utilizing the first COMSEC variety to generate unencrypted host commands. Also, the method comprises decrypting, by a second communication security module, the encrypted hosted commands utilizing the second COMSEC variety to generate unencrypted hosted commands. In addition, the method comprises reconfiguring a payload on the vehicle according to the unencrypted host commands and/or the unencrypted hosted commands. Additionally, the method comprises transmitting, by the payload antenna, payload data to the host receiving antenna and/or the hosted receiving antenna. Also, the method comprises encrypting, by the first communication security module, unencrypted telemetry utilizing the first COMSEC variety to generate encrypted telemetry. In addition, the method comprises transmitting, by the payload antenna, the encrypted telemetry to the host receiving antenna. Additionally, the method comprises transmitting, by the host receiving antenna, the encrypted telemetry to the host SOC. Also, the method comprises transmitting, by the payload antenna, the encrypted telemetry to the hosted receiving antenna. Further, the method comprises transmitting, by the hosted receiving antenna, the encrypted telemetry to the HOC.

In one or more embodiments, a method for a virtual transponder utilizing inband commanding comprises transmitting, by a hosted payload (HoP) operation center (HOC), encrypted hosted commands to a host spacecraft operations center (SOC). In one or more embodiments, the encrypted hosted commands are encrypted utilizing a second communication security (COMSEC) variety. The method further comprises transmitting, by the host SOC, encrypted host commands and the encrypted hosted commands to a host receiving antenna. In one or more embodiments, the encrypted host commands are encrypted utilizing a first COMSEC variety. Also, the method comprises transmitting, by the host receiving antenna, the encrypted host commands and the encrypted hosted commands to a payload antenna on the vehicle. In addition, the method comprises decrypting, by a first communication security module, the encrypted host commands utilizing the first COMSEC variety to generate unencrypted host commands. Additionally, the method comprises decrypting, by a second communication security module, the encrypted hosted commands utilizing the second COMSEC variety to generate unencrypted hosted commands. Also, the method comprises reconfiguring a payload on the vehicle according to at least one of the unencrypted host commands or the unencrypted hosted commands. In addition, the method comprises transmitting, by the payload antenna, payload data to at least one of the host receiving antenna or a hosted receiving antenna. Also, the method comprises encrypting, by the first communication security module, unencrypted host telemetry utilizing the first COMSEC variety to generate encrypted host telemetry. In addition, the method comprises encrypting, by the second communication security module, unencrypted hosted telemetry utilizing the second COMSEC variety to generate encrypted hosted telemetry. Also, the method comprises transmitting, by a host telemetry transmitter, the encrypted host telemetry to the host SOC. In addition, the method comprises transmitting, by a hosted telemetry transmitter, the encrypted hosted telemetry to the host SOC. Further, the method comprises transmitting, by the host SOC, the encrypted hosted telemetry to the HOC.

In one or more embodiments, a system for a virtual transponder utilizing inband commanding comprises a hosted payload (HoP) operation center (HOC) to transmit encrypted hosted commands to a hosted receiving antenna, where the encrypted hosted commands are encrypted utilizing a second communication security (COMSEC) variety. The system further comprises the hosted receiving antenna to transmit the encrypted hosted commands to a payload antenna on a vehicle. Also, the system comprises a host spacecraft operations center (SOC) to transmit encrypted host commands to the vehicle, where the encrypted host commands are encrypted utilizing a first COMSEC variety. In addition, the system comprises a first communication security module to decrypt the encrypted host commands utilizing the first COMSEC variety to generate unencrypted host commands. Additionally, the system comprises a second communication security module to decrypt the encrypted hosted commands utilizing the second COMSEC variety to generate unencrypted hosted commands. Also, the system comprises a payload on the vehicle reconfigured according to the unencrypted host commands and/or the unencrypted hosted commands. In addition, the system comprises the payload antenna to transmit payload data to a host receiving antenna and/or the hosted receiving antenna. Additionally, the system comprises the first communication security module to encrypt unencrypted host telemetry utilizing the first COMSEC variety to generate encrypted host telemetry. Also, the system comprises the second communication security module to encrypt unencrypted hosted telemetry utilizing the second COMSEC variety to generate encrypted hosted telemetry. In addition, the system comprises a host telemetry transmitter to transmit the encrypted host telemetry to the host SOC. Additionally, the system comprises a hosted telemetry transmitter to transmit the encrypted hosted telemetry to the host SOC. Further, the system comprises the host SOC to transmit the encrypted hosted telemetry to the HOC.

In at least one embodiment, a system for a virtual transponder utilizing inband commanding comprises a hosted payload (HoP) operation center (HOC) to transmit encrypted hosted commands to a host spacecraft operations center (SOC), where the encrypted hosted commands are encrypted utilizing a second communication security (COMSEC) variety. The system further comprises the host SOC to transmit the encrypted hosted commands to a vehicle. Also, the system comprises the host SOC to transmit encrypted host commands to a host receiving antenna, where the encrypted host commands are encrypted utilizing a first COMSEC variety. In addition, the system comprises the host receiving antenna to transmit the encrypted host commands to a payload antenna on the vehicle. Additionally, the system comprises a first communication security module to decrypt the encrypted host commands utilizing the first COMSEC variety to generate unencrypted host commands. Also, the system comprises a second communication security module to decrypt the encrypted hosted commands utilizing the second COMSEC variety to generate unencrypted hosted commands. In addition, the system comprises a payload on the vehicle reconfigured according to the unencrypted host commands and/or the unencrypted hosted commands. Additionally, the system comprises the payload antenna to transmit payload data to the host receiving antenna and/or a hosted receiving antenna. Also, the system comprises the first communication security module to encrypt unencrypted host telemetry utilizing the first COMSEC variety to generate encrypted host telemetry. In addition, the system comprises the second communication security module to encrypt unencrypted hosted telemetry utilizing the second COMSEC variety to generate encrypted hosted telemetry. Additionally, the system comprises a host telemetry transmitter to transmit the encrypted host telemetry to the host SOC. Also, the system comprises a hosted telemetry transmitter to transmit the encrypted hosted telemetry to the host SOC. Further, the system comprises the host SOC to transmit the encrypted hosted telemetry to the HOC.

In one or more embodiments, a system for a virtual transponder utilizing inband commanding comprises a hosted payload (HoP) operation center (HOC) to transmit encrypted hosted commands to a hosted receiving antenna, where the encrypted hosted commands are encrypted utilizing a second communication security (COMSEC) variety. The system further comprises the hosted receiving antenna to transmit the encrypted hosted commands to a payload antenna on a vehicle. Also, the system comprises a host spacecraft operations center (SOC) to transmit encrypted host commands to a host receiving antenna, where the encrypted host commands are encrypted utilizing a first COMSEC variety. In addition, the system comprises the host receiving antenna to transmit the encrypted host commands to a payload antenna on the vehicle. Additionally, the system comprises a first communication security module to decrypt the encrypted host commands utilizing the first COMSEC variety to generate unencrypted host commands. Also, the system comprises a second communication security module to decrypt the encrypted hosted commands utilizing the second COMSEC variety to generate unencrypted hosted commands. In addition, the system comprises a payload on the vehicle reconfigured according to the unencrypted host commands and/or the unencrypted hosted commands. Additionally, the system comprises the payload antenna to transmit payload data to the host receiving antenna and/or the hosted receiving antenna. Also, the system comprises the first communication security module to encrypt unencrypted host telemetry utilizing the first COMSEC variety to generate encrypted host telemetry. In addition, the system comprises the second communication security module to encrypt unencrypted hosted telemetry utilizing the second COMSEC variety to generate encrypted hosted telemetry. Additionally, the system comprises a host telemetry transmitter to transmit the encrypted host telemetry to the host SOC. Also, the system comprises a hosted telemetry transmitter to transmit the encrypted hosted telemetry to the host SOC. Further, the system comprises the host SOC to transmit the encrypted hosted telemetry to the HOC.

In at least one embodiment, a system for a virtual transponder utilizing inband commanding comprises a hosted payload (HoP) operation center (HOC) to transmit encrypted hosted commands to a hosted receiving antenna, where the encrypted hosted commands are encrypted utilizing a second communication security (COMSEC) variety. The system further comprises the hosted receiving antenna to transmit the encrypted hosted commands to a payload antenna on a vehicle. Also, the system comprises a host spacecraft operations center (SOC) to transmit encrypted host commands to a host receiving antenna, where the encrypted host commands are encrypted utilizing a first COMSEC variety. In addition, the system comprises the host receiving antenna to transmit the encrypted host commands to the payload antenna on the vehicle. Additionally, the system comprises a first communication security module to decrypt the encrypted host commands utilizing the first COMSEC variety to generate unencrypted host commands. Also, the system comprises a second communication security module to decrypt the encrypted hosted commands utilizing the second COMSEC variety to generate unencrypted hosted commands. In addition, the system comprises a payload on the vehicle reconfigured according to the unencrypted host commands and/or the unencrypted hosted commands. Additionally, the system comprises transmitting, by the payload antenna, payload data to the host receiving antenna and/or the hosted receiving antenna. Also, the system comprises the first communication security module to encrypt unencrypted telemetry utilizing the first COMSEC variety to generate encrypted telemetry. In addition, the system comprises a telemetry transmitter to transmit the encrypted telemetry to the host SOC. Further, the system comprises the host SOC to transmit the encrypted telemetry to the HOC.

In one or more embodiments, a system for a virtual transponder utilizing inband commanding comprises a hosted payload (HoP) operation center (HOC) to transmit encrypted hosted commands to a hosted receiving antenna, where the encrypted hosted commands are encrypted utilizing a second communication security (COMSEC) variety. The system further comprises the hosted receiving antenna to transmit the encrypted hosted commands to a payload antenna on a vehicle. Also, the system comprises a host spacecraft operations center (SOC) to transmit the encrypted host commands to a host receiving antenna, where the encrypted host commands are encrypted utilizing a first COMSEC variety. In addition, the system comprises the host receiving antenna to transmit the encrypted host commands to the payload antenna. Additionally, the system comprises a first communication security module to decrypt the encrypted host commands utilizing the first COMSEC variety to generate unencrypted host commands. Also, the system comprises a second communication security module to decrypt the encrypted hosted commands utilizing the second COMSEC variety to generate unencrypted hosted commands. In addition, the system comprises a payload on the vehicle reconfigured according to the unencrypted host commands and/or the unencrypted hosted commands. Additionally, the system comprises the payload antenna to transmit payload data to the host receiving antenna and/or the hosted receiving antenna. Also, the system comprises the first communication security module to encrypt unencrypted host telemetry utilizing the first COMSEC variety to generate encrypted host telemetry. In addition, the system comprises the second communication security module to encrypt unencrypted hosted telemetry utilizing the second COMSEC variety to generate encrypted hosted telemetry. Additionally, the system comprises the payload antenna to transmit the encrypted host telemetry to the host receiving antenna. Also, the system comprises the host receiving antenna to transmit the encrypted host telemetry to the host SOC. In addition, the system comprises the payload antenna to transmit the encrypted hosted telemetry to the hosted receiving antenna. Further, the system comprises the hosted receiving antenna to transmit the encrypted hosted telemetry to the HOC.

In at least one embodiment, a system for a virtual transponder utilizing inband commanding comprising a hosted payload (HoP) operation center (HOC) to transmit encrypted hosted commands to a hosted receiving antenna, where the encrypted hosted commands are encrypted utilizing a second communication security (COMSEC) variety. The system further comprises the hosted receiving antenna to transmit the encrypted hosted commands to a payload antenna on a vehicle. Also, the system comprises a host spacecraft operations center (SOC) to transmit encrypted host commands to a host receiving antenna, where the encrypted host commands are encrypted utilizing a first COMSEC variety. In addition, the system comprises the host receiving antenna to transmit the encrypted host commands to the payload antenna. Additionally, the system comprises a first communication security module to decrypt the encrypted host commands utilizing the first COMSEC variety to generate unencrypted host commands. Also, the system comprises a second communication security module to decrypt the encrypted hosted commands utilizing the second COMSEC variety to generate unencrypted hosted commands. In addition, the system comprises a payload on the vehicle reconfigured according to the unencrypted host commands and/or the unencrypted hosted commands. Additionally, the system comprises the payload antenna to transmit payload data to the host receiving antenna and/or the hosted receiving antenna. Also, the system comprises the first communication security module to encrypt unencrypted telemetry utilizing the first COMSEC variety to generate encrypted telemetry. In addition, the system comprises the payload antenna to transmit the encrypted telemetry to the host receiving antenna. Additionally, the system comprises the host receiving antenna to transmit the encrypted telemetry to the host SOC. Also, the system comprises the payload antenna to transmit the encrypted telemetry to the hosted receiving antenna. Further, the system comprises the hosted receiving antenna to transmit the encrypted telemetry to the HOC.

In one or more embodiments, a system for a virtual transponder utilizing inband commanding comprises a hosted payload (HoP) operation center (HOC) to transmit encrypted hosted commands to a host spacecraft operations center (SOC). In one or more embodiments, the encrypted hosted commands are encrypted utilizing a second communication security (COMSEC) variety. The system further comprises the host SOC to transmit encrypted host commands and the encrypted hosted commands to a host receiving antenna. In one or more embodiments, the encrypted host commands are encrypted utilizing a first COMSEC variety. Also, the system comprises the host receiving antenna to transmit the encrypted host commands and the encrypted hosted commands to a payload antenna on the vehicle. In addition, the system comprises a first communication security module to decrypt the encrypted host commands utilizing the first COMSEC variety to generate unencrypted host commands. Additionally, the system comprises a second communication security module to decrypt the encrypted hosted commands utilizing the second COMSEC variety to generate unencrypted hosted commands. Also, the system comprises a payload on the vehicle reconfigured according to at least one of the unencrypted host commands or the unencrypted hosted commands. In addition, the system comprises the payload antenna to transmit payload data to at least one of the host receiving antenna or a hosted receiving antenna. Additionally, the system comprises the first communication security module to encrypt unencrypted host telemetry utilizing the first COMSEC variety to generate encrypted host telemetry. In addition, the system comprises the second communication security module to encrypt unencrypted hosted telemetry utilizing the second COMSEC variety to generate encrypted hosted telemetry. Also, the system comprises a host telemetry transmitter to transmit the encrypted host telemetry to the host SOC. In addition, the system comprises a hosted telemetry transmitter to transmit the encrypted hosted telemetry to the host SOC. Further, the system comprises the host SOC to transmit the encrypted hosted telemetry to the HOC.

In one or more embodiments, a method for a virtual transponder utilizing inband commanding comprises transmitting, by a hosted payload (HoP) operation center (HOC), encrypted hosted commands to a host spacecraft operations center (SOC), where the encrypted hosted commands are encrypted utilizing a second communication security (COMSEC) variety. The method also comprises transmitting, by the host SOC, the encrypted hosted commands to a host receiving antenna. The method further comprises transmitting, by the host receiving antenna, the encrypted hosted commands to a payload antenna on a vehicle. Also, the method comprises transmitting, by the host SOC, encrypted host commands to the vehicle, where the encrypted host commands are encrypted utilizing a first COMSEC variety. In addition, the method comprises decrypting, by a first communication security module, the encrypted host commands utilizing the first COMSEC variety to generate unencrypted host commands. Additionally, the method comprises decrypting, by a second communication security module, the encrypted hosted commands utilizing the second COMSEC variety to generate unencrypted hosted commands. Also, the method comprises reconfiguring a payload on the vehicle according to the unencrypted host commands and/or the unencrypted hosted commands. Additionally, the method comprises transmitting, by the payload antenna, payload data to a host receiving antenna and/or the hosted receiving antenna. Also, the method comprises encrypting, by the first communication security module, unencrypted host telemetry utilizing the first COMSEC variety to generate encrypted host telemetry. Additionally, the method comprises encrypting, by the second communication security module, unencrypted hosted telemetry utilizing the second COMSEC variety to generate encrypted hosted telemetry. In addition, the method comprises transmitting, by a host telemetry transmitter, the encrypted host telemetry to the host SOC. Also, the method comprises transmitting, by a hosted telemetry transmitter, the encrypted hosted telemetry to the host SOC. Further, the method comprises transmitting, by the host SOC, the encrypted hosted telemetry to the HOC.

In one or more embodiments, a system for a virtual transponder utilizing inband commanding comprises a hosted payload (HoP) operation center (HOC) to transmit encrypted hosted commands to a host spacecraft operations center (SOC), where the encrypted hosted commands are encrypted utilizing a second communication security (COMSEC) variety. The system also comprises the host SOC to transmit the encrypted hosted commands to a host receiving antenna. The system further comprises the host receiving antenna to transmit the encrypted hosted commands to a payload antenna on a vehicle. Also, the system comprises the host SOC to transmit encrypted host commands to the vehicle, where the encrypted host commands are encrypted utilizing a first COMSEC variety. In addition, the system comprises a first communication security module to decrypt the encrypted host commands utilizing the first COMSEC variety to generate unencrypted host commands. Additionally, the system comprises a second communication security module to decrypt the encrypted hosted commands utilizing the second COMSEC variety to generate unencrypted hosted commands. Also, the system comprises a payload on the vehicle reconfigured according to the unencrypted host commands and/or the unencrypted hosted commands. In addition, the system comprises the payload antenna to transmit payload data to a host receiving antenna and/or the hosted receiving antenna. Additionally, the system comprises the first communication security module to encrypt unencrypted host telemetry utilizing the first COMSEC variety to generate encrypted host telemetry. Also, the system comprises the second communication security module to encrypt unencrypted hosted telemetry utilizing the second COMSEC variety to generate encrypted hosted telemetry. In addition, the system comprises a host telemetry transmitter to transmit the encrypted host telemetry to the host SOC. Additionally, the system comprises a hosted telemetry transmitter to transmit the encrypted hosted telemetry to the host SOC. Further, the system comprises the host SOC to transmit the encrypted hosted telemetry to the HOC.

In at least one embodiment, a method for a virtual transponder utilizing inband commanding comprises transmitting, by a hosted payload (HoP) operation center (HOC), encrypted hosted commands to a host spacecraft operations center (SOC), where the encrypted hosted commands are encrypted utilizing a second communication security (COMSEC) variety. The method also comprises transmitting, by the host SOC, the encrypted hosted commands to a host receiving antenna. The method further comprises transmitting, by the host receiving antenna, the encrypted hosted commands to a payload antenna on a vehicle. Also, the method comprises transmitting, by the host SOC, encrypted host commands to a host receiving antenna, where the encrypted host commands are encrypted utilizing a first COMSEC variety. In addition, the method comprises transmitting, by the host receiving antenna, the encrypted host commands to the payload antenna on the vehicle. Additionally, the method comprises decrypting, by a first communication security module, the encrypted host commands utilizing the first COMSEC variety to generate unencrypted host commands. Also, the method comprises decrypting, by a second communication security module, the encrypted hosted commands utilizing the second COMSEC variety to generate unencrypted hosted commands. In addition, the method comprises reconfiguring a payload on the vehicle according to the unencrypted host commands and/or the unencrypted hosted commands. Additionally, the method comprises transmitting, by the payload antenna, payload data to the host receiving antenna and/or the hosted receiving antenna. Also, the method comprises encrypting, by the first communication security module, unencrypted telemetry utilizing the first COMSEC variety to generate encrypted telemetry. In addition, the method comprises transmitting, by a telemetry transmitter, the encrypted telemetry to the host SOC. Further, the method comprises transmitting, by the host SOC, the encrypted telemetry to the HOC.

In at least one embodiment, a system for a virtual transponder utilizing inband commanding comprises a hosted payload (HoP) operation center (HOC) to transmit encrypted hosted commands to a host spacecraft operations center (SOC), where the encrypted hosted commands are encrypted utilizing a second communication security (COMSEC) variety. The system also comprises the host SOC to transmit the encrypted hosted commands to a host receiving antenna. The system further comprises the host receiving antenna to transmit the encrypted hosted commands to a payload antenna on a vehicle. Also, the system comprises the host SOC to transmit encrypted host commands to a host receiving antenna, where the encrypted host commands are encrypted utilizing a first COMSEC variety. In addition, the system comprises the host receiving antenna to transmit the encrypted host commands to the payload antenna on the vehicle. Additionally, the system comprises a first communication security module to decrypt the encrypted host commands utilizing the first COMSEC variety to generate unencrypted host commands. Also, the system comprises a second communication security module to decrypt the encrypted hosted commands utilizing the second COMSEC variety to generate unencrypted hosted commands. In addition, the system comprises a payload on the vehicle reconfigured according to the unencrypted host commands and/or the unencrypted hosted commands. Additionally, the system comprises transmitting, by the payload antenna, payload data to the host receiving antenna and/or the hosted receiving antenna. Also, the system comprises the first communication security module to encrypt unencrypted telemetry utilizing the first COMSEC variety to generate encrypted telemetry. In addition, the system comprises a telemetry transmitter to transmit the encrypted telemetry to the host SOC. Further, the system comprises the host SOC to transmit the encrypted telemetry to the HOC.

In one or more embodiments, a method for a virtual transponder utilizing inband commanding comprises transmitting, by a hosted payload (HoP) operation center (HOC), encrypted hosted commands to a host spacecraft operations center (SOC), where the encrypted hosted commands are encrypted utilizing a second communication security (COMSEC) variety. The method also comprises transmitting, by the host SOC, the encrypted hosted commands to a host receiving antenna. The method further comprises transmitting, by the host receiving antenna, the encrypted hosted commands to a payload antenna on a vehicle. Also, the method comprises transmitting, by the host SOC, the encrypted host commands to a host receiving antenna, where the encrypted host commands are encrypted utilizing a first COMSEC variety. In addition, the method comprises transmitting, by the host receiving antenna, the encrypted host commands to the payload antenna. Additionally, the method comprises decrypting, by a first communication security module, the encrypted host commands utilizing the first COMSEC variety to generate unencrypted host commands.

Also, the method comprises decrypting, by a second communication security module, the encrypted hosted commands utilizing the second COMSEC variety to generate unencrypted hosted commands. In addition, the method comprises reconfiguring a payload on the vehicle according to the unencrypted host commands and/or the unencrypted hosted commands. Additionally, the method comprises transmitting, by the payload antenna, payload data to the host receiving antenna and/or the hosted receiving antenna. Also, the method comprises encrypting, by the first communication security module, unencrypted host telemetry utilizing the first COMSEC variety to generate encrypted host telemetry. In addition, the method comprises encrypting, by the second communication security module, unencrypted hosted telemetry utilizing the second COMSEC variety to generate encrypted hosted telemetry. Additionally, the method comprises transmitting, by the payload antenna, the encrypted host telemetry to the host receiving antenna. Also, the method comprises transmitting, by the host receiving antenna, the encrypted host telemetry to the host SOC. In addition, the method comprises transmitting, by the payload antenna, the encrypted hosted telemetry to the host receiving antenna. Also, the method comprises transmitting, by the host receiving antenna, the encrypted hosted telemetry to the host SOC. Further, the method comprises the host SOC, transmitting, the encrypted hosted telemetry to the HOC.

In one or more embodiments, a system for a virtual transponder utilizing inband commanding comprises a hosted payload (HoP) operation center (HOC) to transmit encrypted hosted commands to a host spacecraft operations center (SOC), where the encrypted hosted commands are encrypted utilizing a second communication security (COMSEC) variety. The system also comprises the host SOC to transmit the encrypted hosted commands to a host receiving antenna. The system further comprises the host receiving antenna to transmit the encrypted hosted commands to a payload antenna on a vehicle. Also, the system comprises a host spacecraft operations center (SOC) to transmit the encrypted host commands to a host receiving antenna, where the encrypted host commands are encrypted utilizing a first COMSEC variety. In addition, the system comprises the host receiving antenna to transmit the encrypted host commands to the payload antenna. Additionally, the system comprises a first communication security module to decrypt the encrypted host commands utilizing the first COMSEC variety to generate unencrypted host commands. Also, the system comprises a second communication security module to decrypt the encrypted hosted commands utilizing the second COMSEC variety to generate unencrypted hosted commands. In addition, the system comprises a payload on the vehicle reconfigured according to the unencrypted host commands and/or the unencrypted hosted commands. Additionally, the system comprises the payload antenna to transmit payload data to the host receiving antenna and/or the hosted receiving antenna. Also, the system comprises the first communication security module to encrypt unencrypted host telemetry utilizing the first COMSEC variety to generate encrypted host telemetry. In addition, the system comprises the second communication security module to encrypt unencrypted hosted telemetry utilizing the second COMSEC variety to generate encrypted hosted telemetry. Additionally, the system comprises the payload antenna to transmit the encrypted host telemetry to the host receiving antenna. Also, the system comprises the host receiving antenna to transmit the encrypted host telemetry to the host SOC. In addition, the system comprises the payload antenna to transmit the encrypted hosted telemetry to the host receiving antenna. Also, the system comprises the host receiving antenna to transmit the encrypted hosted telemetry to the host SOC. Further, the system comprises the host SOC to transmit the encrypted hosted telemetry to the HOC.

In at least one embodiment, a method for a virtual transponder utilizing inband commanding comprises transmitting, by a hosted payload (HoP) operation center (HOC), encrypted hosted commands to a host spacecraft operations center (SOC), where the encrypted hosted commands are encrypted utilizing a second communication security (COMSEC) variety. The method also comprises transmitting by the host SOC the encrypted hosted commands to a host receiving antenna. The method further comprises transmitting, by the host receiving antenna, the encrypted hosted commands to a payload antenna on a vehicle. Also, the method comprises transmitting, by the host SOC, encrypted host commands to a host receiving antenna, where the encrypted host commands are encrypted utilizing a first COMSEC variety. In addition, the method comprises transmitting, by the host receiving antenna, the encrypted host commands to the payload antenna. Additionally, the method comprises decrypting, by a first communication security module, the encrypted host commands utilizing the first COMSEC variety to generate unencrypted host commands. Also, the method comprises decrypting, by a second communication security module, the encrypted hosted commands utilizing the second COMSEC variety to generate unencrypted hosted commands. In addition, the method comprises reconfiguring a payload on the vehicle according to the unencrypted host commands and/or the unencrypted hosted commands. Additionally, the method comprises transmitting, by the payload antenna, payload data to the host receiving antenna and/or the hosted receiving antenna. Also, the method comprises encrypting, by the first communication security module, unencrypted telemetry utilizing the first COMSEC variety to generate encrypted telemetry. In addition, the method comprises transmitting, by the payload antenna, the encrypted telemetry to the host receiving antenna. Additionally, the method comprises transmitting, by the host receiving antenna, the encrypted telemetry to the host SOC. Further, the method comprises transmitting, by the host SOC, the encrypted telemetry to the HOC.

In at least one embodiment, a system for a virtual transponder utilizing inband commanding comprising a hosted payload (HoP) operation center (HOC) to transmit encrypted hosted commands to a host spacecraft operations center (SOC), where the encrypted hosted commands are encrypted utilizing a second communication security (COMSEC) variety. The system also comprises the host SOC to transmit the encrypted hosted commands to a host receiving antenna. The system further comprises the host receiving antenna to transmit the encrypted hosted commands to a payload antenna on a vehicle. Also, the system comprises the host SOC to transmit encrypted host commands to a host receiving antenna, where the encrypted host commands are encrypted utilizing a first COMSEC variety. In addition, the system comprises the host receiving antenna to transmit the encrypted host commands to the payload antenna. Additionally, the system comprises a first communication security module to decrypt the encrypted host commands utilizing the first COMSEC variety to generate unencrypted host commands. Also, the system comprises a second communication security module to decrypt the encrypted hosted commands utilizing the second COMSEC variety to generate unencrypted hosted commands. In addition, the system comprises a payload on the vehicle reconfigured according to the unencrypted host commands and/or the unencrypted hosted commands. Additionally, the system comprises the payload antenna to transmit payload data to the host receiving antenna and/or the hosted receiving antenna. Also, the system comprises the first communication security module to encrypt unencrypted telemetry utilizing the first COMSEC variety to generate encrypted telemetry. In addition, the system comprises the payload antenna to transmit the encrypted telemetry to the host receiving antenna. Additionally, the system comprises the host receiving antenna to transmit the encrypted telemetry to the host SOC. Further, the system comprises the host SOC to transmit the encrypted telemetry to the HOC.

In at least one embodiment, a method for a virtual transponder on a vehicle comprises generating, by a configuration algorithm (CA), a configuration for a portion of a payload on the vehicle utilized by a host user by using an option for each of at least one variable for the portion of the payload on the vehicle utilized by the host user. The method further comprises generating, by the CA, a configuration for a portion of the payload on the vehicle utilized by a hosted user by using an option for each of at least one variable for the portion of the payload on the vehicle utilized by the hosted user. Also, the method comprises generating, by a host command generator, host commands for reconfiguring the portion of the payload on the vehicle utilized by the host user by using the configuration for the portion of the payload on the vehicle utilized by the host user. In addition, the method comprises generating, by a hosted command generator, hosted commands for reconfiguring the portion of the payload on the vehicle utilized by the hosted user by using the configuration for the portion of the payload on the vehicle utilized by the hosted user. Additionally, the method comprises transmitting the host commands and the hosted commands to the vehicle. Also, the method comprises reconfiguring the portion of the payload on the vehicle utilized by the host user by using the host commands. Further the method comprises reconfiguring the portion of the payload on the vehicle utilized by the hosted user by using the hosted commands.

In one or more embodiments, at least one variable is: at least one transponder power, at least one transponder spectrum, at least one transponder gain setting, at least one transponder limiter setting, at least one transponder automatic level control setting, at least one transponder phase setting, at least one internal gain generation, bandwidth for at least one beam, at least one frequency band for at least one of at least one beam, at least one transponder beamforming setting, effective isotropic radiation power (EIRP) for at least one of at least one beam, at least one transponder channel, and/or beam steering for at least one of at least one beam.

In at least one embodiment, the reconfiguring comprises reconfiguring: at least one antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In one or more embodiments, at least one antenna a parabolic reflector antenna, a shaped reflector antenna, a multifeed array antenna, and/or a phased array antenna.

In at least one embodiment, the host computing device and the hosted computing device are located at a respective station. In some embodiments, the station a ground station, a terrestrial vehicle, an airborne vehicle, or a marine vehicle.

In one or more embodiments, the vehicle is an airborne vehicle. In some embodiments, the airborne vehicle is a satellite, an aircraft, an unmanned aerial vehicle (UAV), or a space plane.

In at least one embodiment, the method further comprises selecting, with a host graphical user interface (GUI) on a host computing device, the option for each of at least one variable for the portion of the payload on the vehicle utilized by the host user.

In one or more embodiments, the method further comprises selecting, with a hosted GUI on a hosted computing device, the option for each of at least one variable for the portion of the payload on the vehicle utilized by the hosted user.

In at least one embodiment, a system for a virtual transponder on a vehicle comprises a configuration algorithm (CA) to generate a configuration for a portion of a payload on the vehicle utilized by a host user by using an option for each of at least one variable for the portion of the payload on the vehicle utilized by the host user, and to generate a configuration for a portion of the payload on the vehicle utilized by a hosted user by using an option for each of at least one variable for the portion of the payload on the vehicle utilized by the hosted user. The system further comprises a host command generator to generate host commands for reconfiguring the portion of the payload on the vehicle utilized by the host user by using the configuration for the portion of the payload on the vehicle utilized by the host user. Further, the system comprises a hosted command generator to generate hosted commands for reconfiguring the portion of the payload on the vehicle utilized by the hosted user by using the configuration for the portion of the payload on the vehicle utilized by the hosted user. In one or more embodiments, the portion of the payload on the vehicle utilized by the host user is reconfigured by using the host commands. In some embodiments, the portion of the payload on the vehicle utilized by the hosted user is reconfigured by using the hosted commands.

In one or more embodiments, the system further comprises a host graphical user interface (GUI), on a host computing device, used to select the option for each of at least one variable for the portion of the payload on the vehicle utilized by the host user.

In at least one embodiment, the system further comprises a hosted GUI, on a hosted computing device, used to select the option for each of at least one variable for the portion of the payload on the vehicle utilized by the hosted user.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIGS. 2A-13H show exemplary systems and methods for a virtual transponder utilizing inband commanding, in accordance with at least one embodiment of the present disclosure.

FIG. 2A is a diagram showing the disclosed system for a virtual transponder utilizing inband commanding for the hosted user using a hosted receiving antenna, in accordance with at least one embodiment of the present disclosure.

FIGS. 3A, 3B, 3C, and 3D together show a flow chart for the disclosed method for a virtual transponder utilizing inband commanding for the hosted user using a hosted receiving antenna, in accordance with at least one embodiment of the present disclosure.

FIGS. 3E, 3F, 3G, and 3H together show a flow chart for the disclosed method for a virtual transponder utilizing inband commanding for the hosted user using a host receiving antenna, in accordance with at least one embodiment of the present disclosure.

Figure 4:
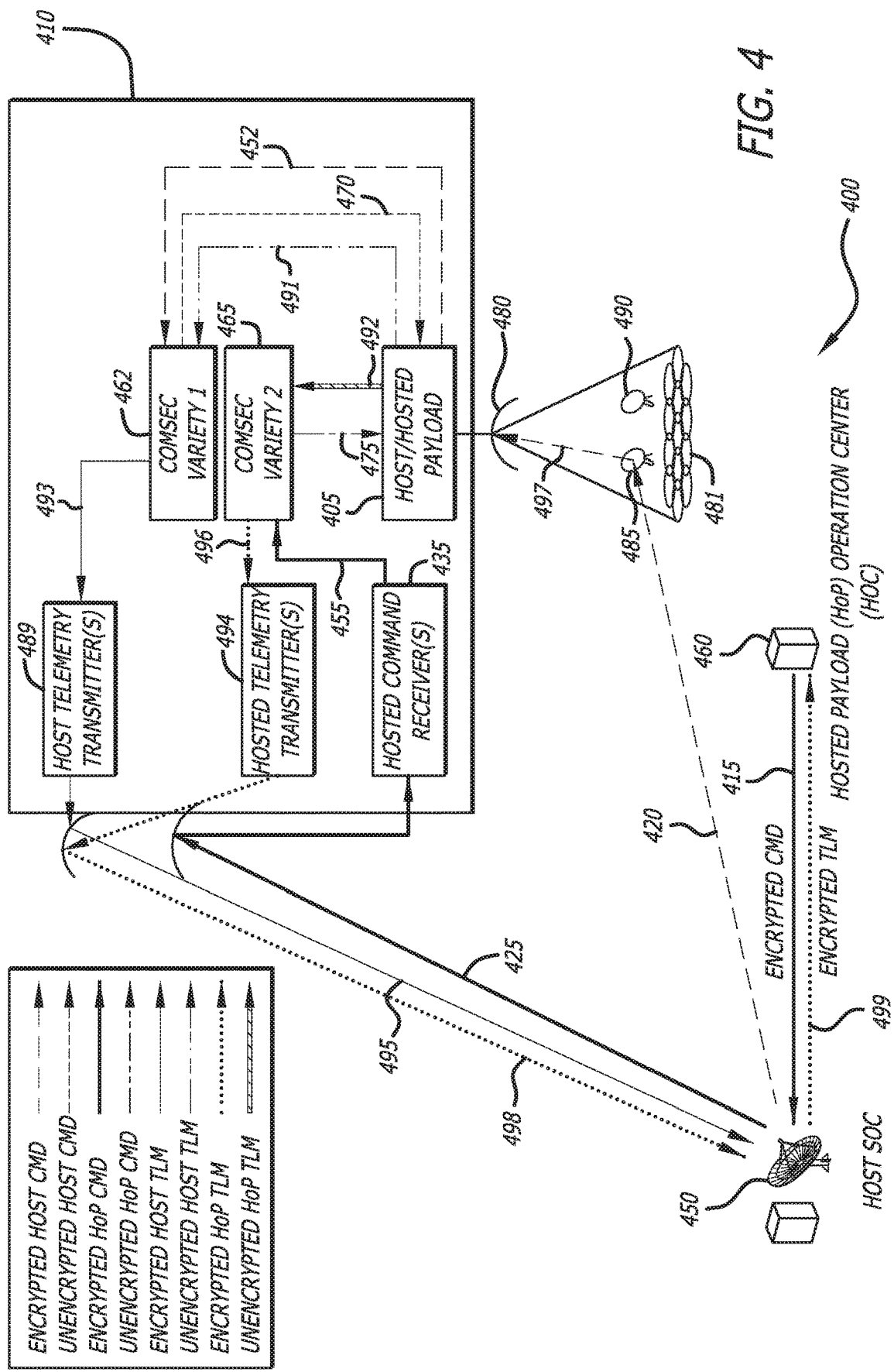
Figure 5A:
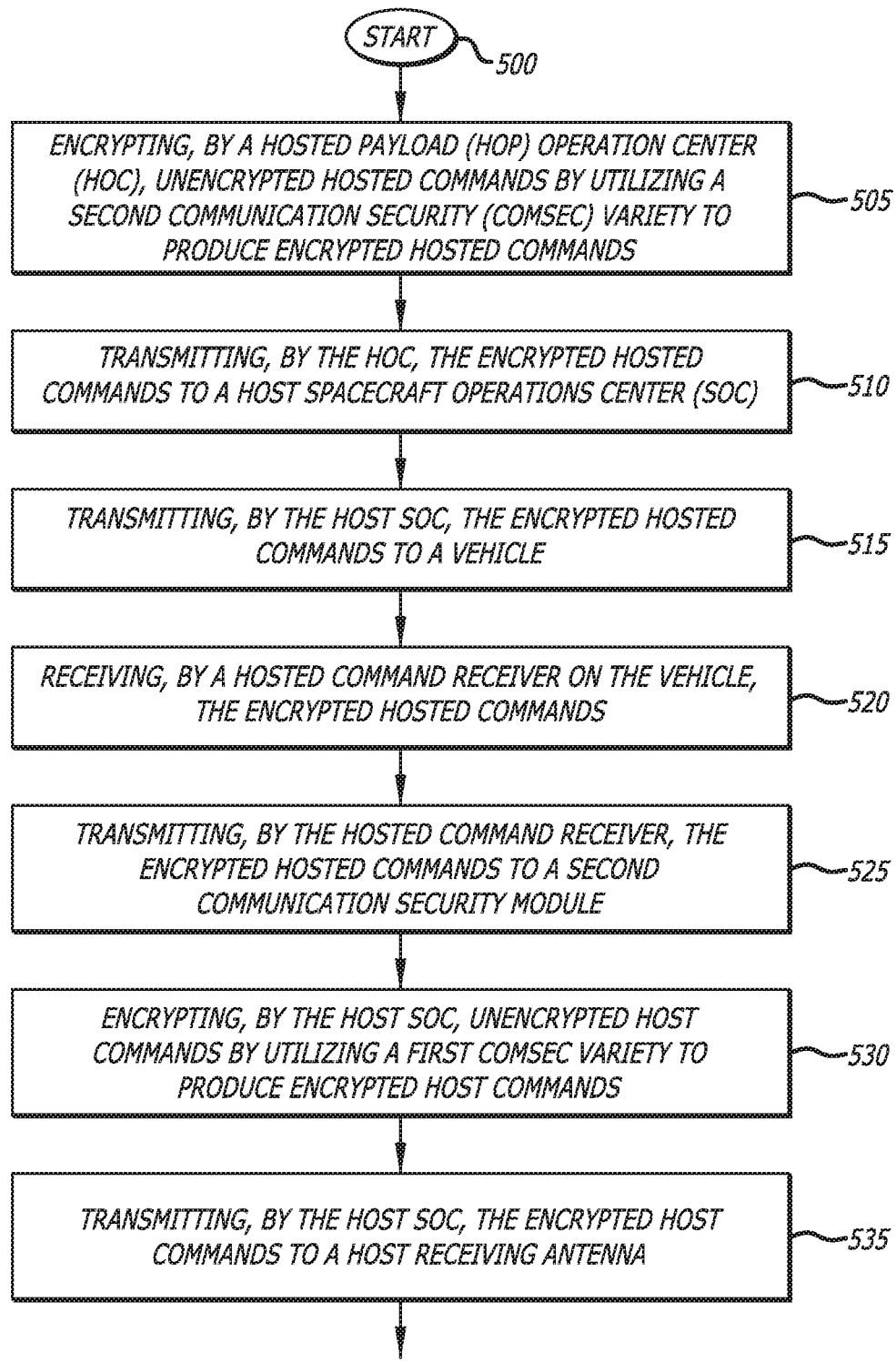
Figure 5B:
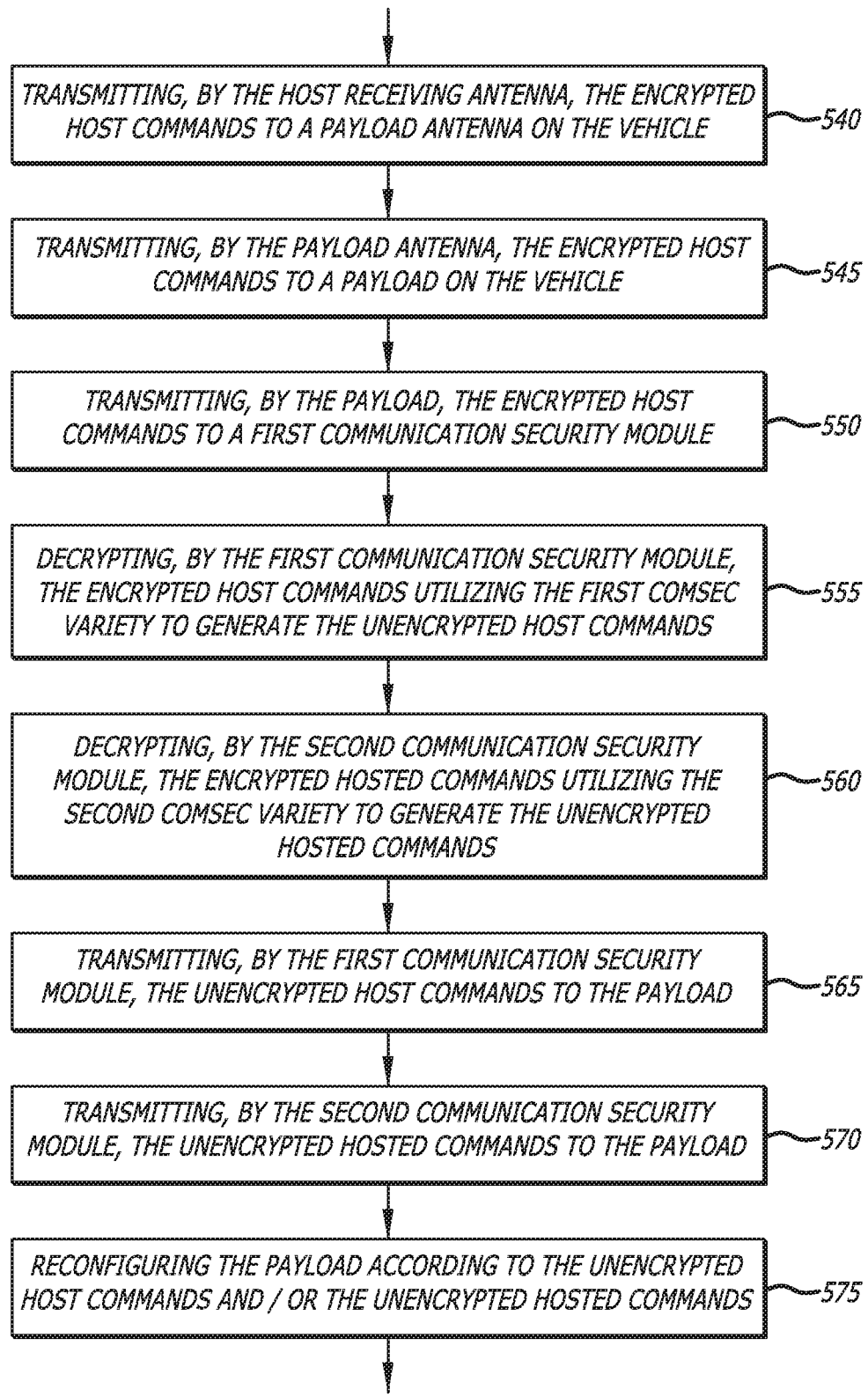
Figure 5D:
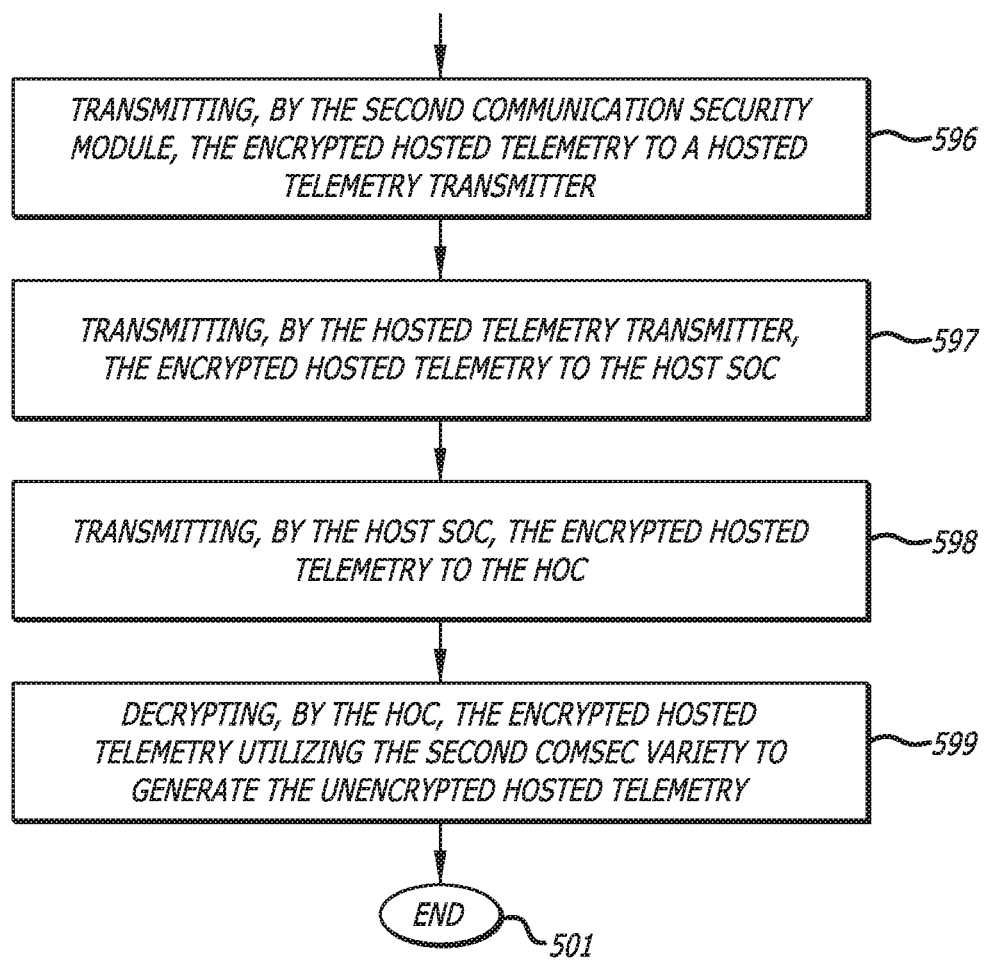

FIG. 4 is a diagram showing the disclosed system for a virtual transponder utilizing inband commanding for the host user, in accordance with at least one embodiment of the present disclosure.

FIGS. 5A, 5B, 5C, and 5D together show a flow chart for the disclosed method for a virtual transponder utilizing inband commanding for the host user, in accordance with at least one embodiment of the present disclosure.

Figure 6A:
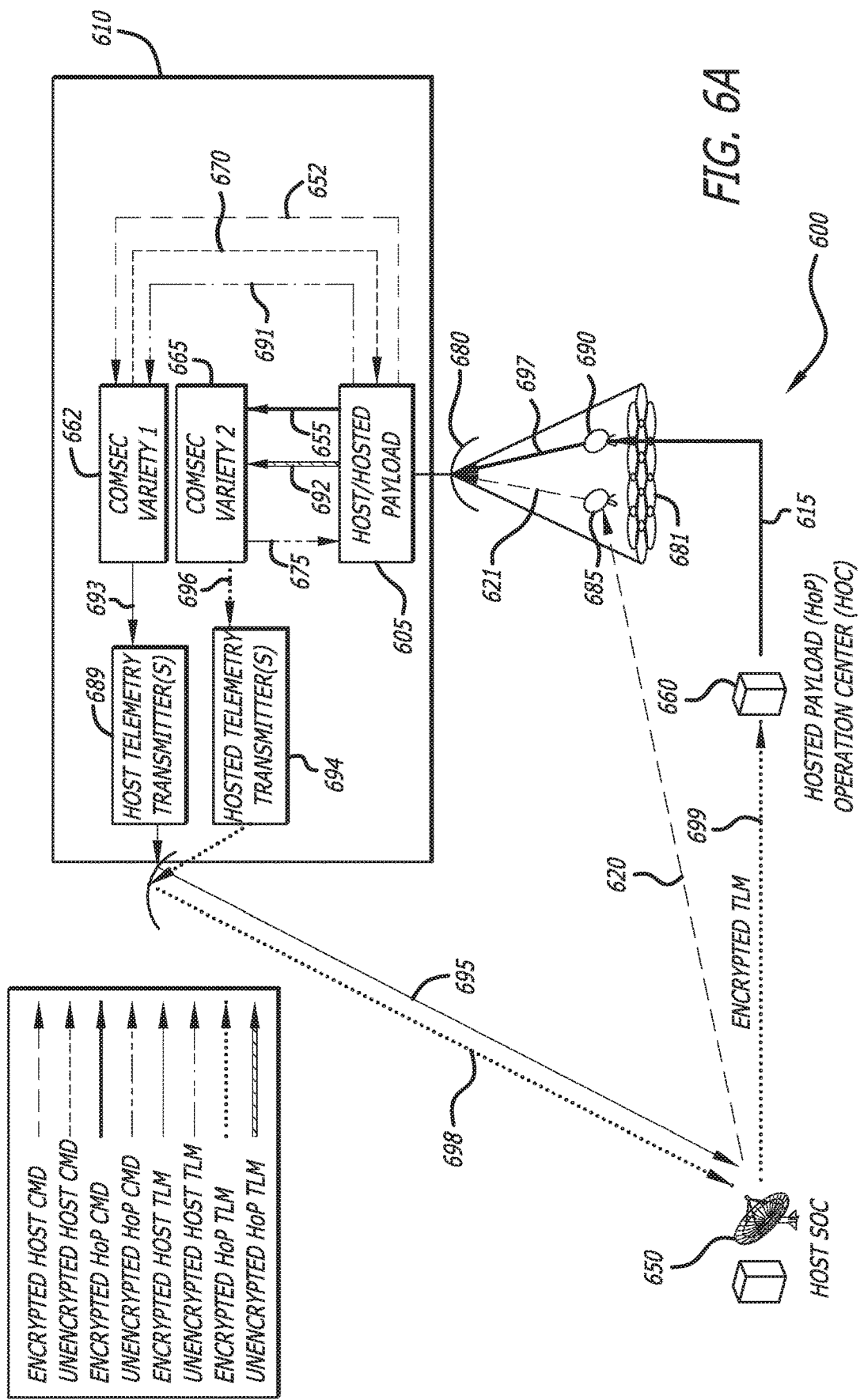

FIG. 6A is a diagram showing the disclosed system for a virtual transponder utilizing inband commanding for the host user and the hosted user using two receiving antennas and employing two communication security (COMSEC) varieties for telemetry, in accordance with at least one embodiment of the present disclosure.

Figure 6B:
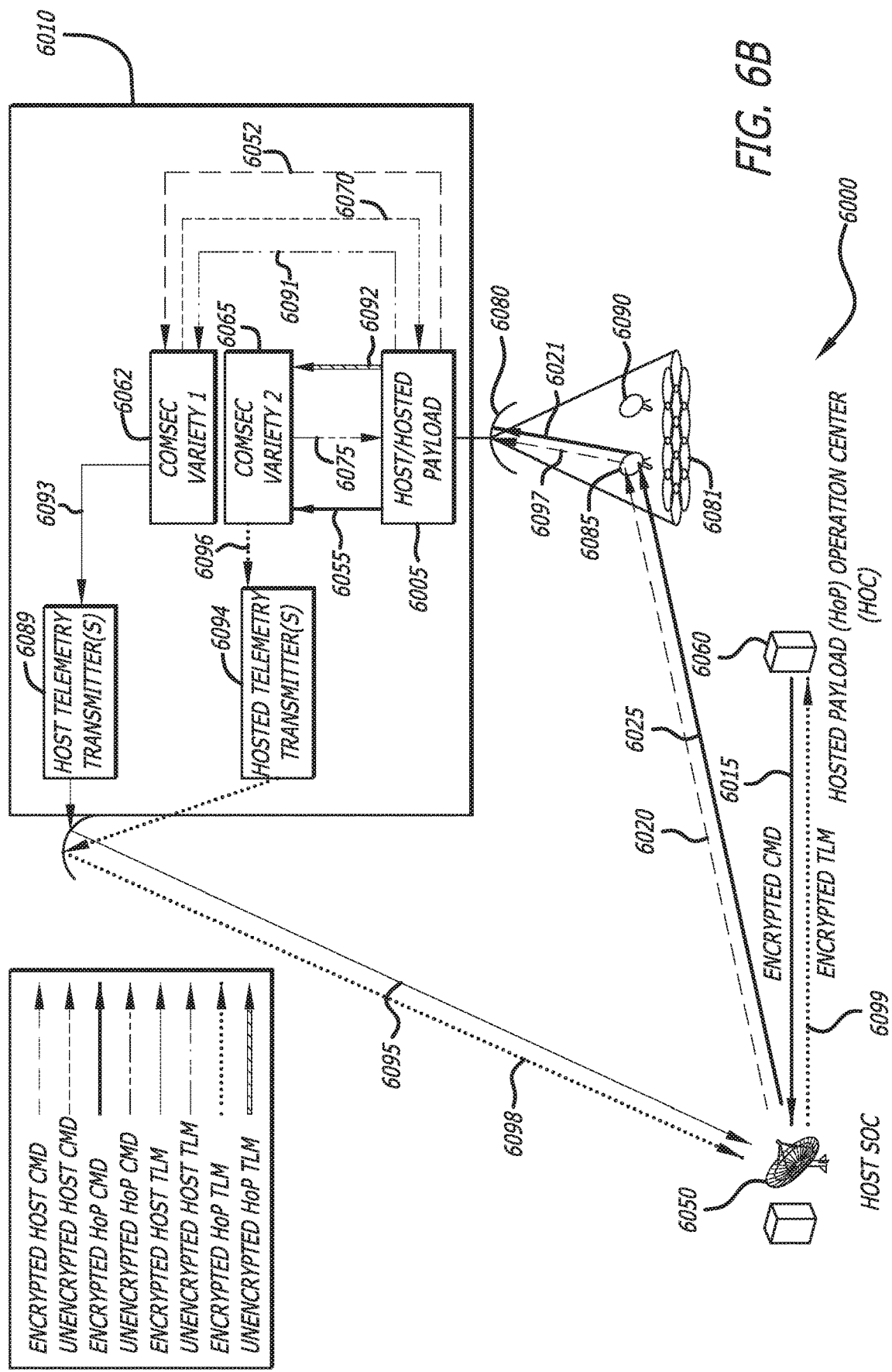
Figure 7A:
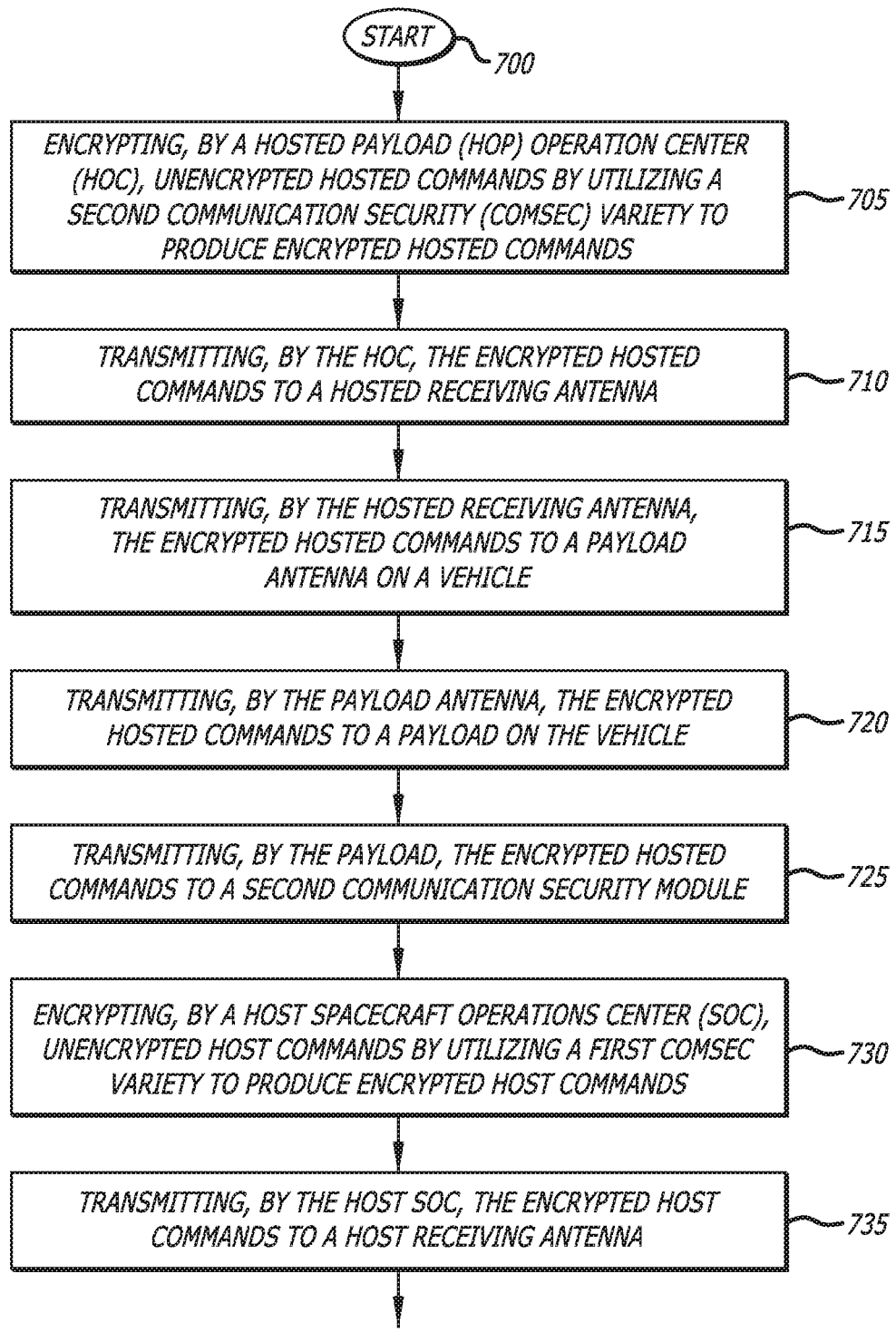
Figure 7B:
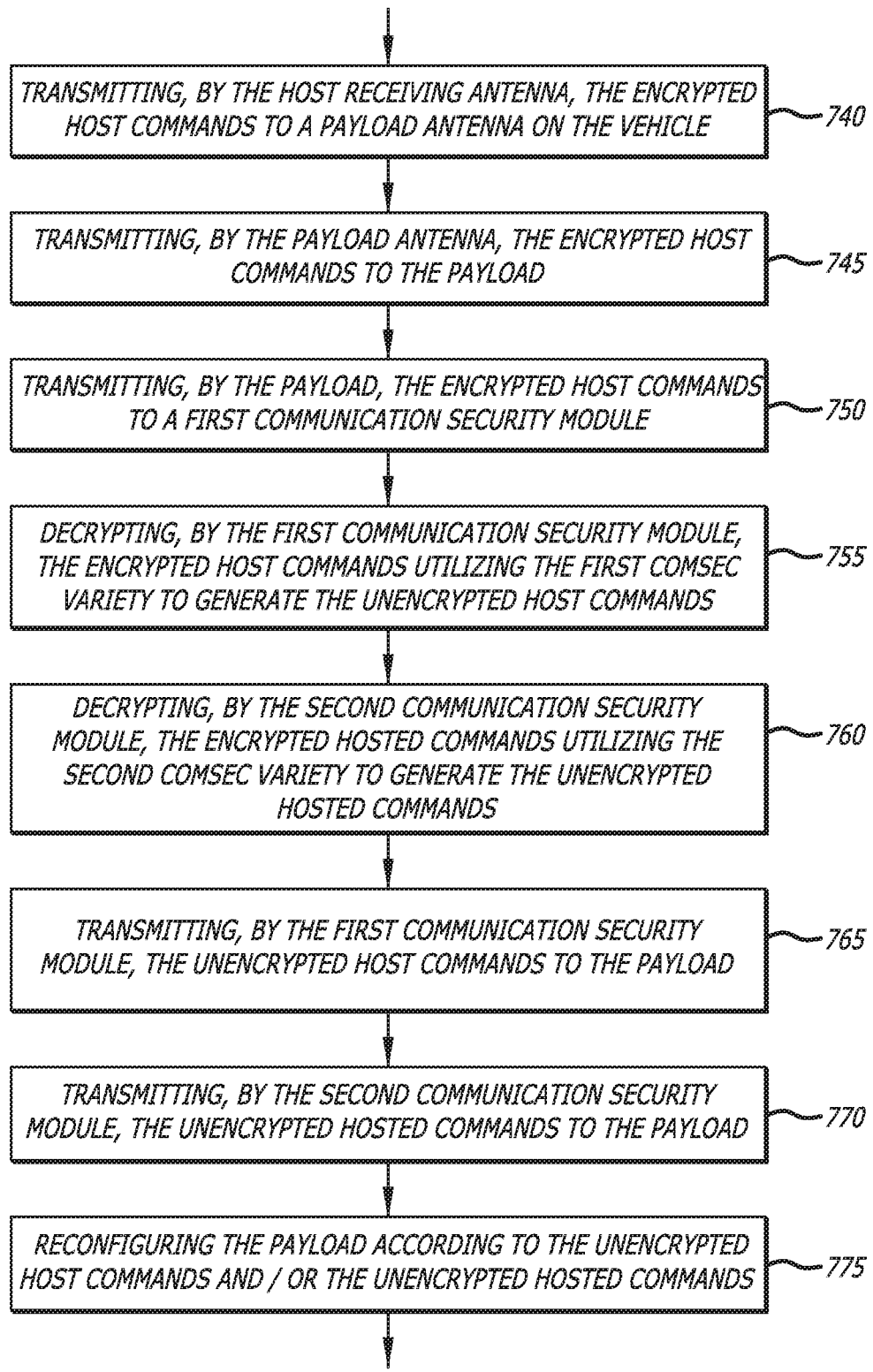
Figure 7C:
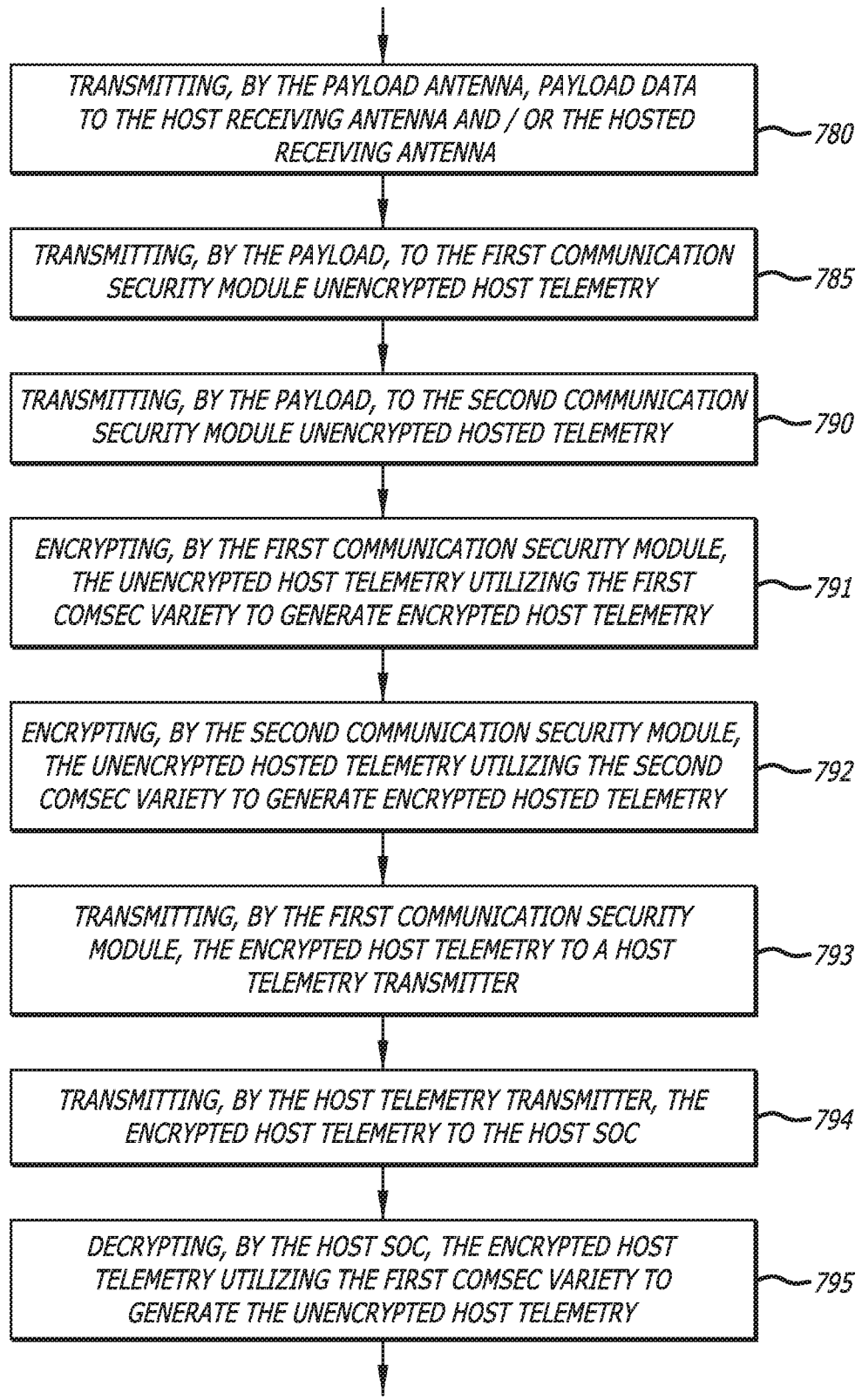
Figure 7D:
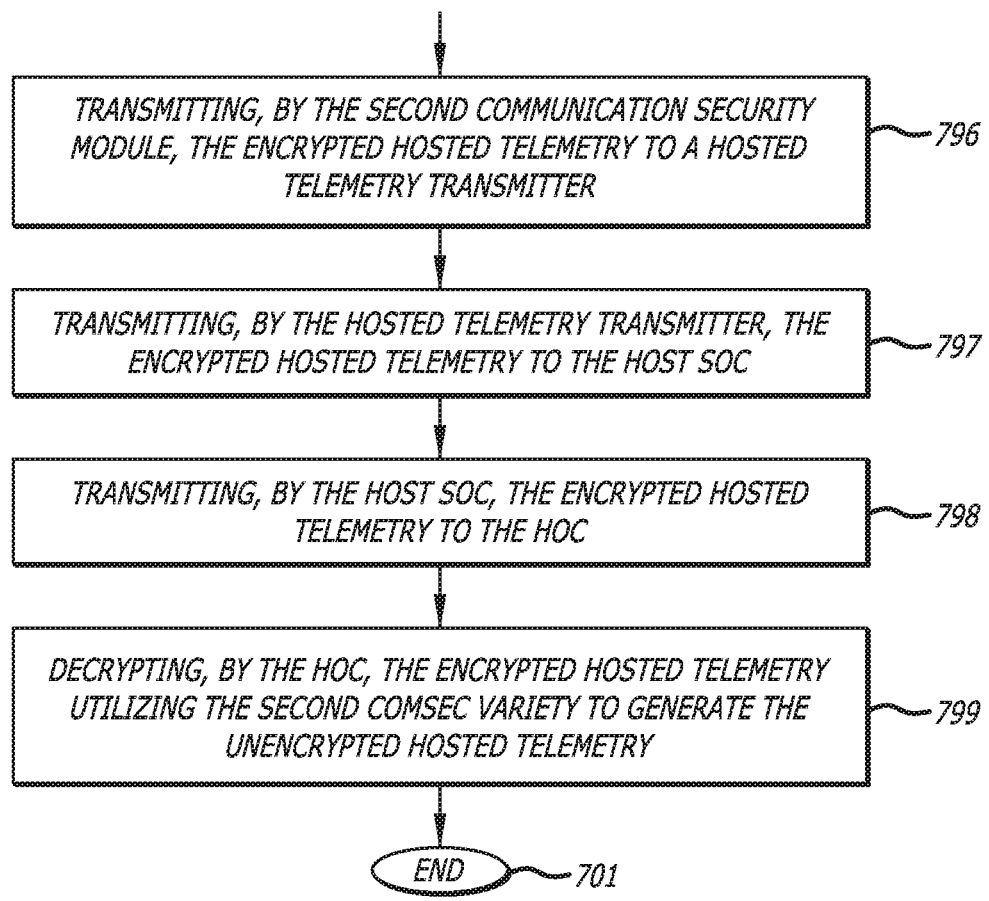
Figure 7E:
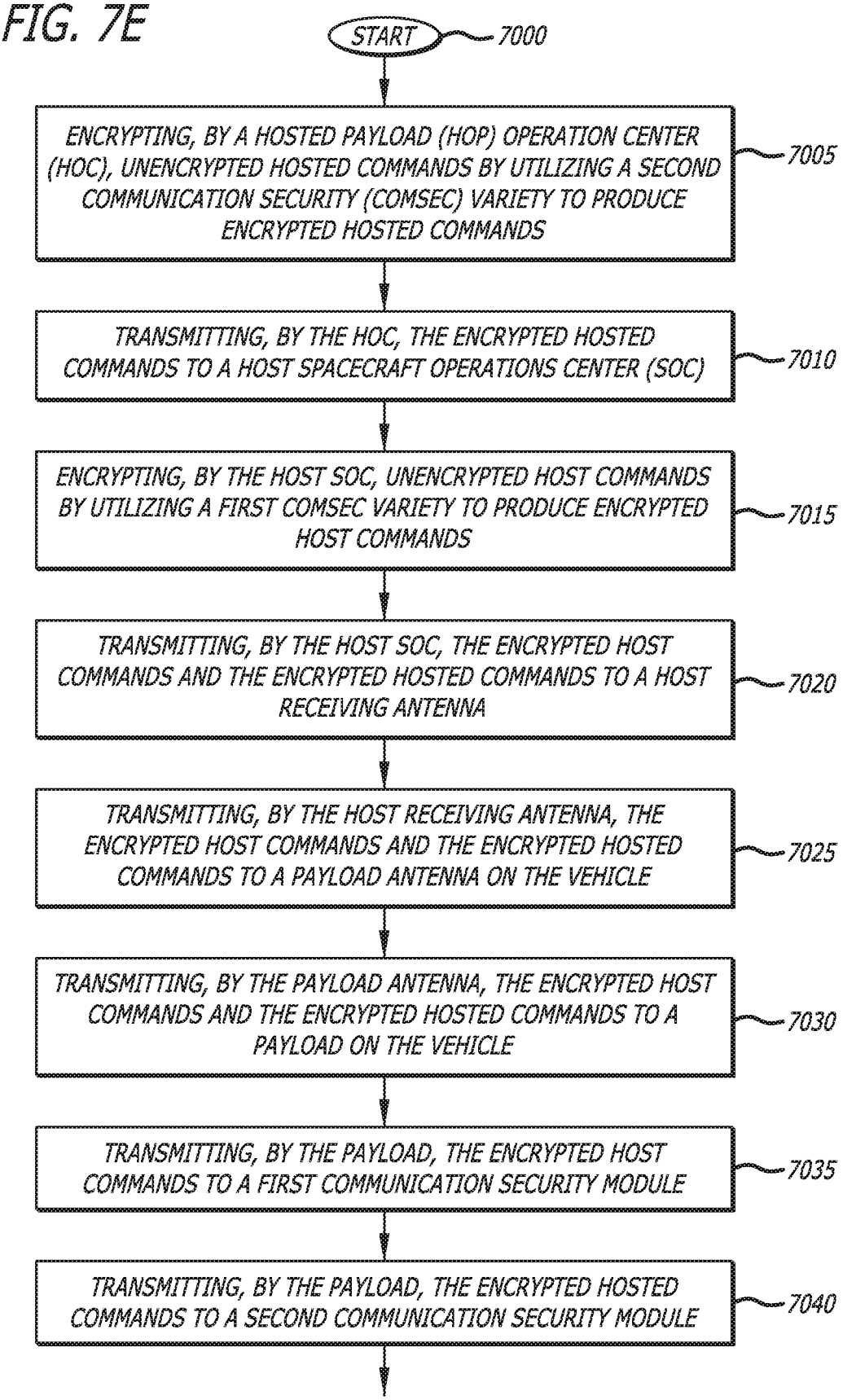
Figure 7F:
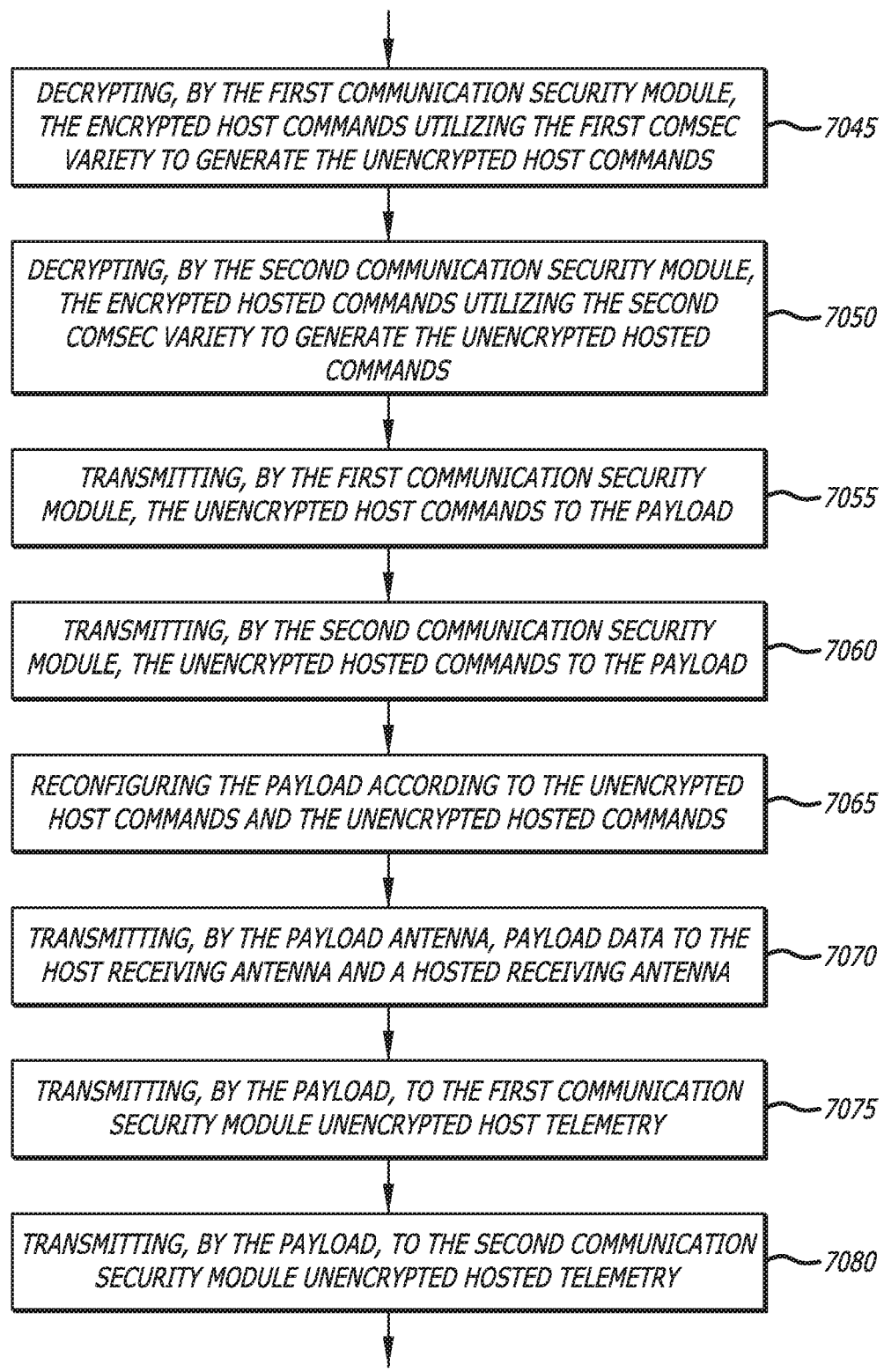
Figure 7G:
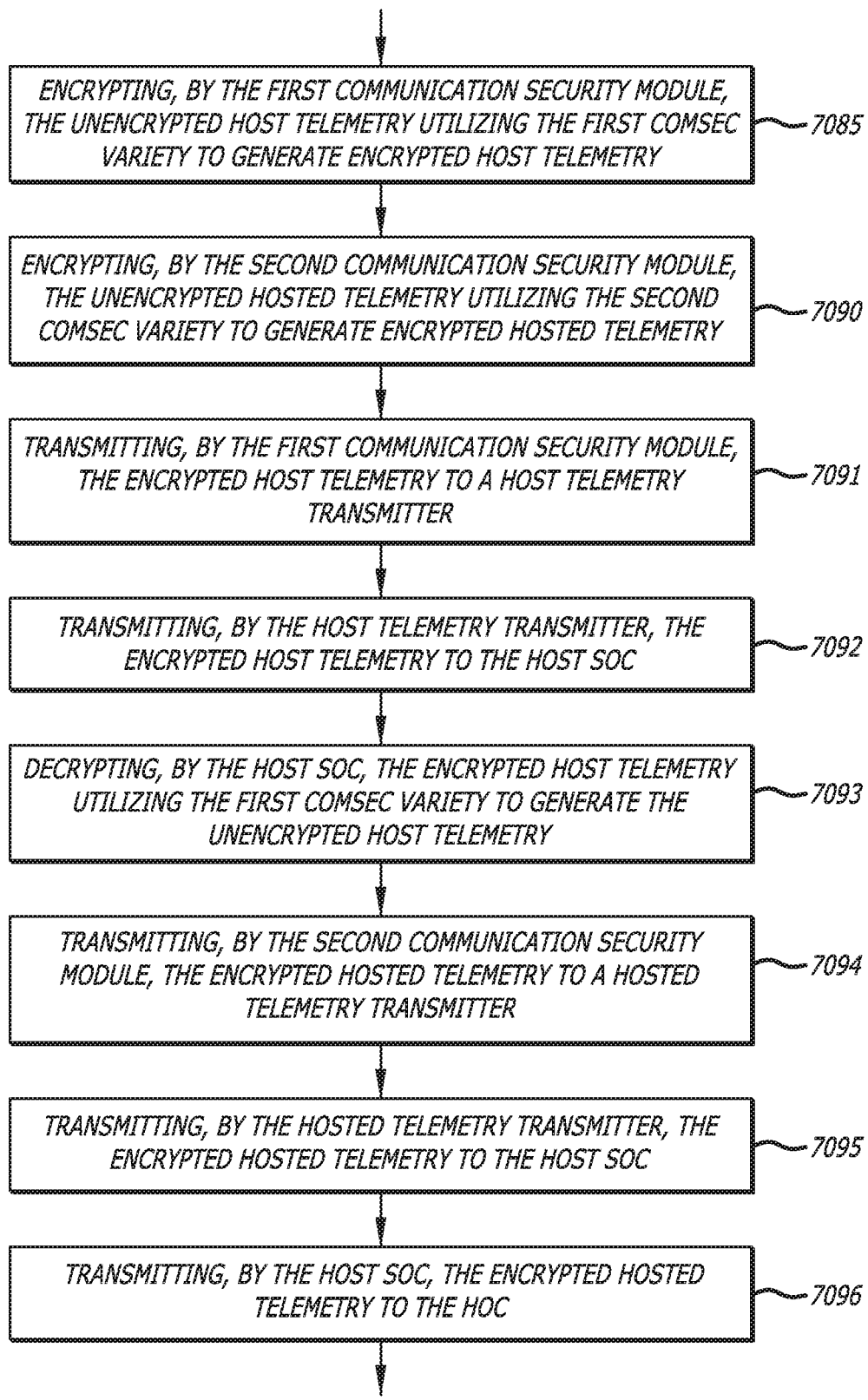
Figure 7H:
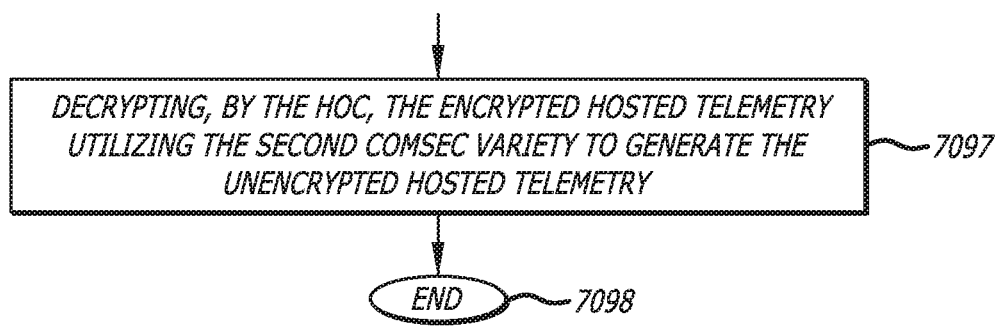

FIG. 6B is a diagram showing the disclosed system for a virtual transponder utilizing inband commanding for the host user and the hosted user using one receiving antenna and employing two communication security (COMSEC) varieties for telemetry, in accordance with at least one embodiment of the present disclosure.

FIGS. 7A, 7B, 7C, and 7D together show a flow chart for the disclosed method for a virtual transponder utilizing inband commanding for the host user and the hosted user using two receiving antennas and employing two COMSEC varieties for telemetry, in accordance with at least one embodiment of the present disclosure.

FIGS. 7E, 7F, 7G, and 7H together show a flow chart for the disclosed method for a virtual transponder utilizing inband commanding for the host user and the hosted user using one receiving antenna and employing two communication security (COMSEC) varieties for telemetry, in accordance with at least one embodiment of the present disclosure.

Figure 8A:
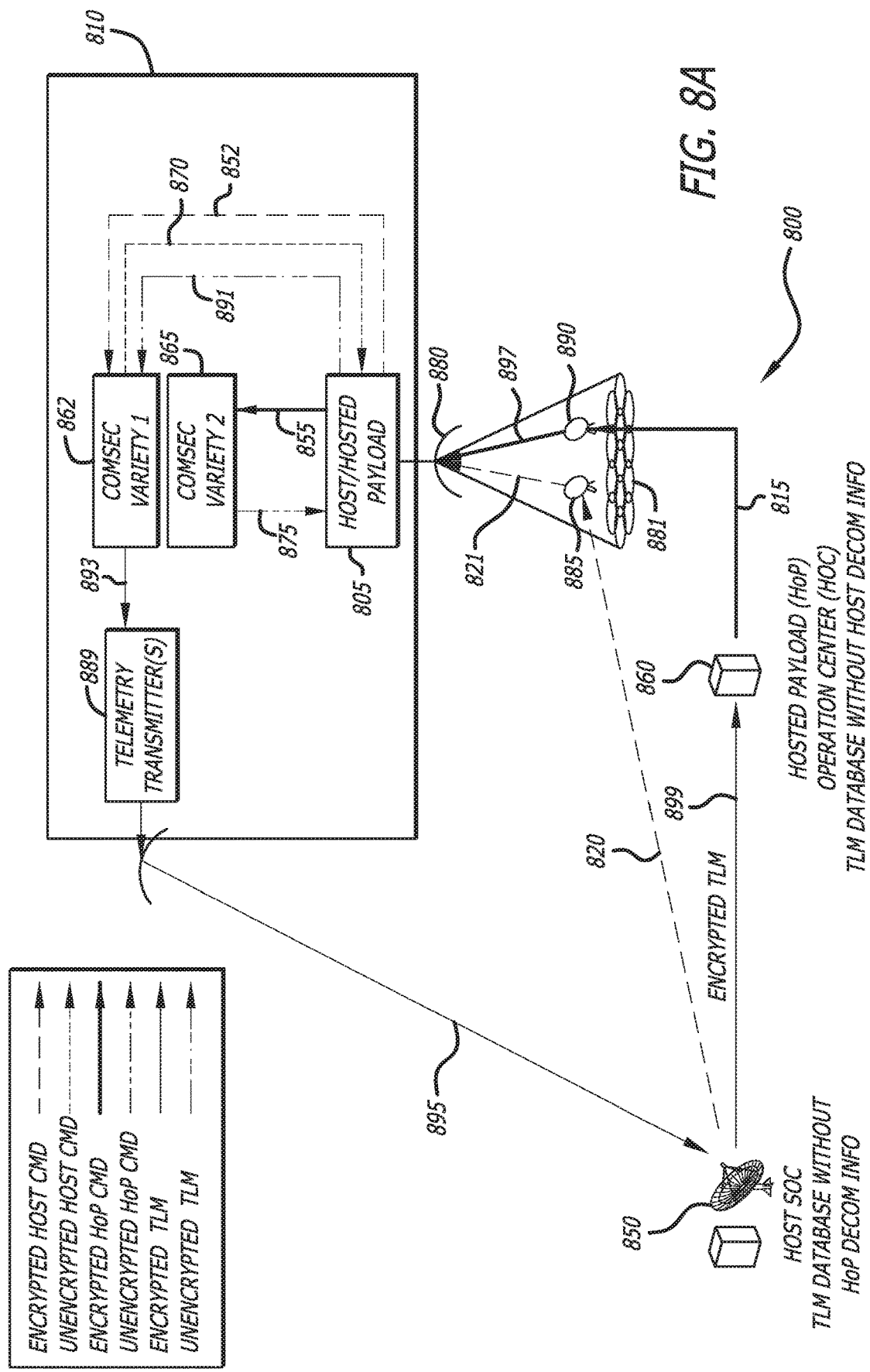

FIG. 8A is a diagram showing the disclosed system for a virtual transponder utilizing inband commanding for the host user and the hosted user using two receiving antennas and employing one COMSEC variety for telemetry, in accordance with at least one embodiment of the present disclosure.

Figure 8B:
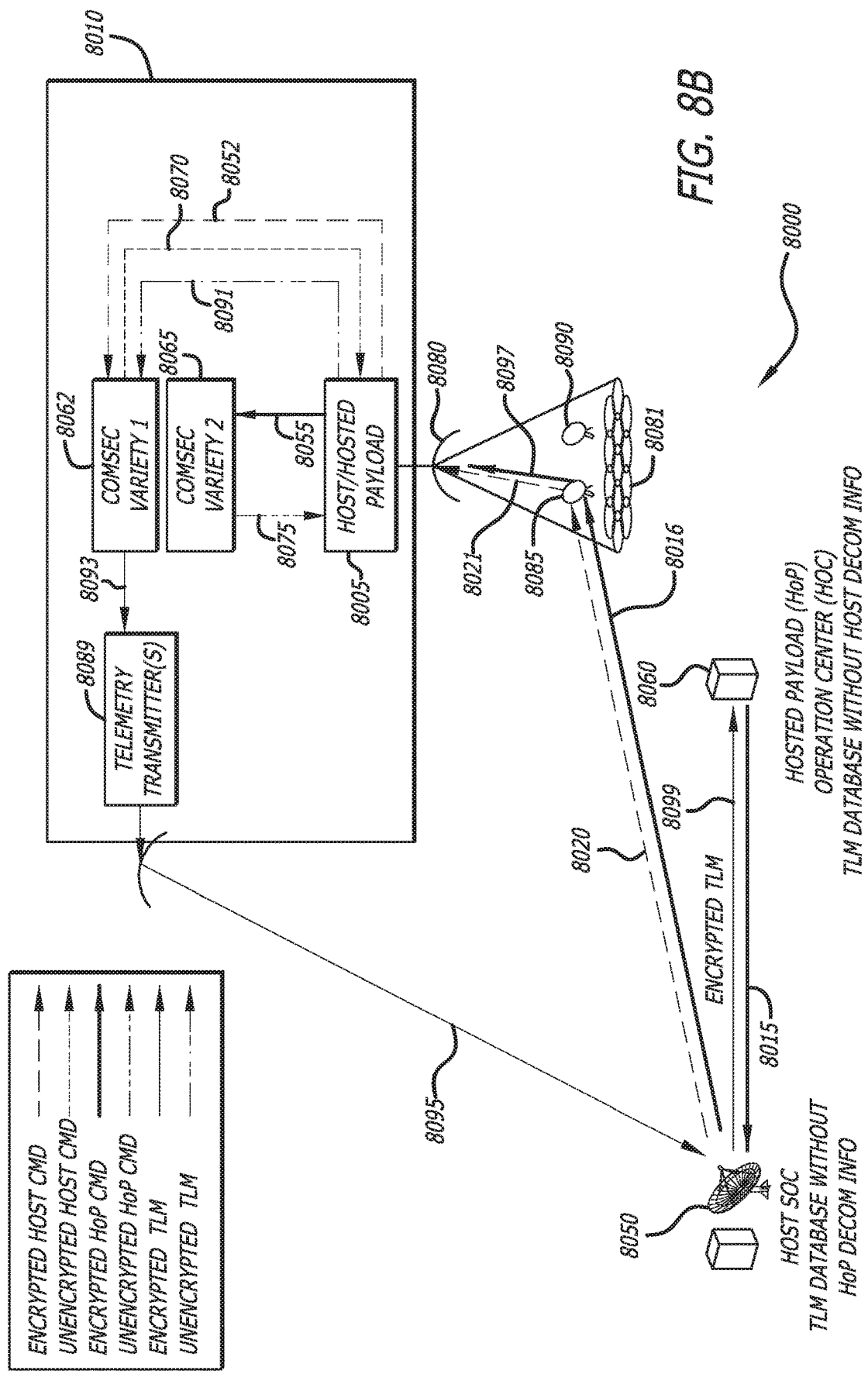
Figure 9A:
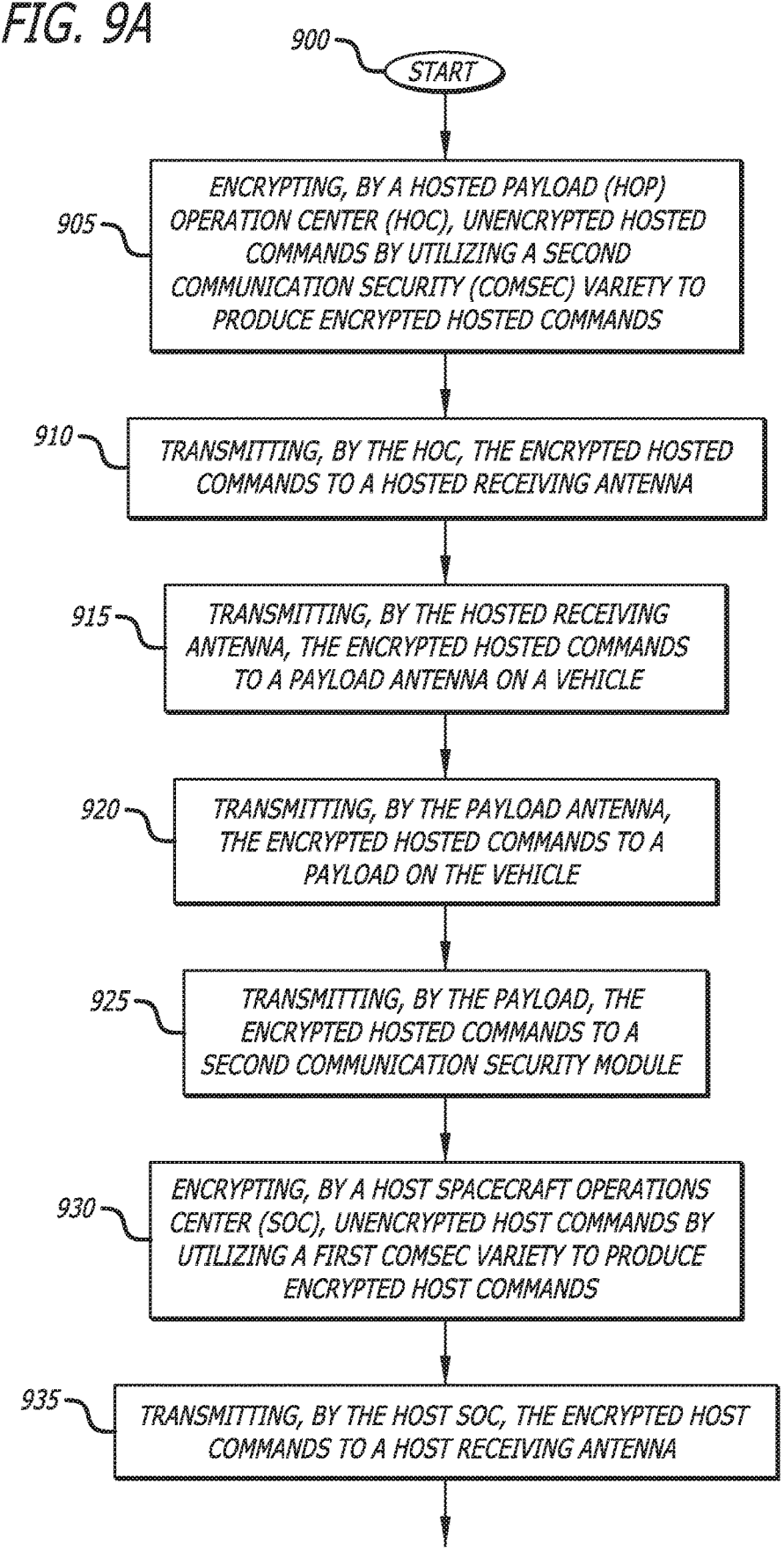
Figure 9B:
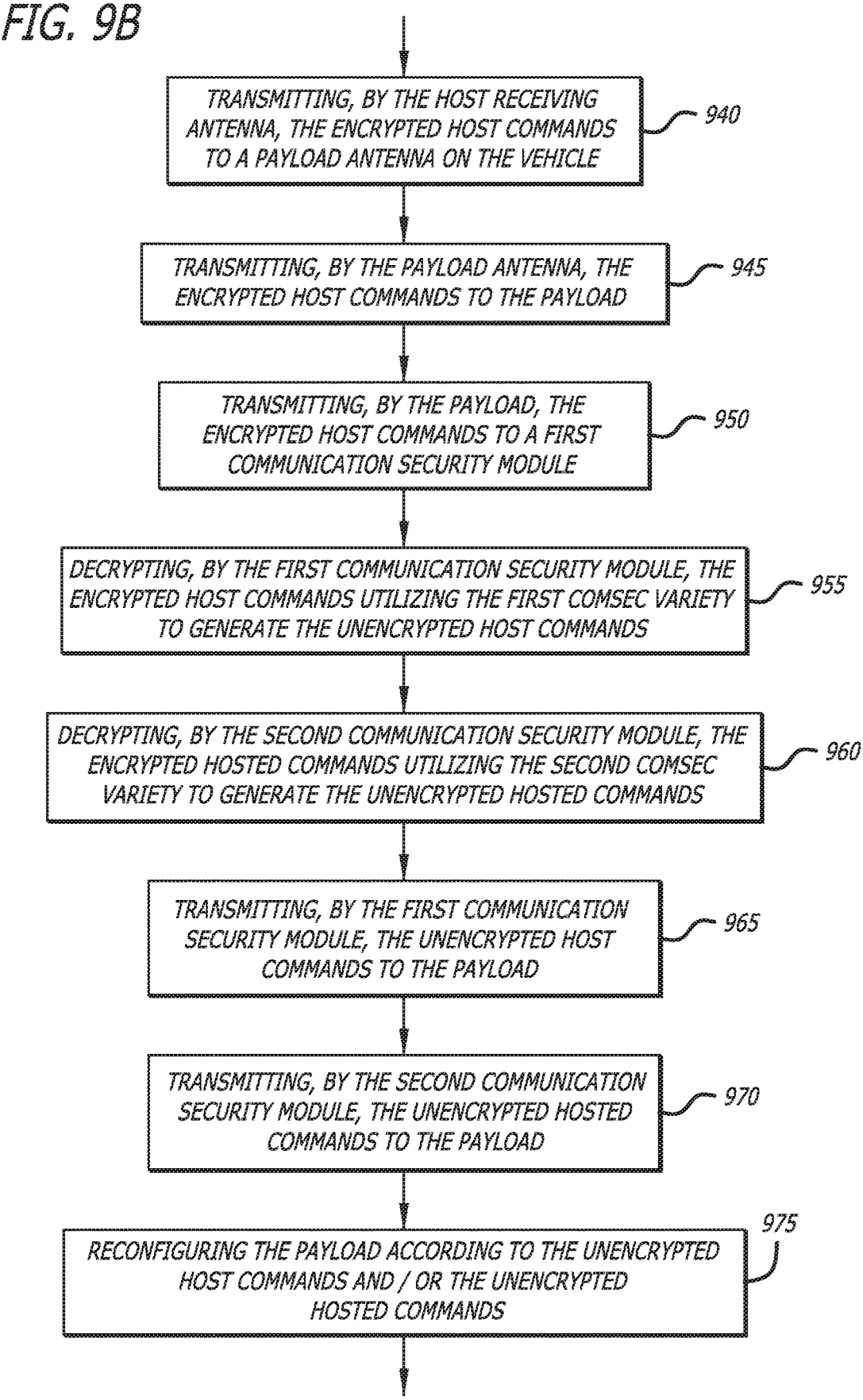
Figure 9C:
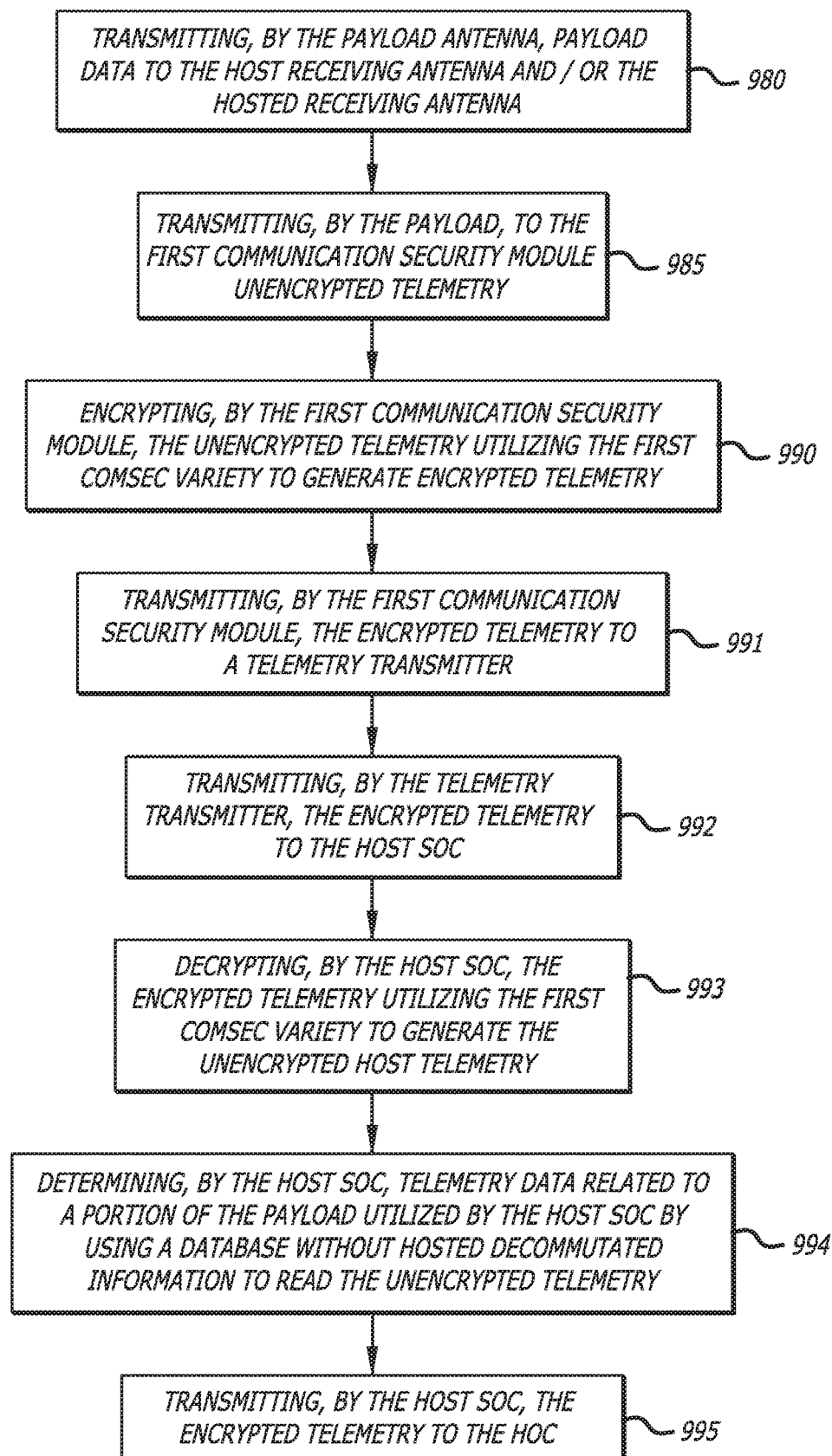
Figure 9D:
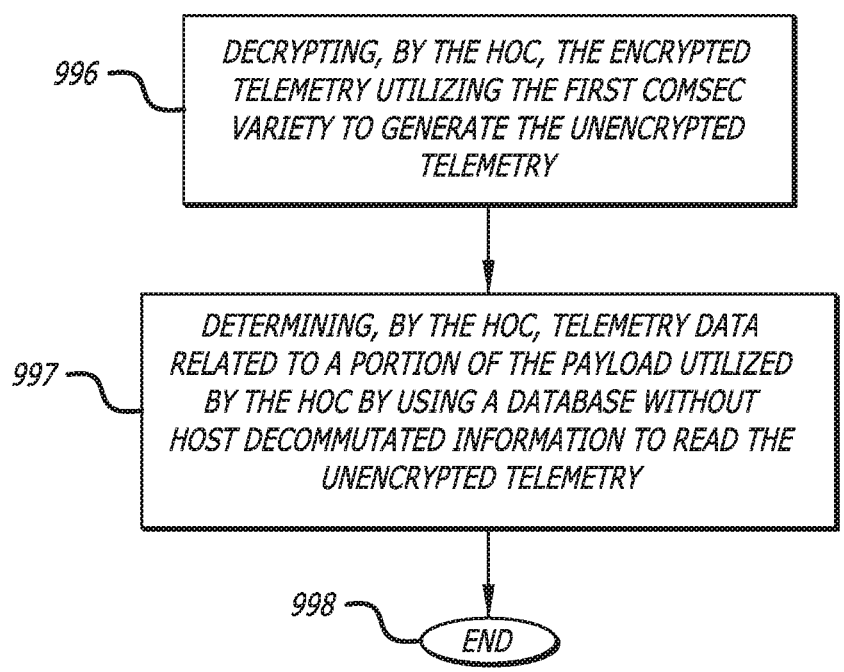
Figure 9E:
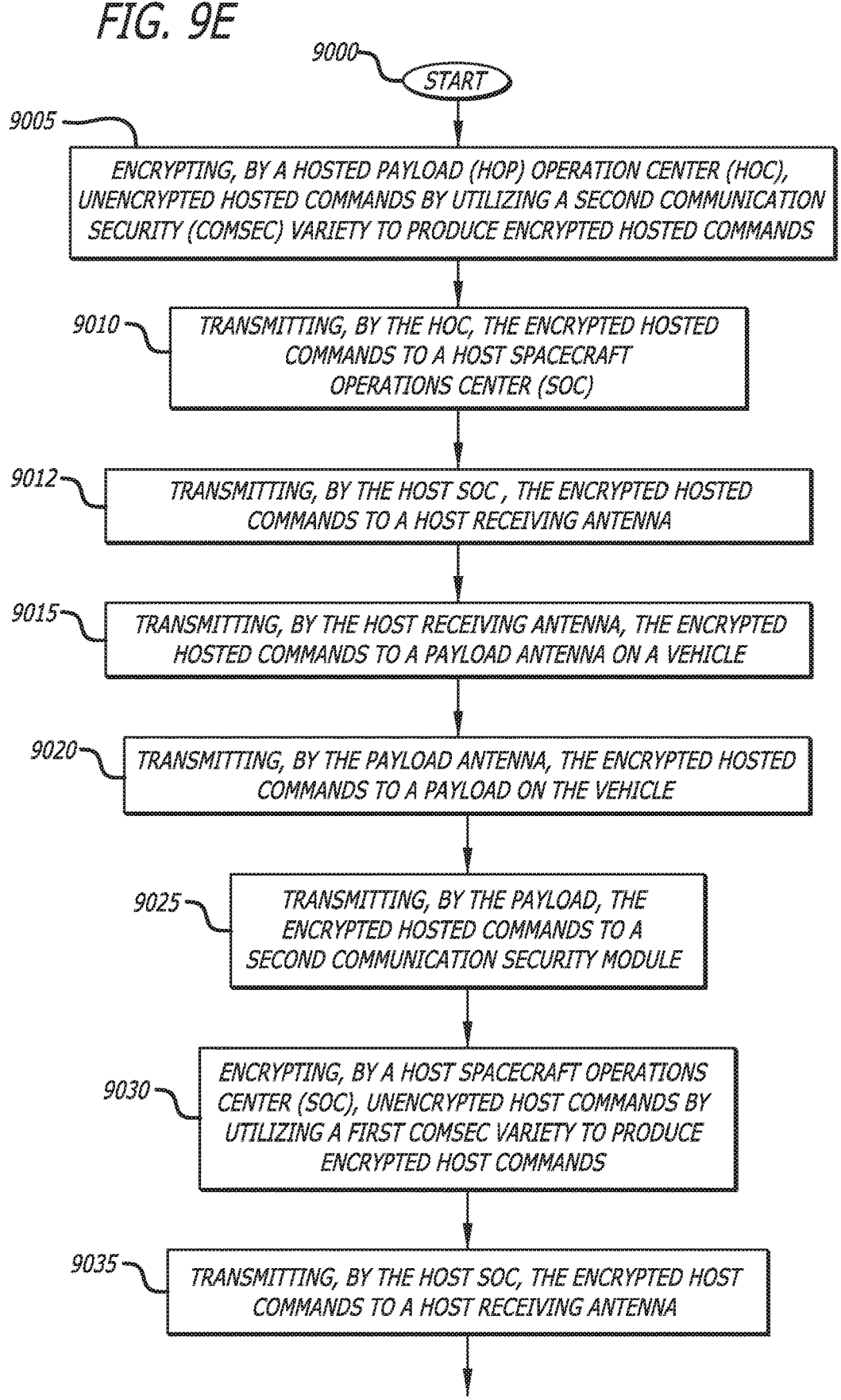
Figure 9F:
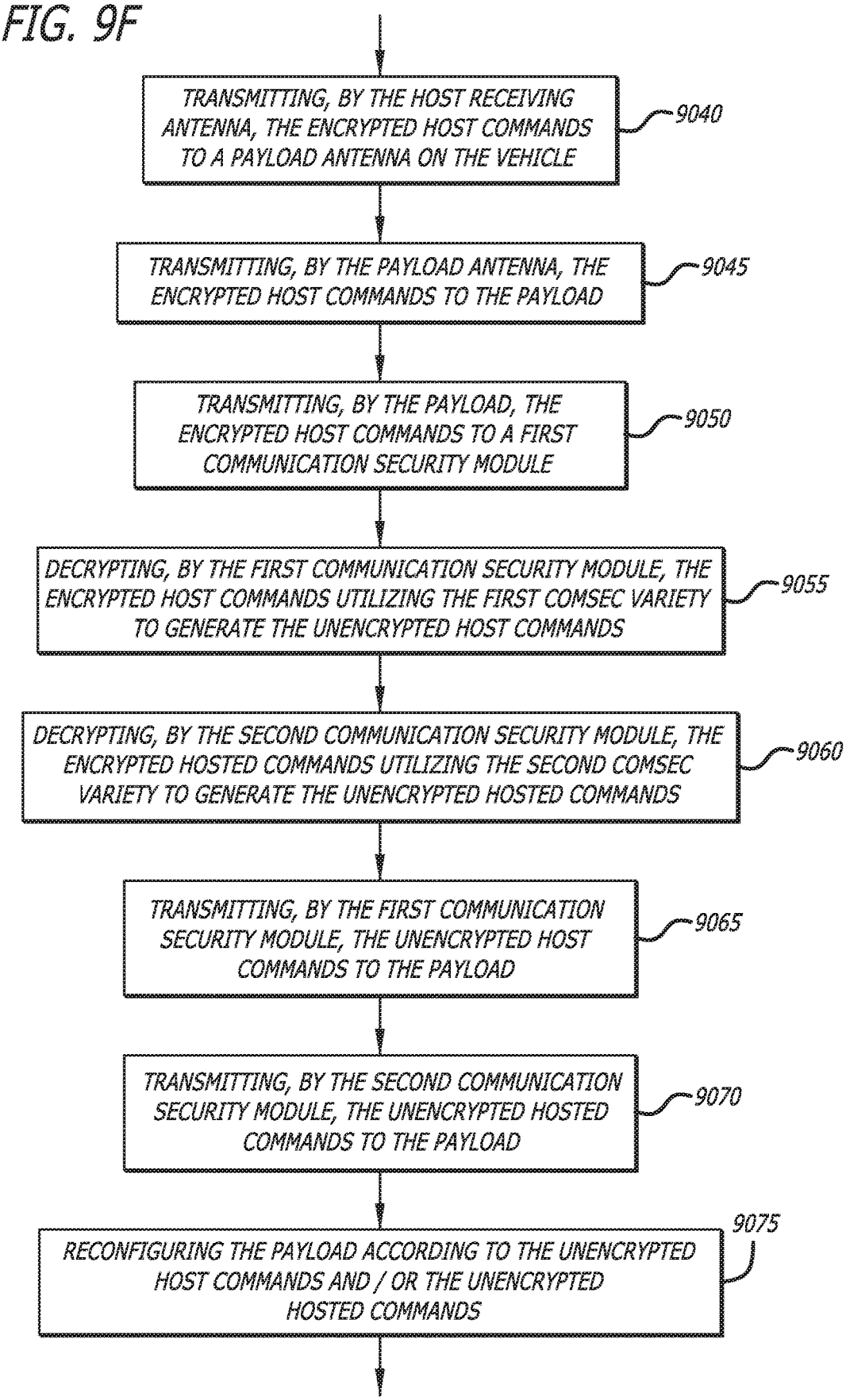
Figure 9G:
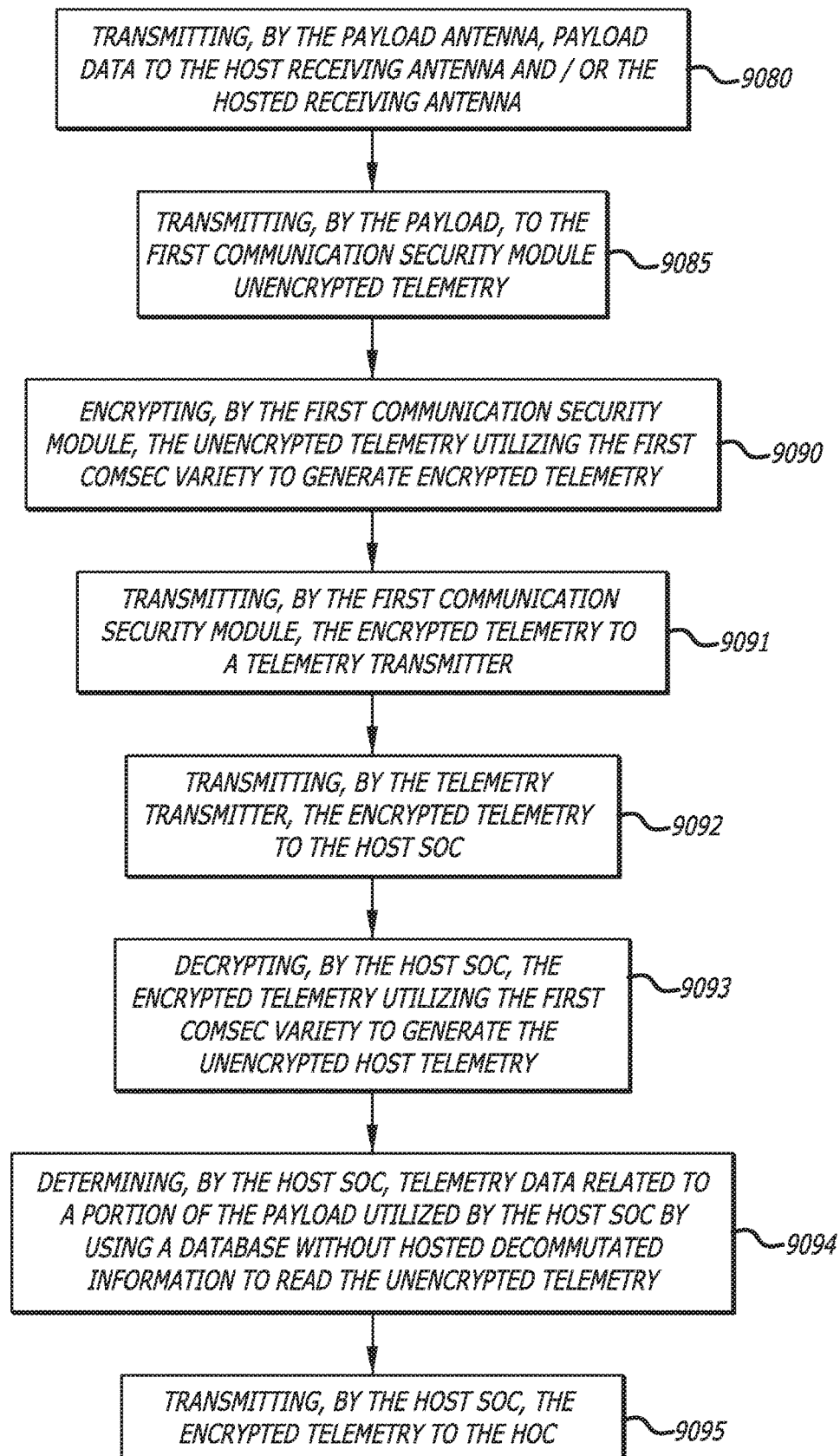
Figure 9H:
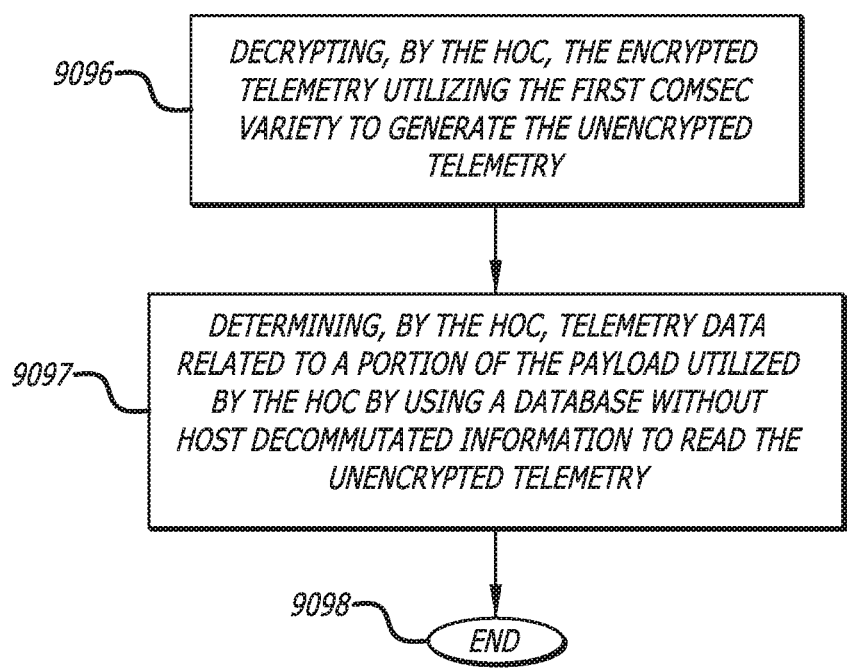

FIG. 8B is a diagram showing the disclosed system for a virtual transponder utilizing inband commanding for the host user and the hosted user using one receiving antenna and employing one COMSEC variety for telemetry, in accordance with at least one embodiment of the present disclosure.

FIGS. 9A, 9B, 9C, and 9D together show a flow chart for the disclosed method for a virtual transponder utilizing inband commanding for the host user and the hosted user using two receiving antennas and employing one COMSEC variety for telemetry, in accordance with at least one embodiment of the present disclosure.

FIGS. 9E, 9F, 9G, and 9H together show a flow chart for the disclosed method for a virtual transponder utilizing inband commanding for the host user and the hosted user using one receiving antenna and employing one COMSEC variety for telemetry, in accordance with at least one embodiment of the present disclosure.

Figure 10A:
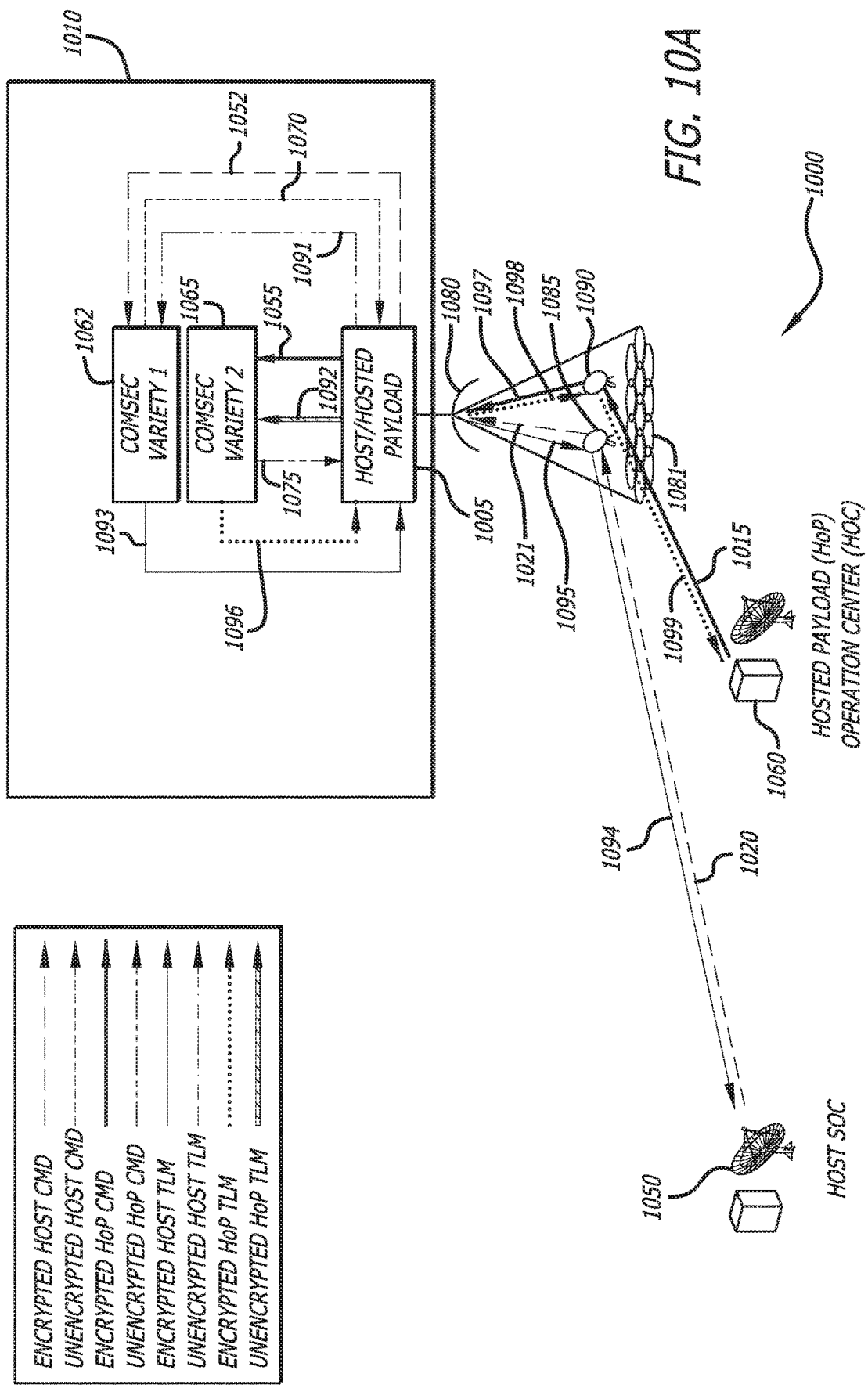

FIG. 10A is a diagram showing the disclosed system for a virtual transponder utilizing inband telemetry and commanding for the host user and the hosted user using two receiving antennas and employing two COMSEC varieties for telemetry, in accordance with at least one embodiment of the present disclosure.

Figure 10B:
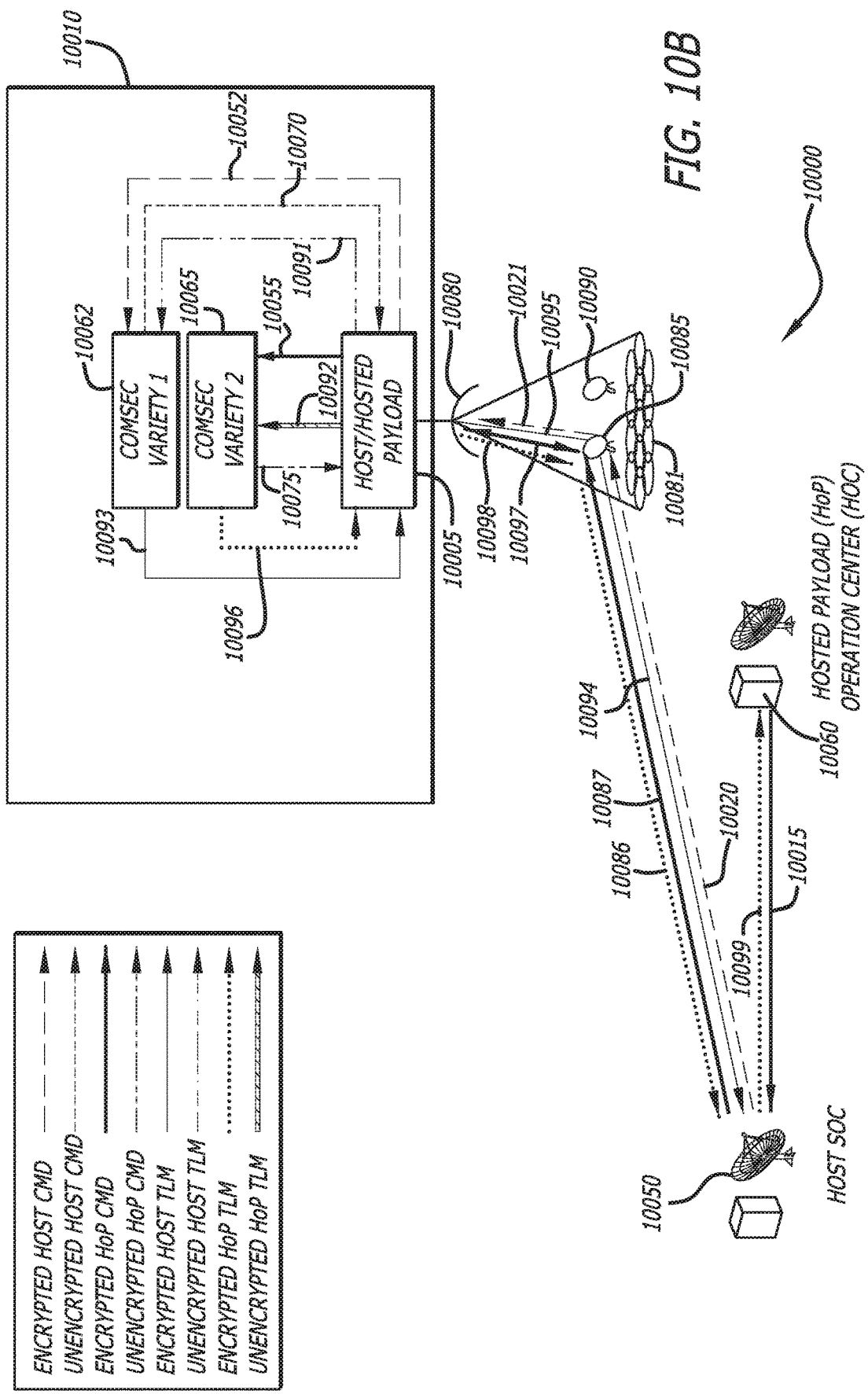
Figure 11A:
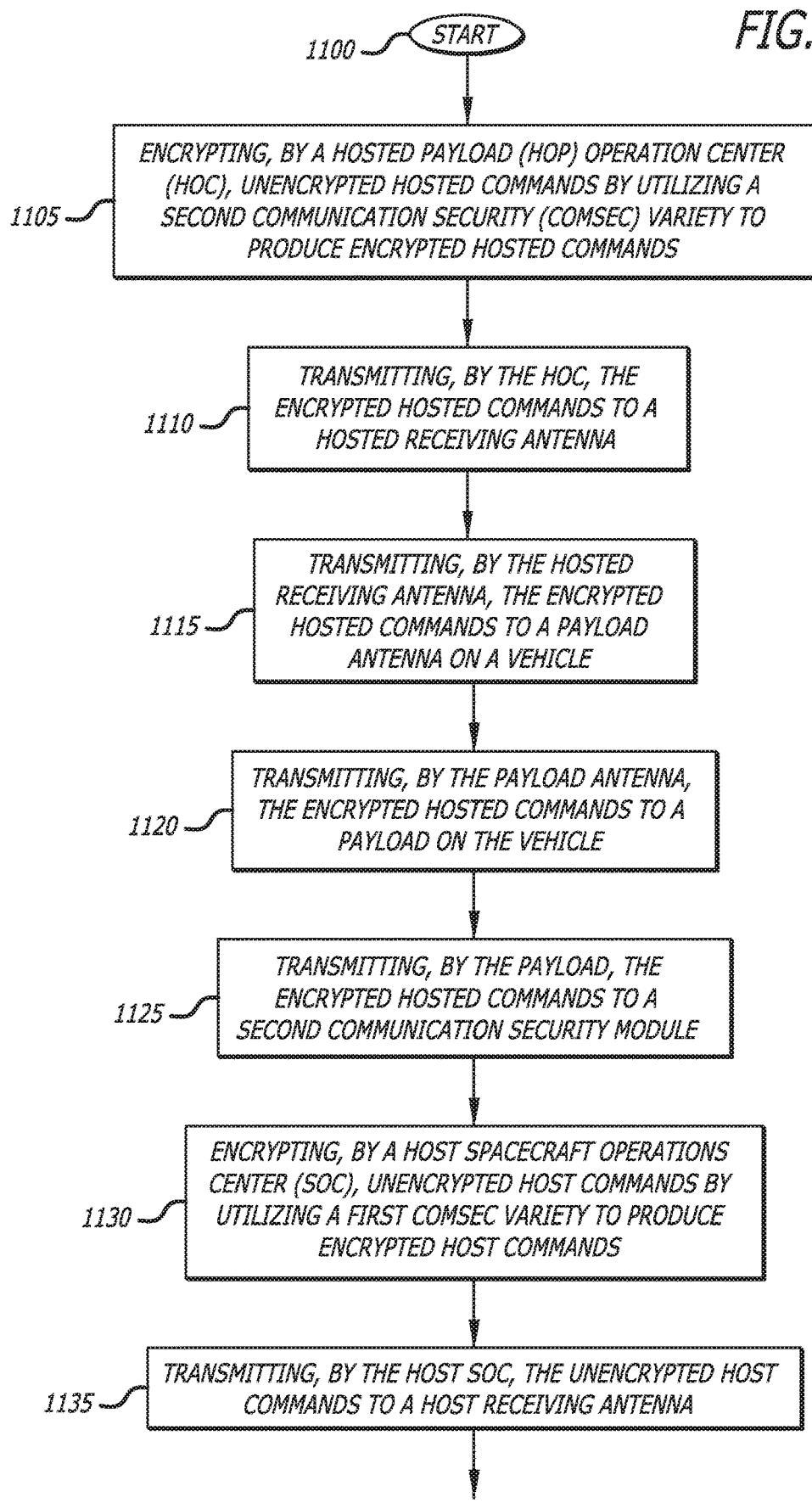
Figure 11B:
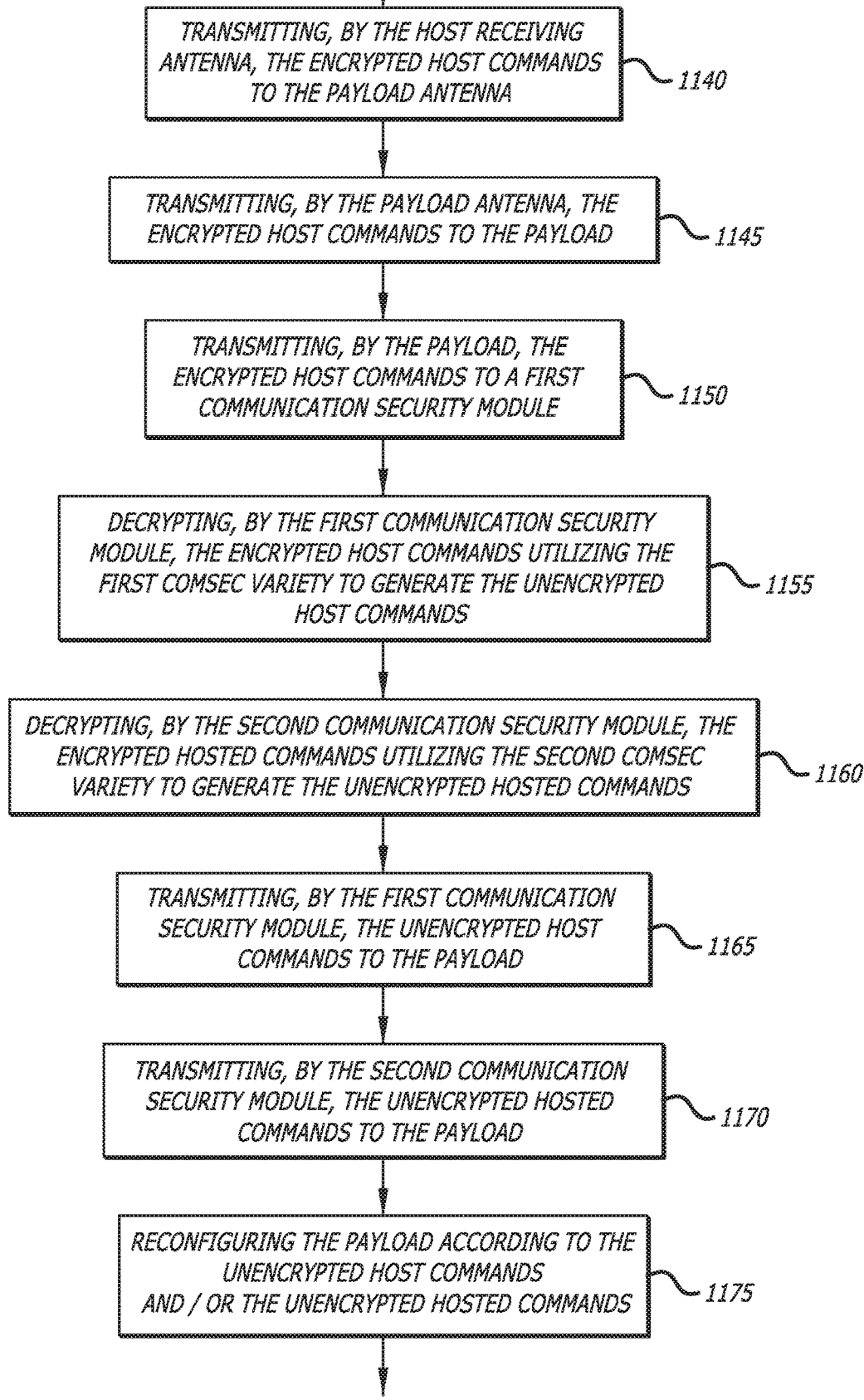
Figure 11C:
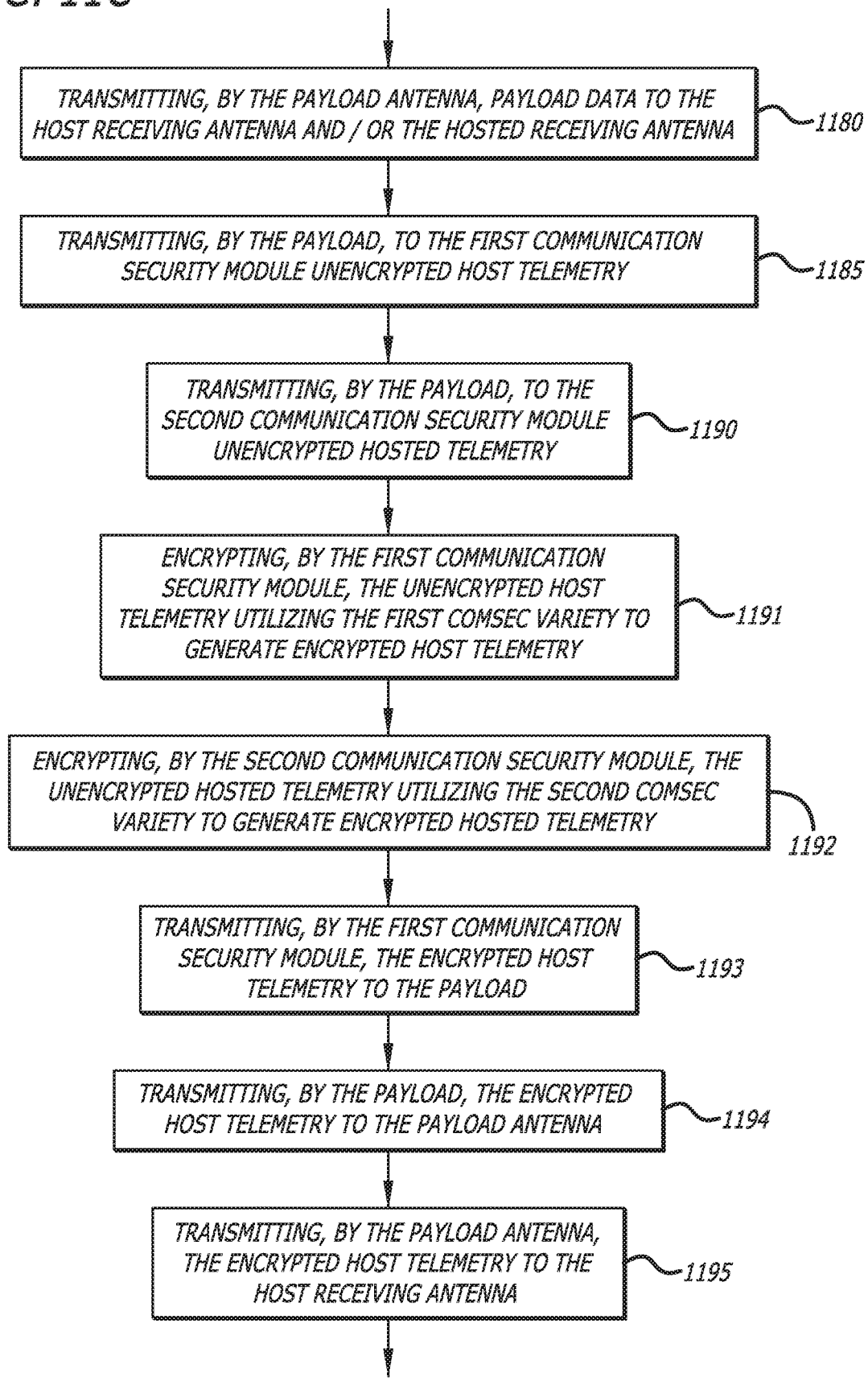
Figure 11D:
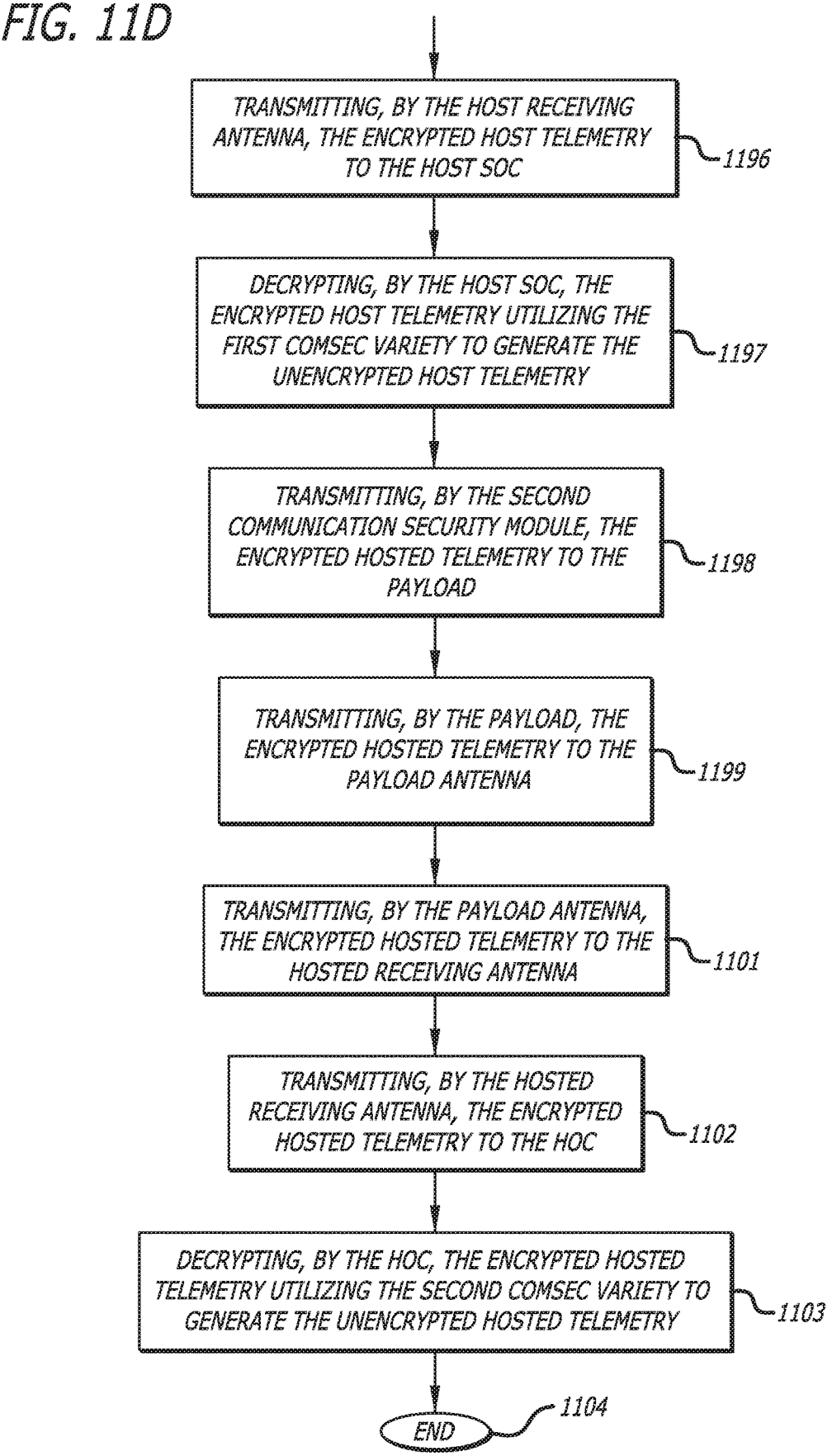
Figure 11E:
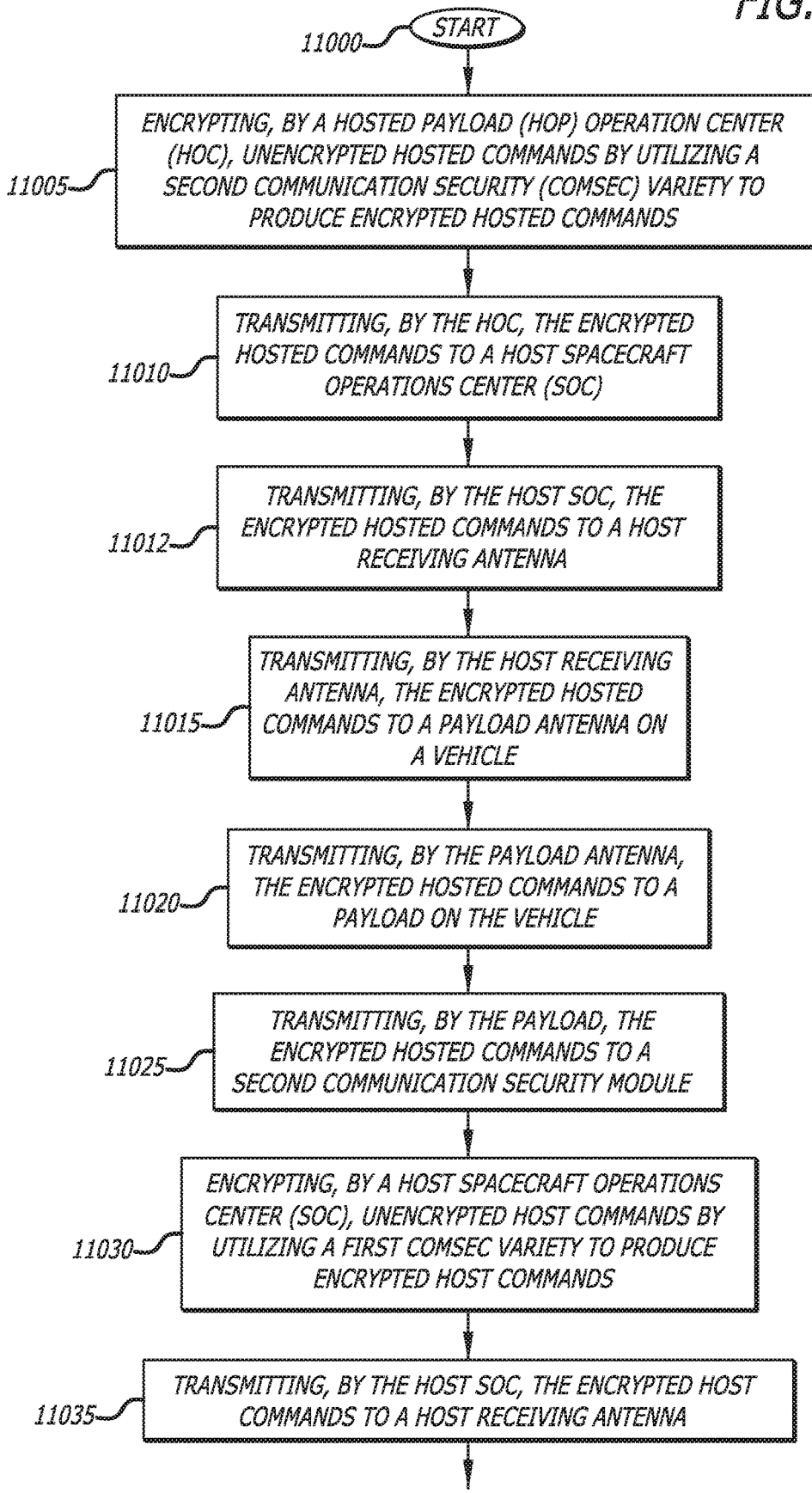
Figure 11F:
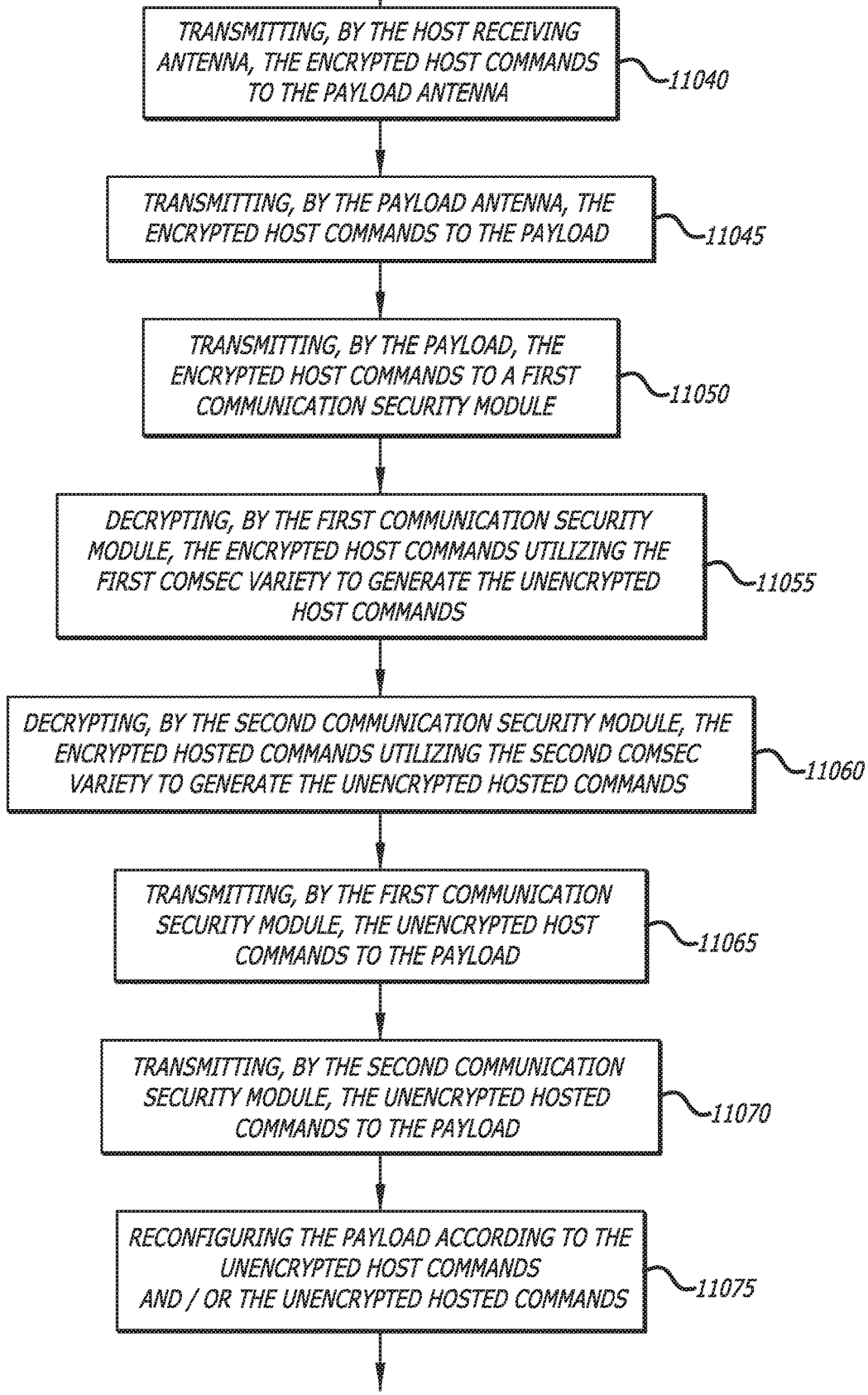
Figure 11G:
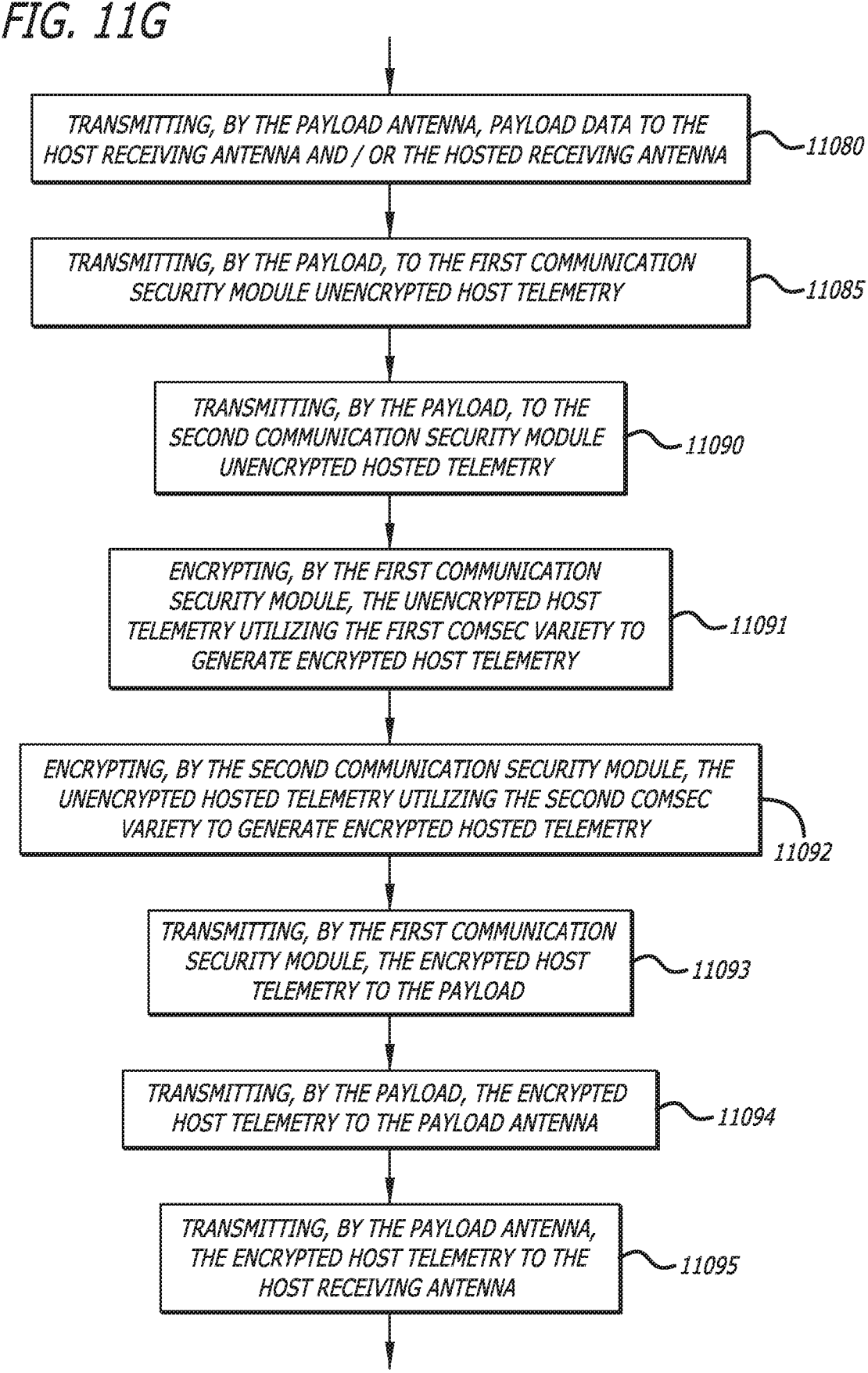
Figure 11H:
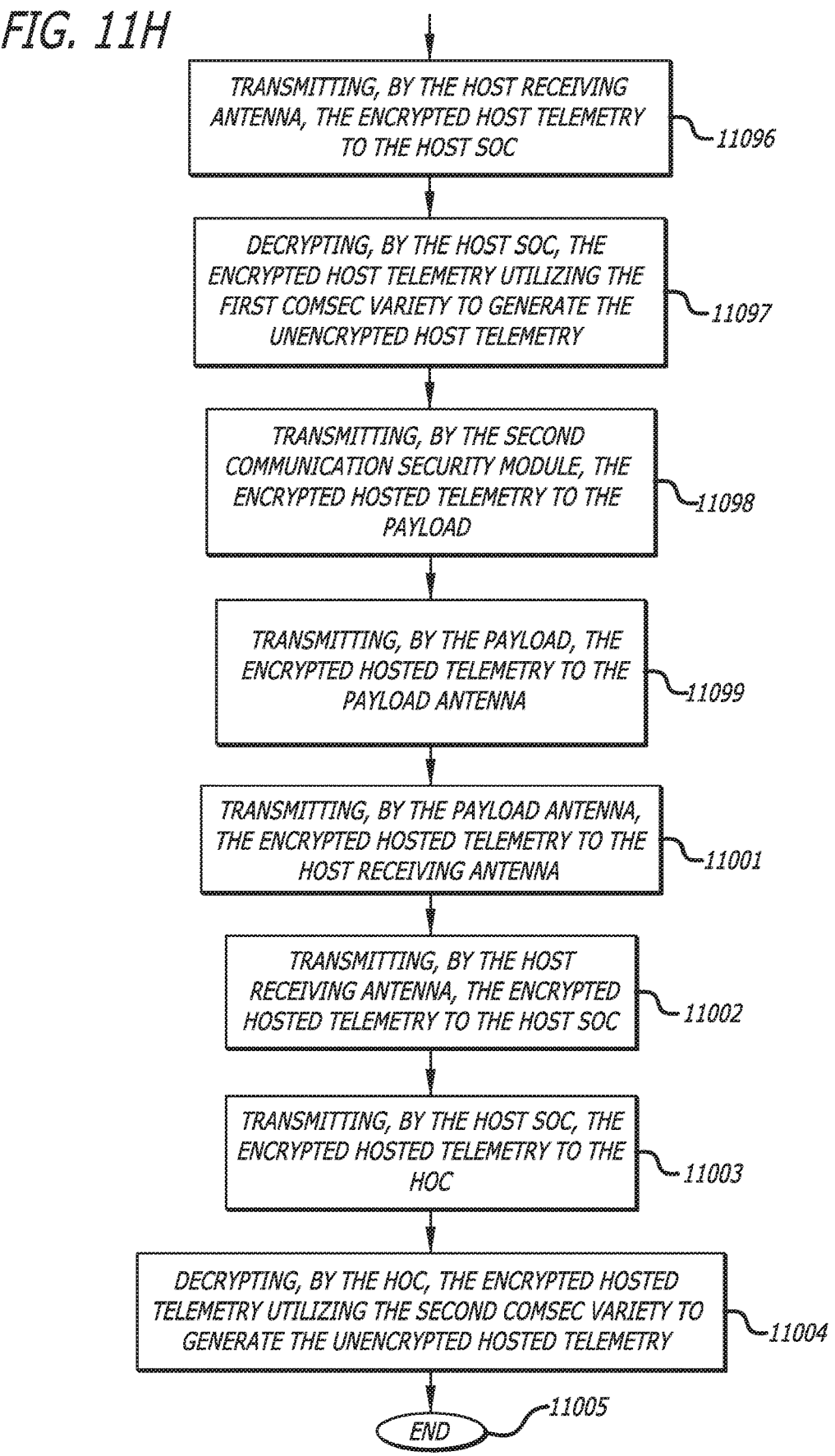

FIG. 10B is a diagram showing the disclosed system for a virtual transponder utilizing inband telemetry and commanding for the host user and the hosted user using one receiving antenna and employing two COMSEC varieties for telemetry, in accordance with at least one embodiment of the present disclosure.

FIGS. 11A, 11B, 11C, and 11D together show a flow chart for the disclosed method for a virtual transponder utilizing inband telemetry and commanding for the host user and the hosted user using two receiving antennas and employing two COMSEC varieties for telemetry, in accordance with at least one embodiment of the present disclosure.

FIGS. 11E, 11F, 11G, and 11H together show a flow chart for the disclosed method for a virtual transponder utilizing inband telemetry and commanding for the host user and the hosted user using one receiving antenna and employing two COMSEC varieties for telemetry, in accordance with at least one embodiment of the present disclosure.

Figure 12A:
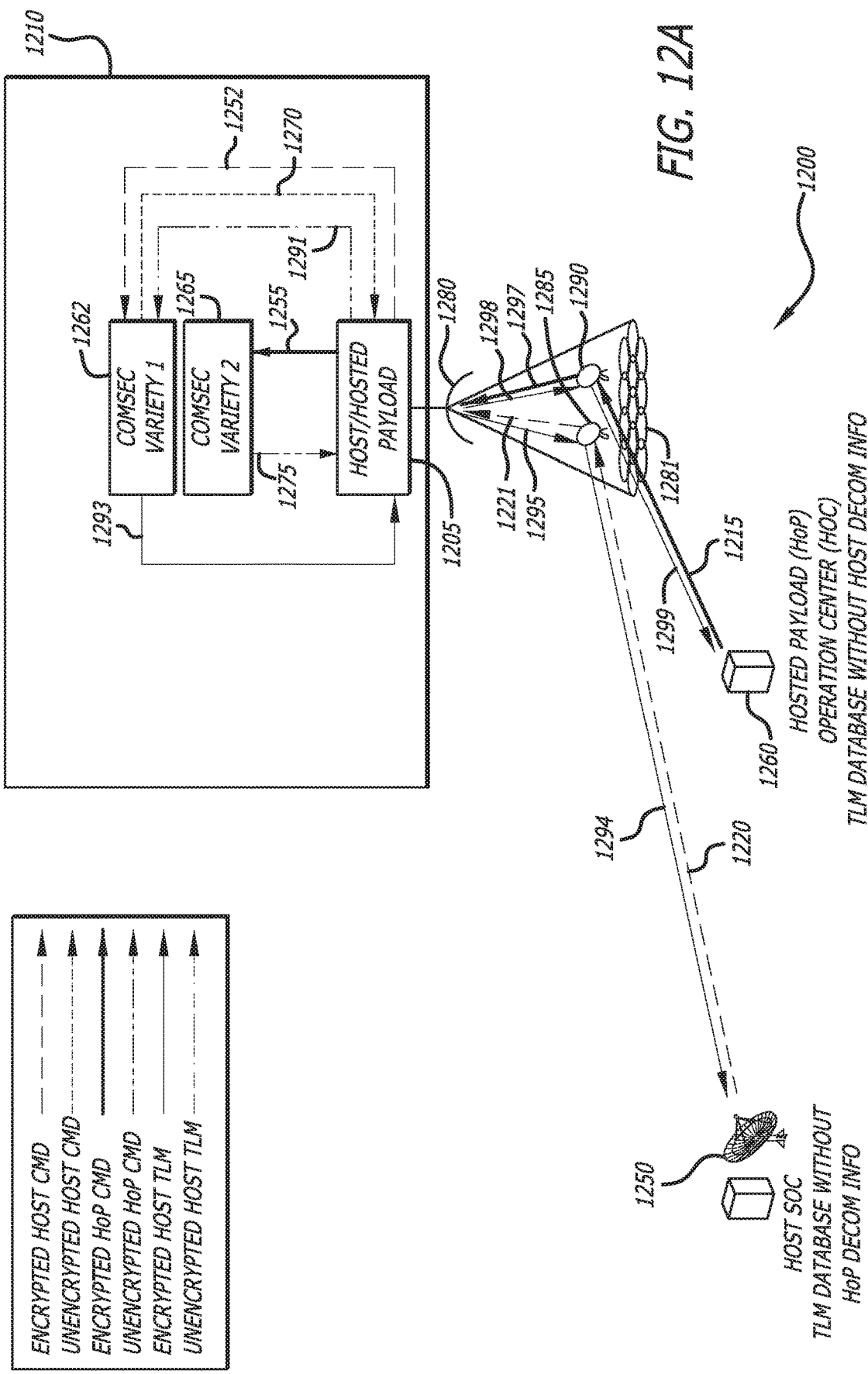

FIG. 12A is a diagram showing the disclosed system for a virtual transponder utilizing inband telemetry and commanding for the host user and the hosted user using two receiving antennas and employing one COMSEC variety for telemetry, in accordance with at least one embodiment of the present disclosure.

Figure 12B:
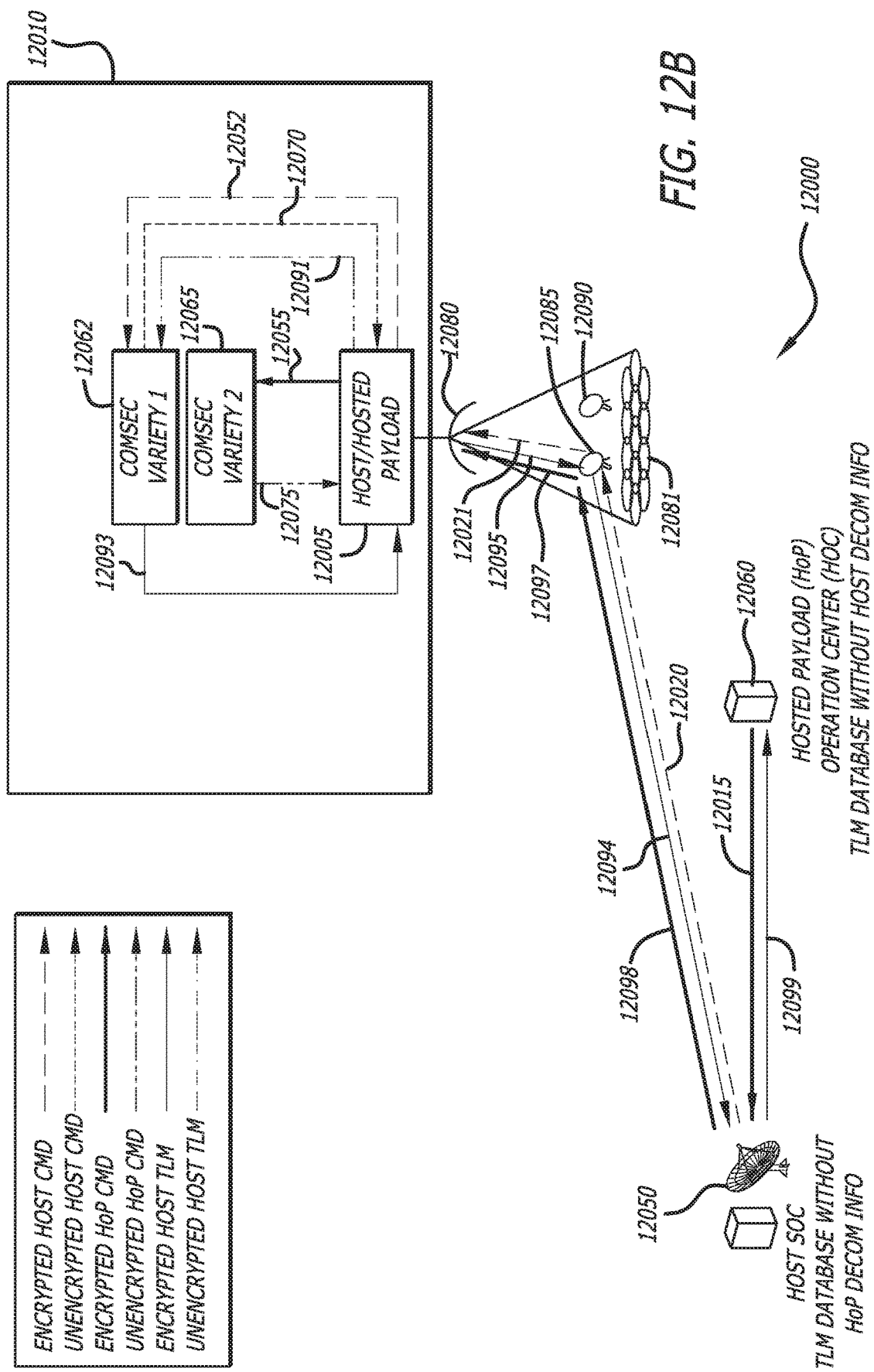
Figure 13A:
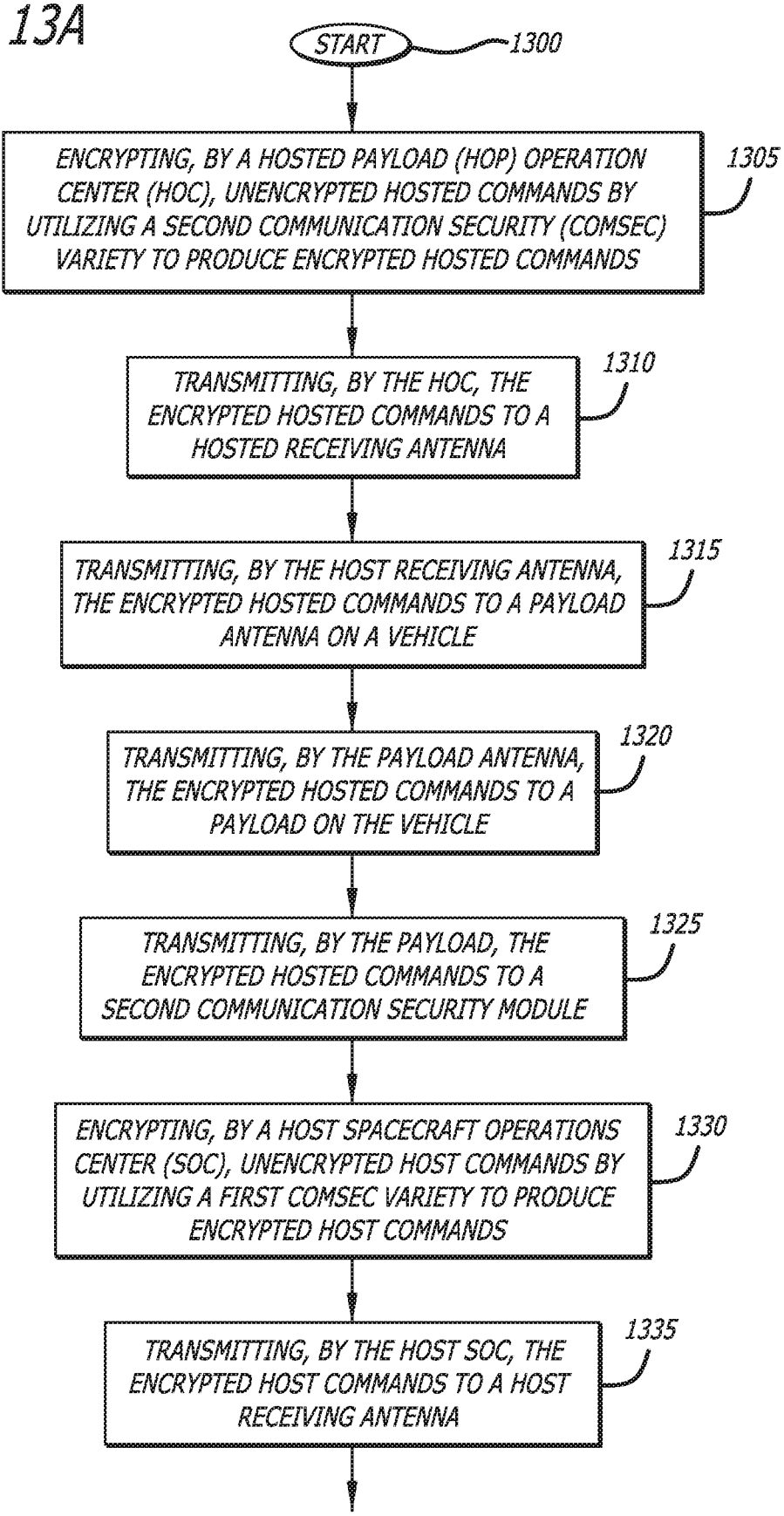
Figure 13B:
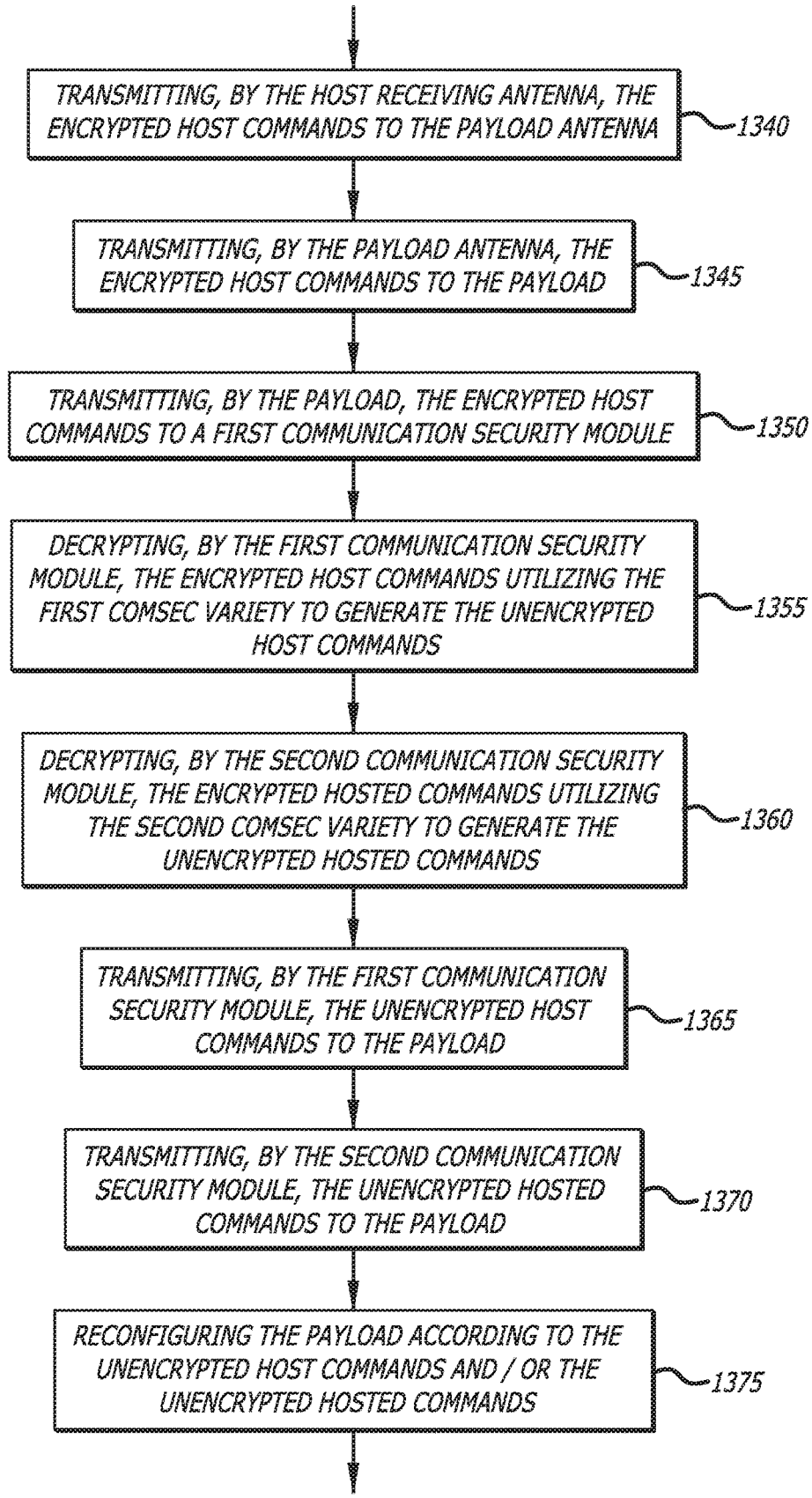
Figure 13C:
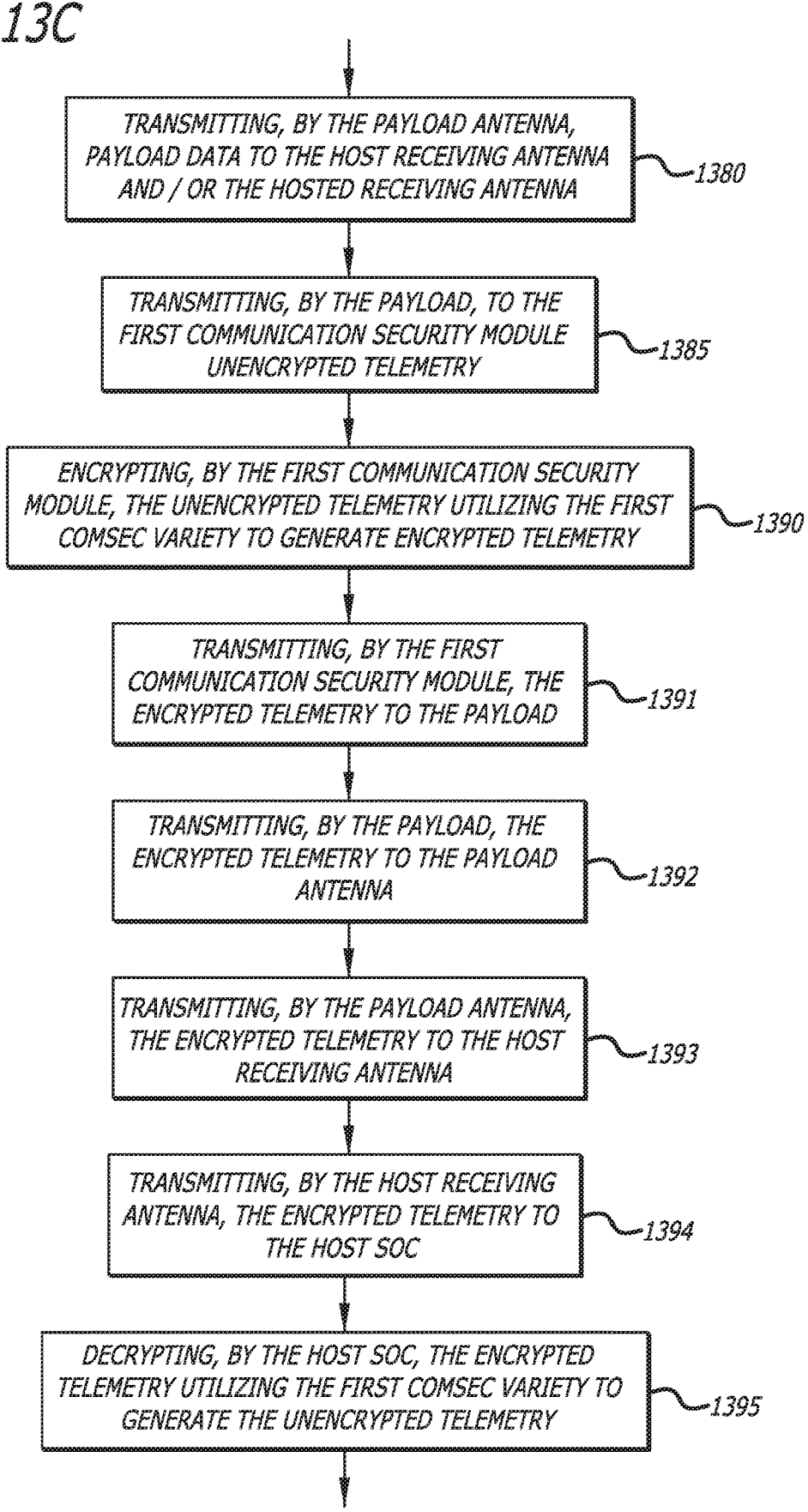
Figure 13D:
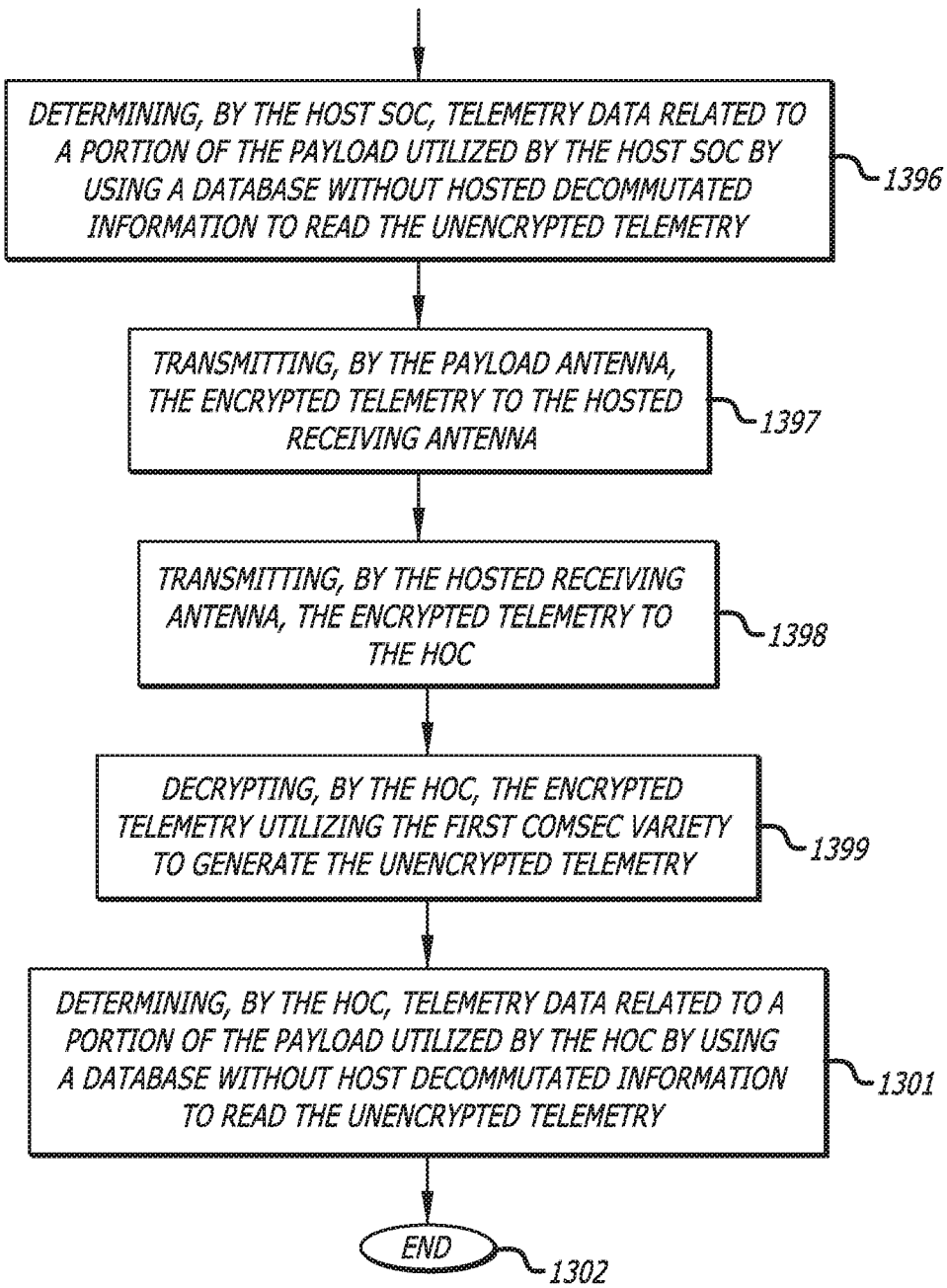
Figure 13E:
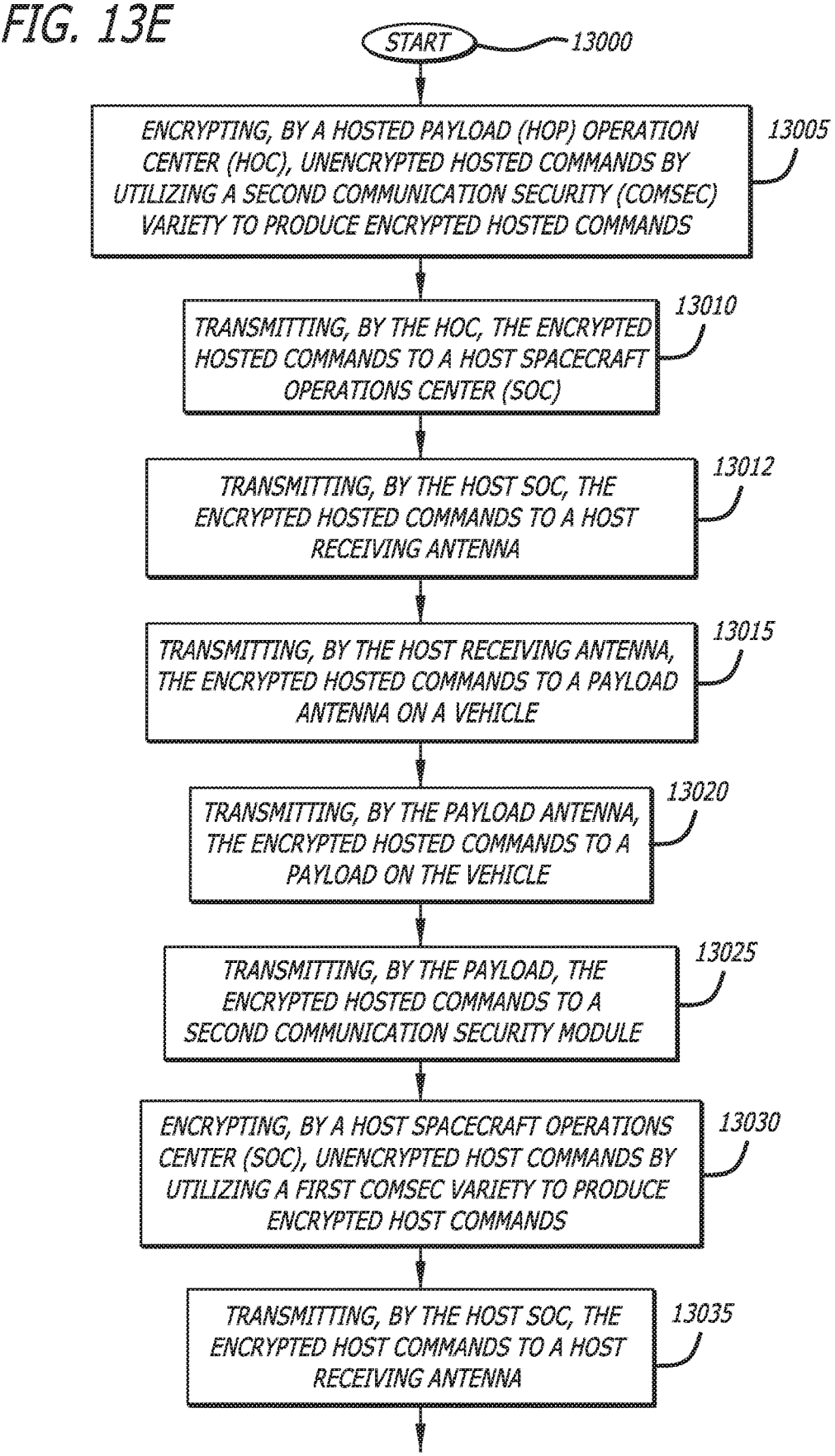
Figure 13F:
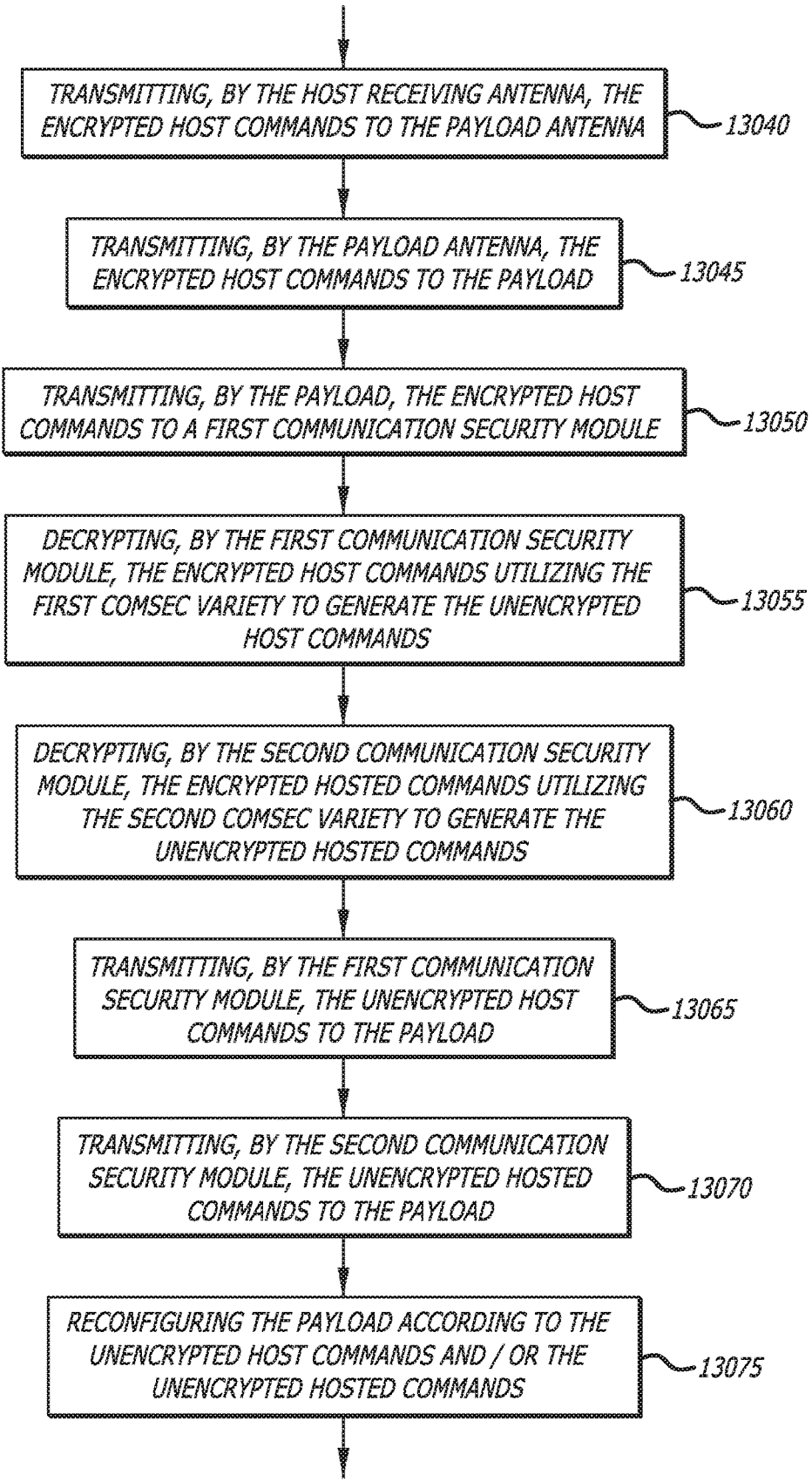
Figure 13G:
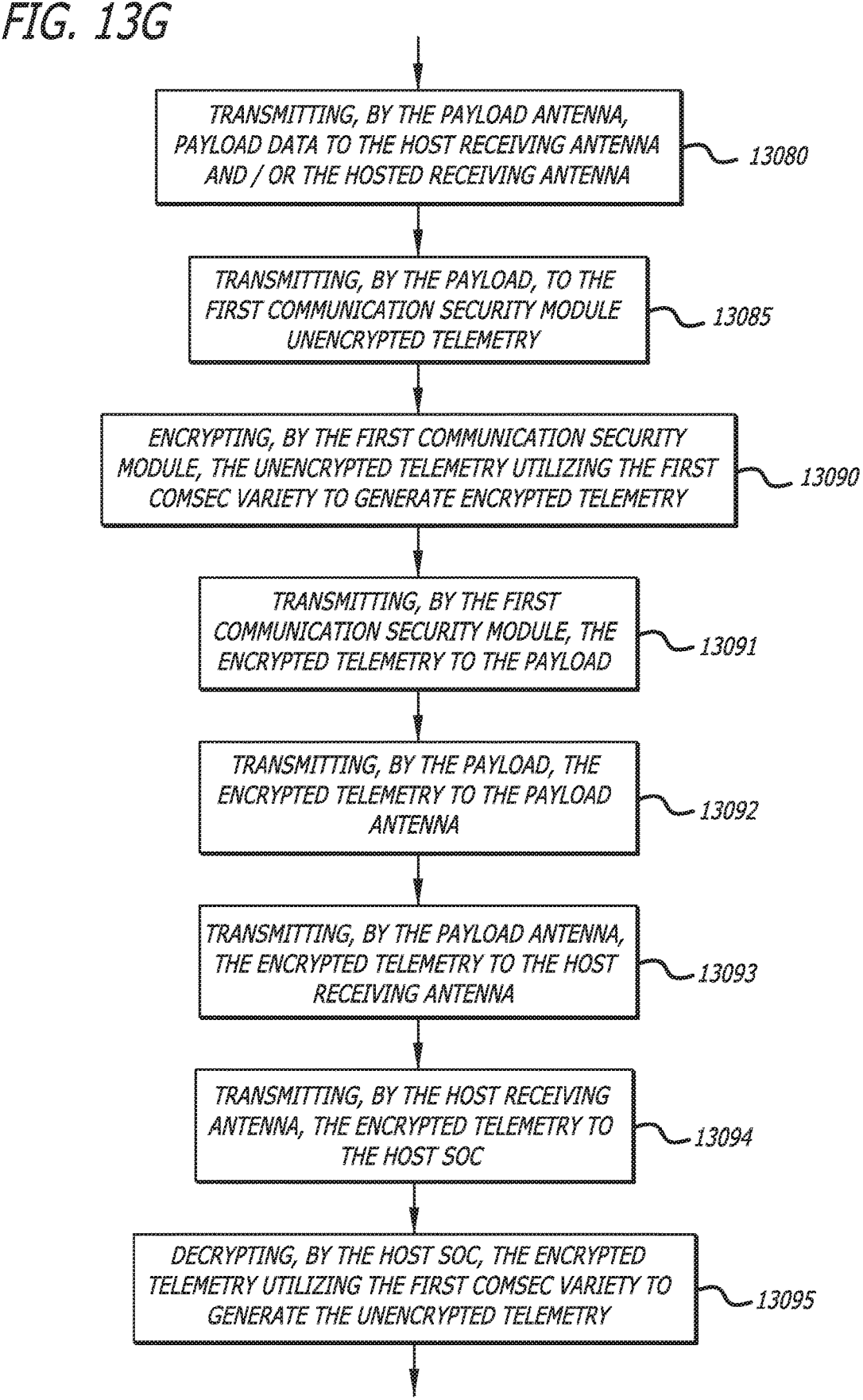
Figure 13H:
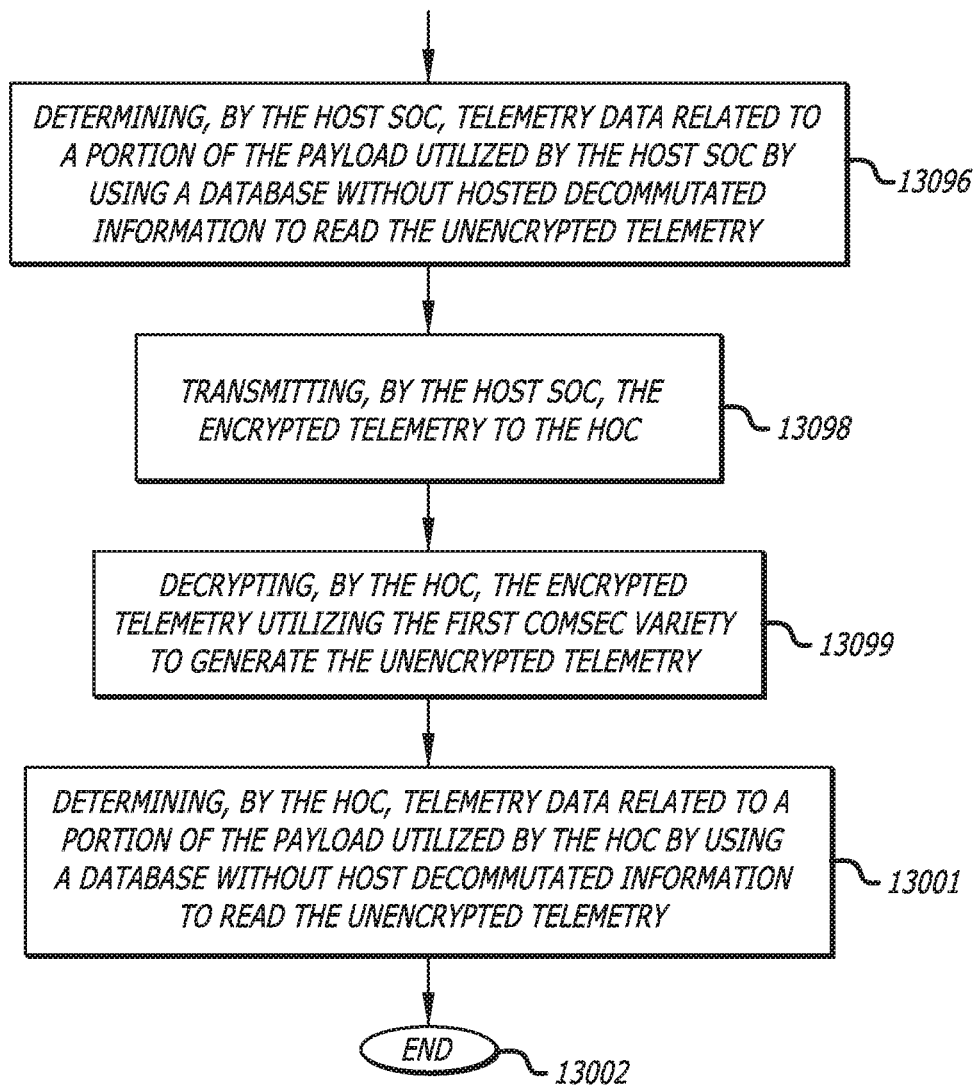

FIG. 12B is a diagram showing the disclosed system for a virtual transponder utilizing inband telemetry and commanding for the host user and the hosted user using one receiving antenna and employing one COMSEC variety for telemetry, in accordance with at least one embodiment of the present disclosure.

FIGS. 13A, 13B, 13C, and 13D together show a flow chart for the disclosed method for a virtual transponder utilizing inband telemetry and commanding for the host user and the hosted user using two receiving antennas and employing one COMSEC variety for telemetry, in accordance with at least one embodiment of the present disclosure.

FIGS. 13E, 13F, 13G, and 13H together show a flow chart for the disclosed method for a virtual transponder utilizing inband telemetry and commanding for the host user and the hosted user using one receiving antenna and employing one COMSEC variety for telemetry, in accordance with at least one embodiment of the present disclosure.

FIGS. 14-19B show exemplary systems and methods for a virtual transponder, in accordance with at least one embodiment of the present disclosure.

Figure 14:
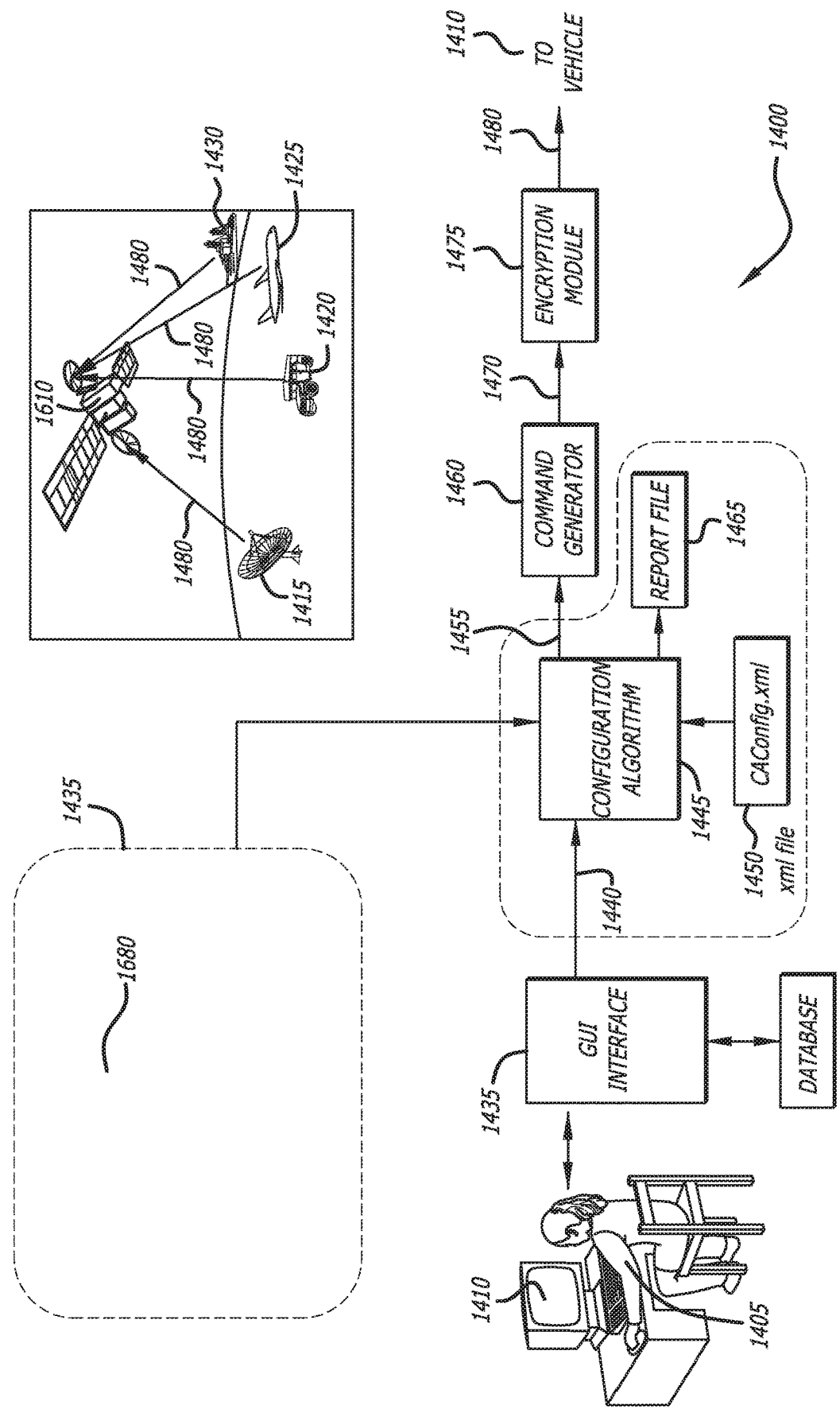

FIG. 14 is a diagram showing the disclosed system for a virtual transponder on a vehicle, in accordance with at least one embodiment of the present disclosure.

Figure 15:
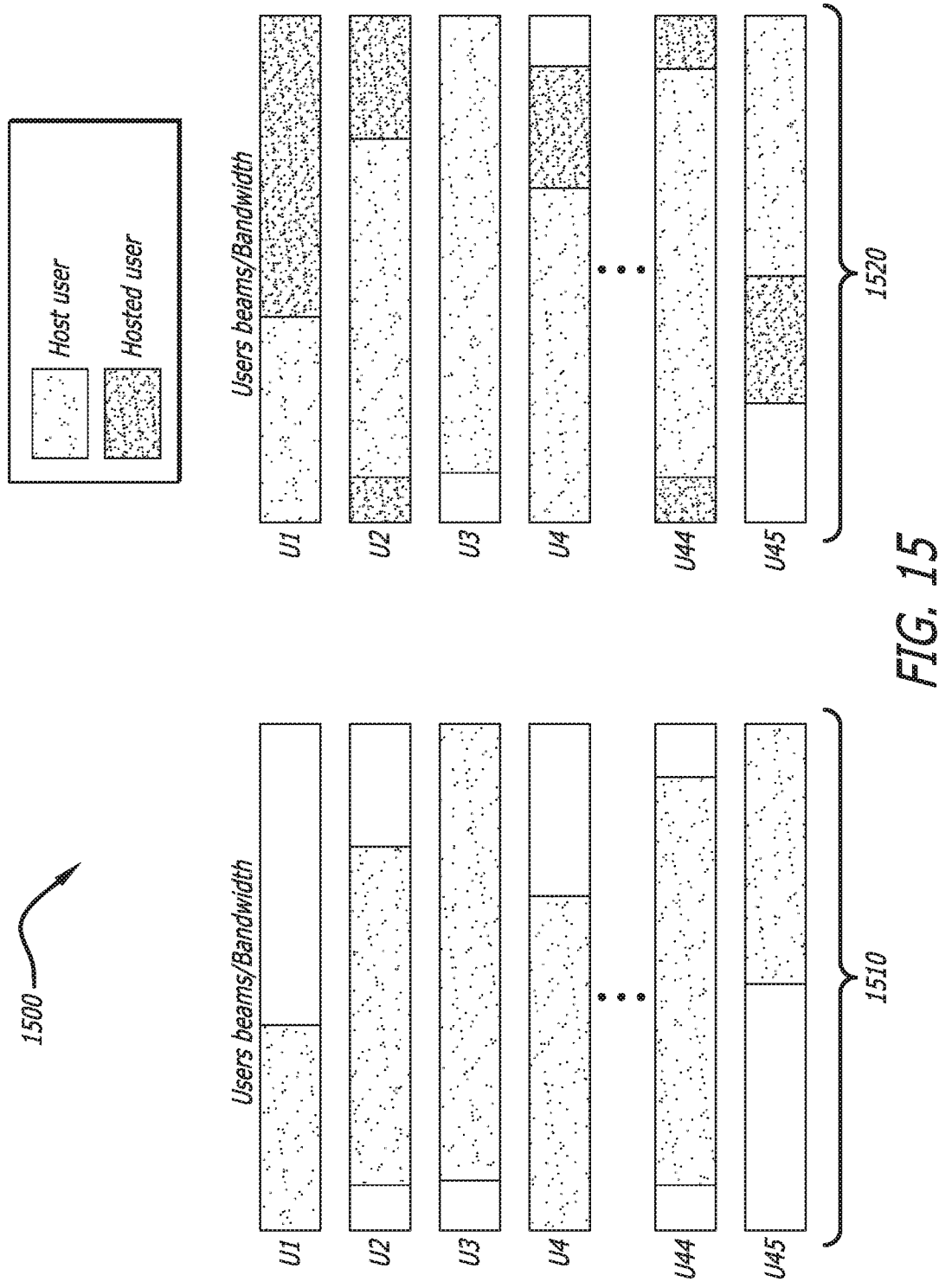

FIG. 15 is a diagram showing an exemplary allocation of bandwidth amongst a plurality of beams when utilizing the disclosed virtual transponder, in accordance with at least one embodiment of the present disclosure.

Figure 16:
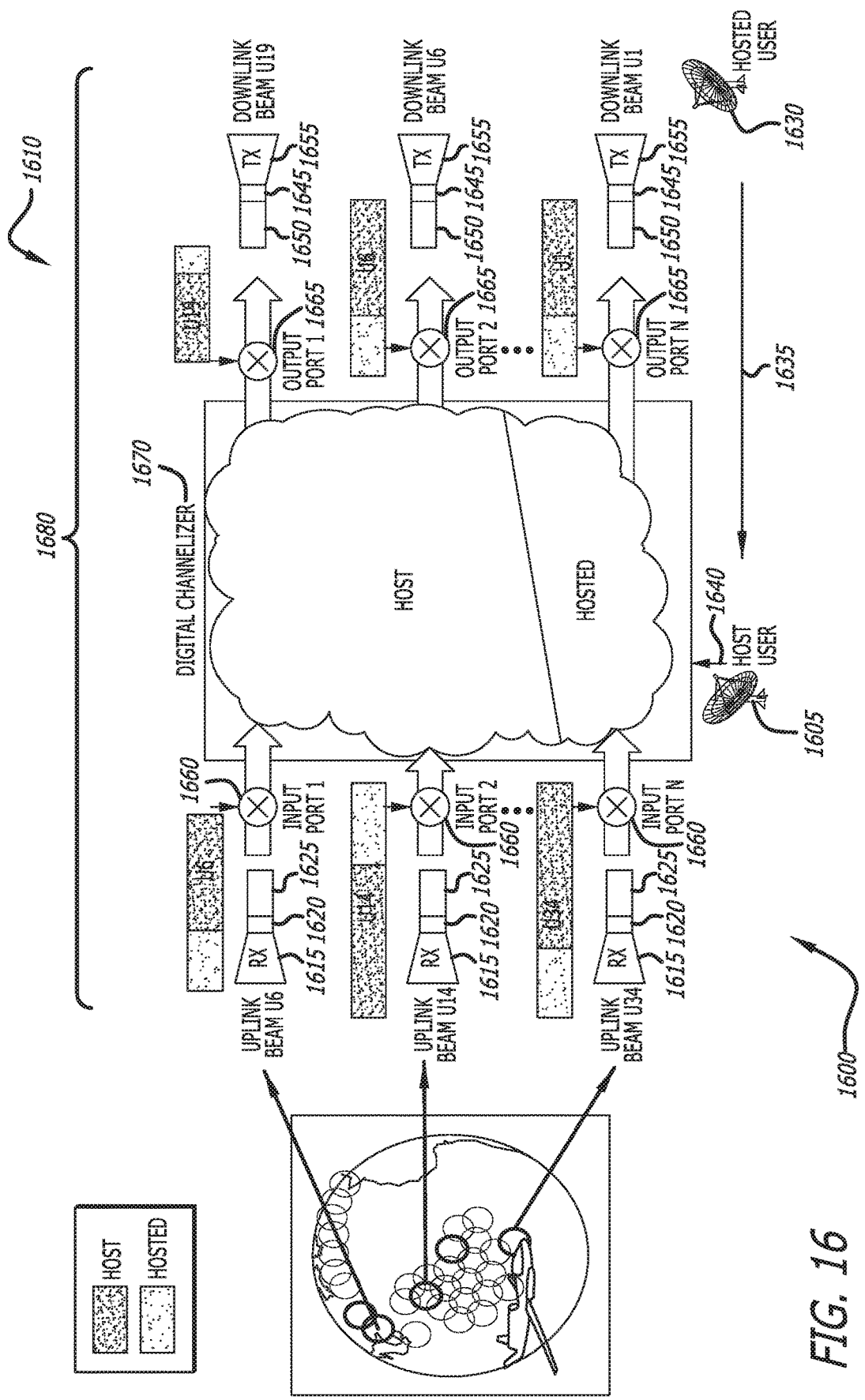

FIG. 16 is a diagram showing the switch architecture for a flexible allocation of bandwidth amongst a plurality of beams when utilizing the disclosed virtual transponder, in accordance with at least one embodiment of the present disclosure.

Figure 17:
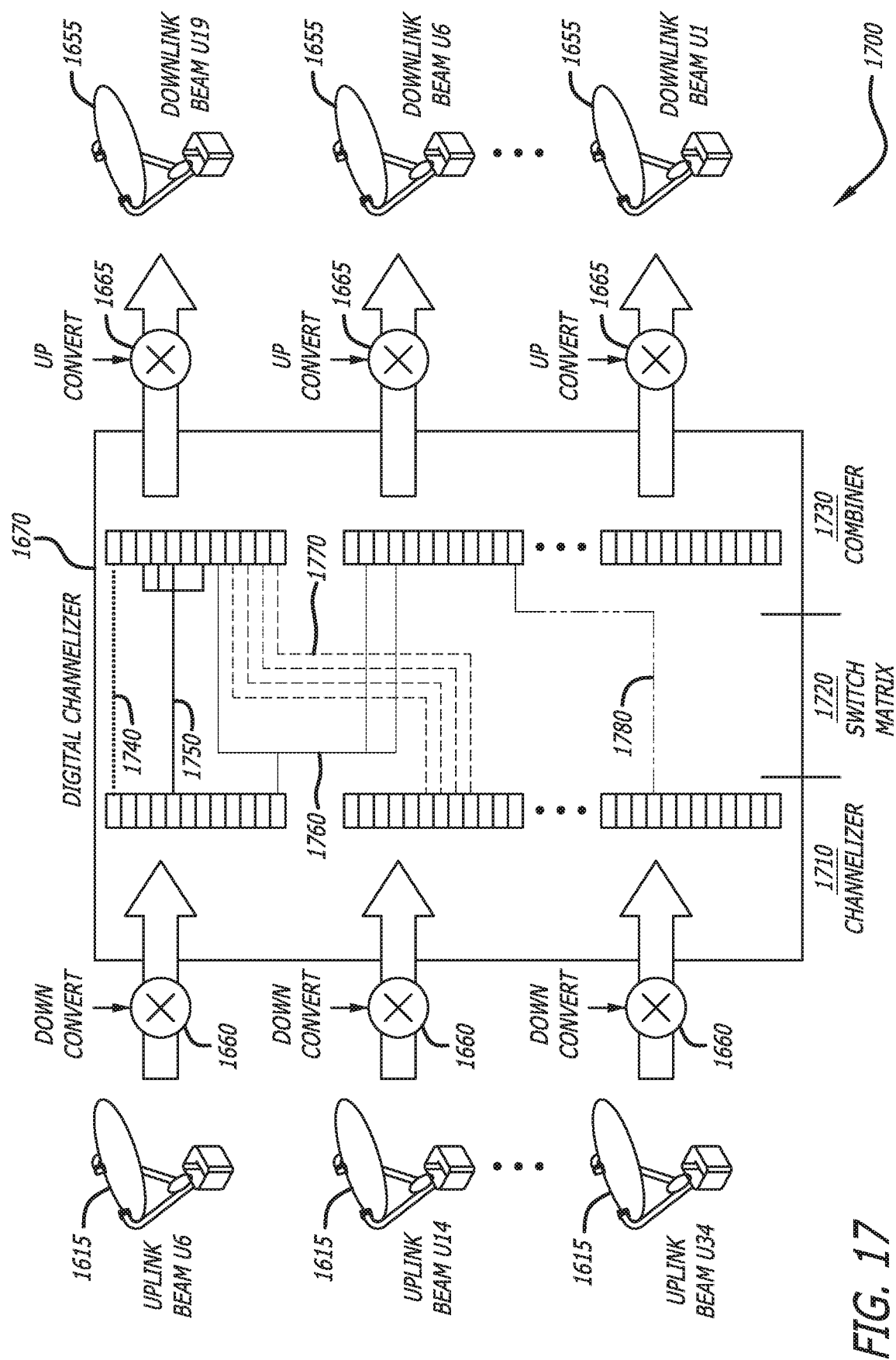

FIG. 17 is a diagram showing details of the digital channelizer of FIG. 16, in accordance with at least one embodiment of the present disclosure.

Figure 18:
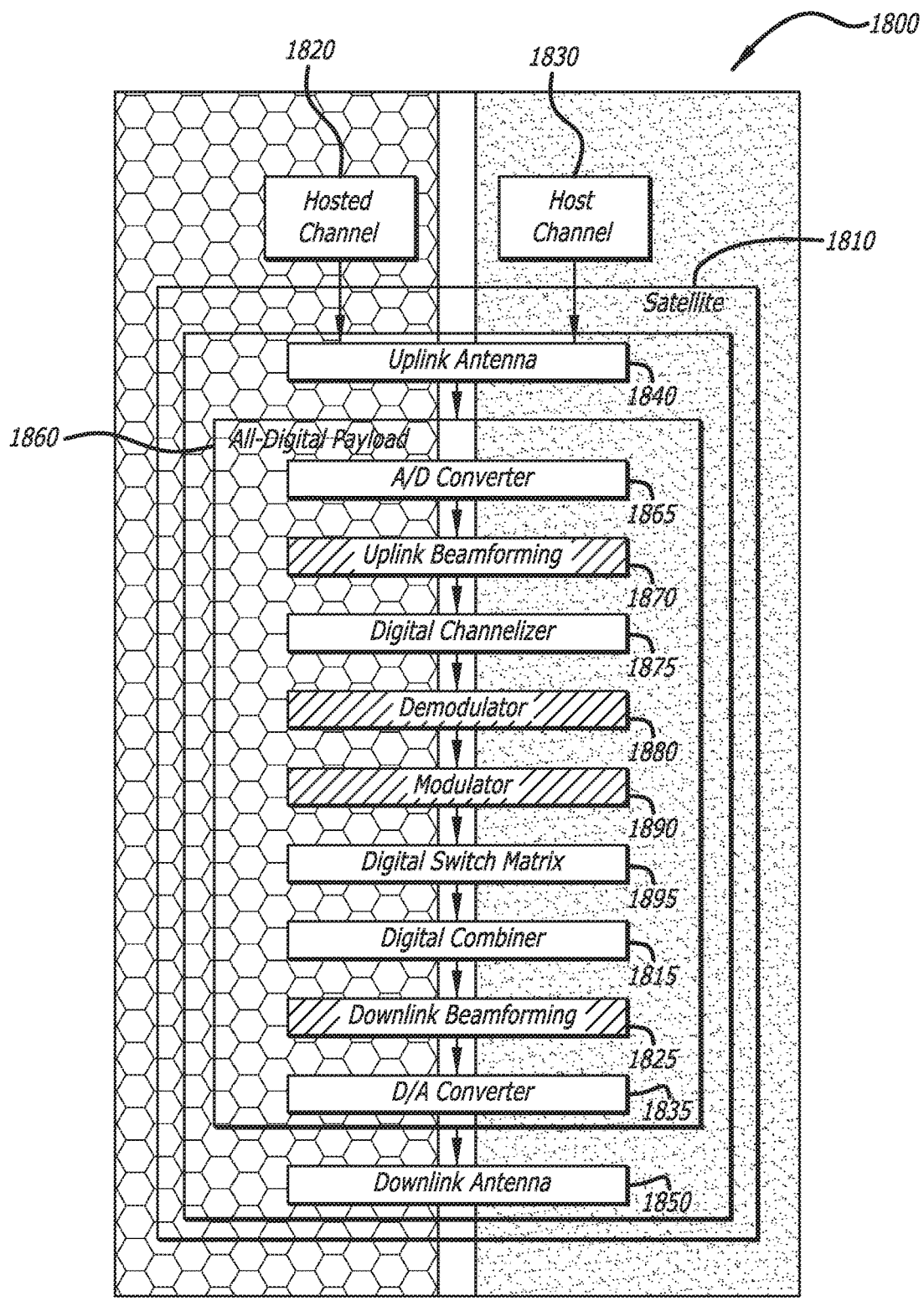

FIG. 18 is a diagram showing exemplary components on the vehicle that may be utilized by the disclosed virtual transponder, in accordance with at least one embodiment of the present disclosure.

Figure 19A:
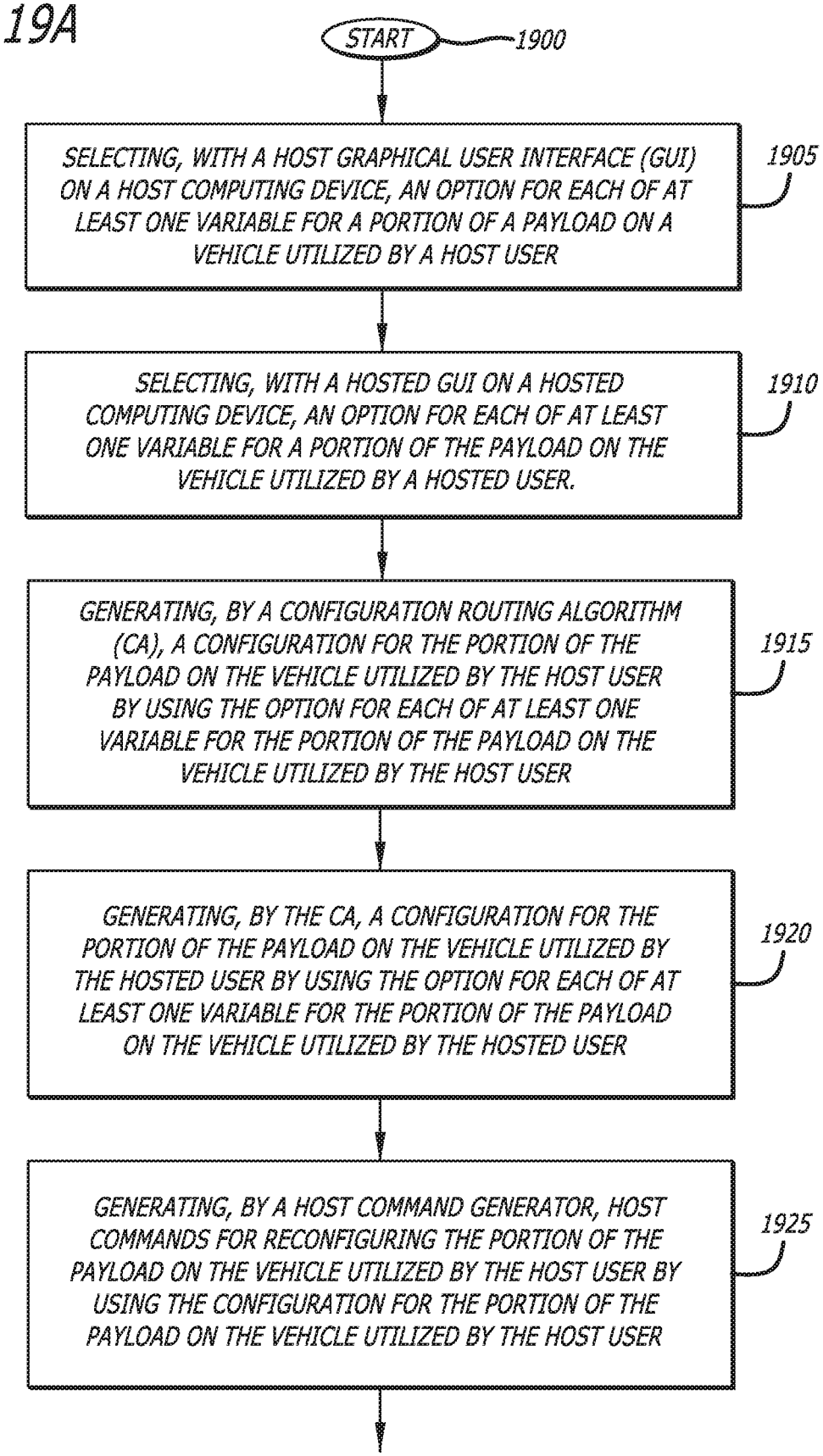
Figure 19B:
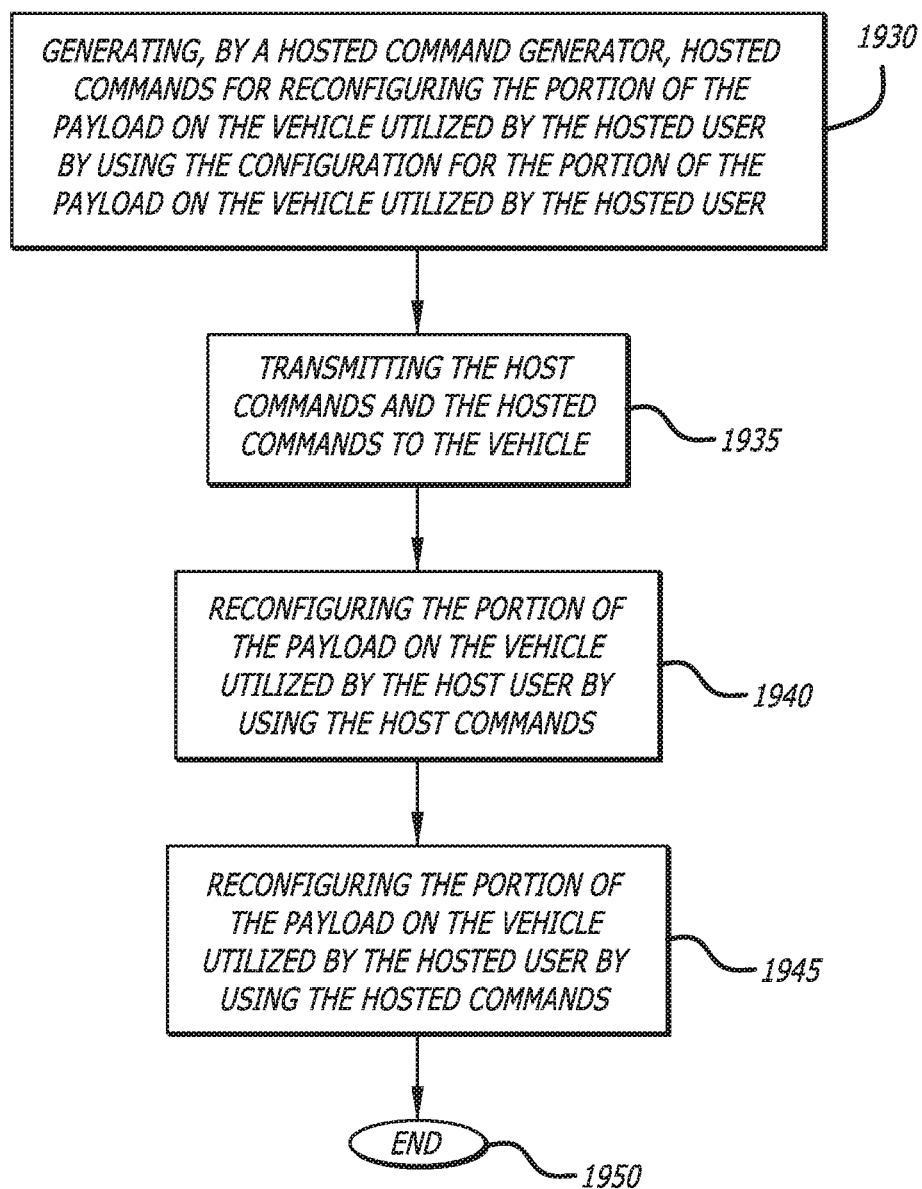

FIGS. 19A and 19B together show a flow chart for the disclosed method for a virtual transponder on a vehicle, in accordance with at least one embodiment of the present disclosure.

DESCRIPTION

The methods and apparatus disclosed herein provide an operative system for virtual transponders utilizing inband commanding. The system of the present disclosure allows for vehicle operators to privately share vehicle resources. It should be noted that in this disclosure, in-band frequency band(s) refer to a frequency band(s) that is the same frequency band(s) utilized to transmit payload data; and out-of-band frequency band(s) refer to a frequency band(s) that is not the same frequency band(s) utilized to transmit payload data.

As previously mentioned above, currently, typical transponders on a vehicle (e.g., a satellite) have the ability to perform switching of inputs to outputs of the payload. All of this switching on the payload is commanded and controlled by a single satellite controller with no resource allocation privacy. For example, in a digital transponder, when a user request for a channel with specific bandwidth and antenna characteristics is made, the channel is then set up, used, and then disconnected.

The disclosed system allows for private vehicle resource allocation and control that provides vehicle users the ability to privately, dynamically, allocate resources on demand. In particular, the disclosed system employs a virtual transponder, which is a transponder partitioned into multiple transponders with independent command and control. In one or more embodiments, an exemplary virtual transponder includes a digital transponder with a digital channelizer, a digital switch matrix, and a digital combiner that is configured to partition a digital transponder into multiple transponders with independent command and control. Command and control of the virtual transponder is achieved via ground software that provides dynamic allocation and privatization of the digital switch matrix for bandwidth on demand.

It should be noted that the disclosed system for private vehicle resource allocation and control may employ various different types of transponders for the virtual transponder other than the specific disclosed embodiments (e.g., depicted FIGS. 16-18) for the virtual transponder. For example, various different types of transponders may be employed for the virtual transponder including, but not limited to, various different types of digital transponders, various different types of analog transponders (e.g., conventional repeater-type transponders), and various different types of combination analog/digital transponders.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to satellite communication systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
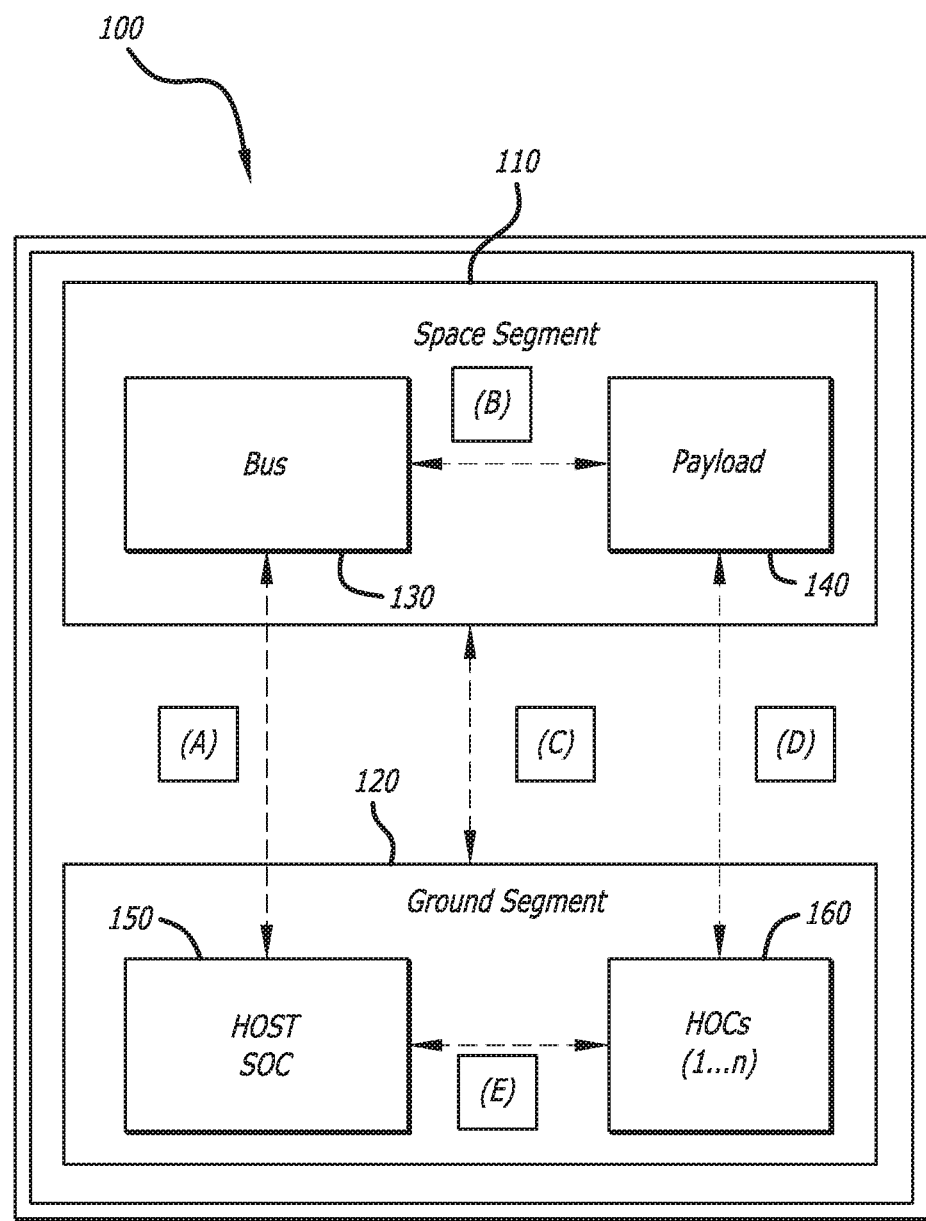
FIG. 1 is a diagram showing simplified architecture for the disclosed system for a virtual transponder, in accordance with at least one embodiment of the present disclosure.

FIG. 1 is a diagram 100 showing simplified architecture for the disclosed system for a virtual transponder, in accordance with at least one embodiment of the present disclosure. In this figure, a simplified view of multiple possible hosted payload configurations is illustrated. In particular, this figure shows a space segment 110 and a ground segment 120. The space segment 110 represents a vehicle. Various different types of vehicles may be employed for the vehicle including, but not limited to, an airborne vehicle. And, various different types of airborne vehicles may be employed for the vehicle including, but not limited to, a satellite, an aircraft, an unmanned aerial vehicle (UAV), and a space plane.

In the case of a satellite being employed for the vehicle, it should be noted that satellites typically include computer-controlled systems. A satellite generally includes a bus 130 and a payload 140. The bus 130 may include systems (which include components) that control the satellite. These systems perform tasks, such as power generation and control, thermal control, telemetry, attitude control, orbit control, and other suitable operations.

The payload 140 of the satellite provides functions to users of the satellite. The payload 140 may include antennas, transponders, and other suitable devices. For example, with respect to communications, the payload 140 in a satellite may be used to provide Internet access, telephone communications, radio, television, and other types of communications.

The payload 140 of the satellite may be used by different entities. For example, the payload 140 may be used by the owner of the satellite (i.e. the host user), one or more customers (i.e. the hosted user(s)), or some combination thereof.

For example, the owner of a satellite may lease different portions of the payload 140 to different customers. In one example, one group of antenna beams generated by the payload 140 of the satellite may be leased to one customer, while a second group of antenna beams may be leased to a second customer. In another example, one group of antenna beams generated by the payload 140 of the satellite may be utilized by the owner of the satellite, while a second group of antenna beams may be leased to a customer. In yet another example, some or all of the antenna beams generated by the payload 140 of the satellite may be shared by one customer and a second customer. In another example, some or all of the antenna beams generated by the payload 140 of the satellite may be shared by the owner of the satellite and a customer. When satellites are shared by different users, users may have a shared communications link (e.g., Interface A) to the satellite, or each user may have a separate communications link (e.g., Interfaces A and D) to the satellite.

Leasing a satellite to multiple customers may increase the revenues that an owner of a satellite can obtain. Further, a customer may use a subset of the total resources in a satellite for a cost that is less than the cost for the customer to purchase and operate a satellite, to build and operate a satellite, or to lease an entire satellite.

Referring back to FIG. 1, the ground segment 120 comprises a host spacecraft operations center (SOC) (e.g., a ground station associated with the owner of the satellite) 150, and a hosted payload (HoP) operation center(s) (HOC(s)) (e.g., a ground station(s) associated with a customer(s) that is leasing at least a portion of the payload of the satellite from the owner) 160.

FIG. 1 shows a number of different possible communication links (i.e. Interfaces A-E). It should be noted that the disclosed system may employ some or all of these illustrated communication links. Interface A, which may comprise multiple links, is an out-of-band command and telemetry link from the host SOC 150 to command the satellite. Interface B, which may comprise multiple links, is a communication link, between the bus 130 and the payload 140. Interface B may be used to control essential items, such as power. Information that may be communicated from the bus 130 to the payload 140 via Interface B may include, but is not limited to, time, ephemeris, and payload commands. Information that may be communicated from the payload 140 to the bus 130 via Interface B may include, but is not limited to, payload telemetry.

Interface C, which may comprise multiple links, is an inband command and telemetry link for bus and/or payload. Interface D, which may comprise multiple links, is a command and telemetry link from the HOC(s) 160 to command the satellite. Interface E, which may comprise multiple links, between the host SOC 150 and the HOCs 160 allows for requests from the HOCs for resource sharing of the payload 140.

FIGS. 2A-13H show exemplary systems and methods for a virtual transponder utilizing inband commanding, in accordance with at least one embodiment of the present disclosure.

Figure 2A:
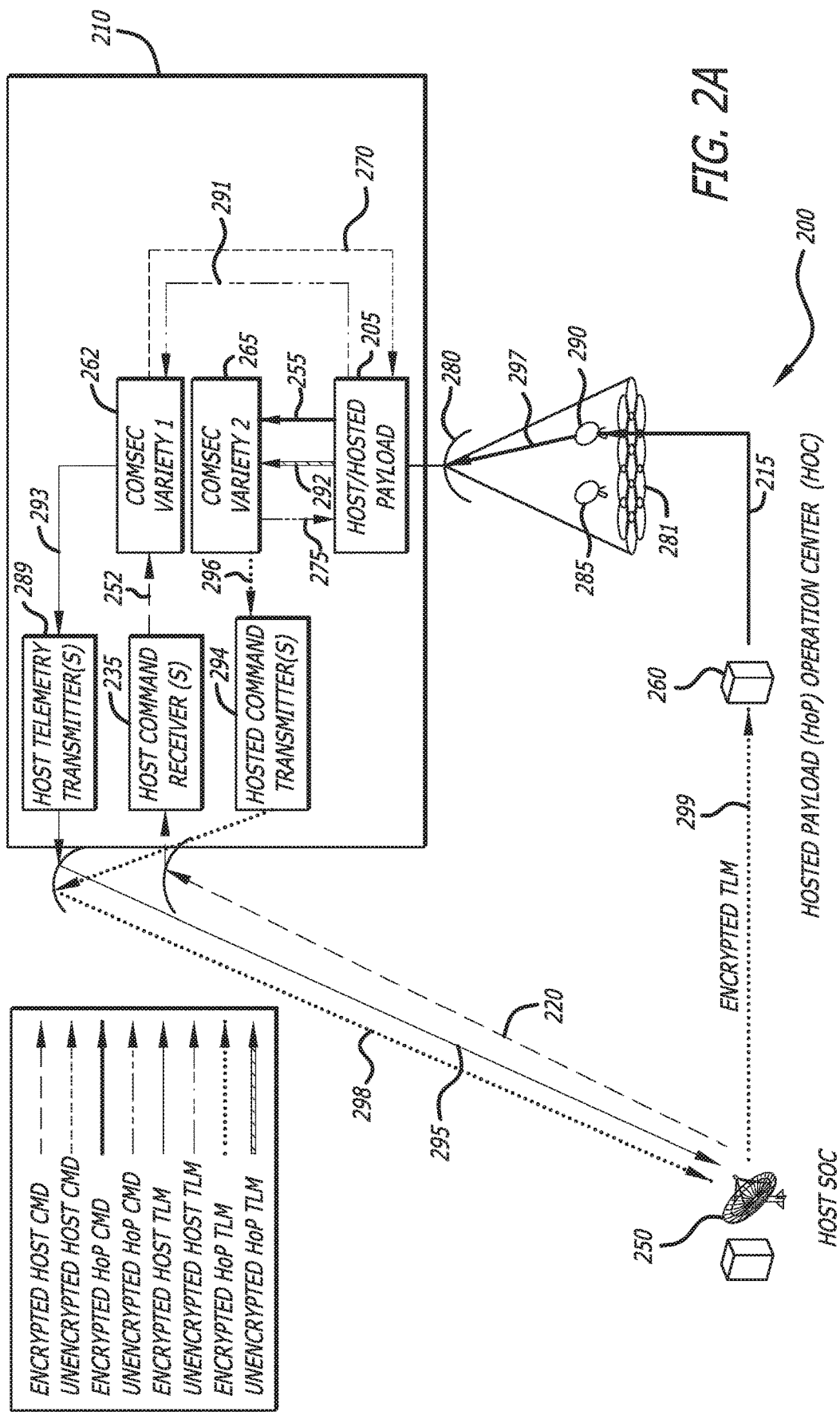

FIG. 2A is a diagram 200 showing the disclosed system for a virtual transponder utilizing inband commanding for the hosted user (i.e. HOC) 260 using a hosted receiving antenna 290, in accordance with at least one embodiment of the present disclosure. In this figure, a vehicle 210, a host SOC 250, and a HOC 260 are shown. The HOC 260 has leased at least a portion (e.g., a virtual transponder(s)) of the payload 205 of the vehicle 210 from the owner of a satellite (i.e. the host SOC) 250. It should be noted that in some embodiments, the HOC 260 may lease all of the payload 205 of the vehicle 210 from the owner of a satellite (i.e. the host SOC) 250. Also, it should be noted that is some embodiments, the HOC 260 may own the payload 205 (e.g., a steerable antenna) of the vehicle 210, and contract the host SOC 250 to transmit encrypted hosted commands to the vehicle 210.

During operation, the HOC 260 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 205 that the HOC 260 is leasing from the host SOC 250. The host SOC 250 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 205 that host SOC 250 is utilizing for itself.

It should be noted that, although in FIG. 2A the host SOC 250 is depicted to have its ground antenna located right next to its operations building; in other embodiments, the host SOC 250 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 260 then transmits 215 the encrypted hosted commands to a hosted receiving antenna 290. After the hosted receiving antenna 290 receives the encrypted hosted commands, the hosted receiving antenna 290 transmits 297 the encrypted hosted commands to a payload antenna 280 on the vehicle 210. The hosted receiving antenna 290 transmits 297 the encrypted hosted commands utilizing an in-band frequency band(s) (i.e. a frequency band(s) that is the same frequency band(s) utilized to transmit payload data). The payload antenna 280 transmits the encrypted hosted commands to a payload 205. The payload 205 on the vehicle 210 receives the encrypted hosted commands. The payload 205 then transmits 255 the encrypted hosted commands to a second communication security module 265. The second communication security module 265 decrypts the encrypted hosted commands utilizing the second COMSEC variety (i.e. COMSEC Variety 2) to generate unencrypted hosted commands.

It should be noted that the second communication security module 265 may comprise one or more modules. In addition, the second communication security module 265 may comprise one or more processors.

The host SOC 250 transmits 220 the encrypted host commands to the vehicle 210. The host SOC 250 transmits 220 the encrypted host commands utilizing an out-of-band frequency band(s) (i.e. a frequency band(s) that is not the same frequency band(s) utilized to transmit payload data). The host command receiver 235 on the vehicle 210 receives the encrypted host commands.

The host command receiver 235 then transmits 252 the encrypted host commands to a first communication security module 262. The first communication security module 262 decrypts the encrypted host commands utilizing the first COMSEC variety (i.e. COMSEC Variety 1) to generate unencrypted host commands.

It should be noted that the first communication security module 262 may comprise one or more modules. In addition, the first communication security module 262 may comprise one or more processors.

The first communication security module 262 then transmits 270 the unencrypted host commands to the payload (i.e. the shared host/hosted payload) 205. The second communication security module 265 transmits 275 the unencrypted hosted commands to the payload (i.e. the shared host/hosted payload) 205. The payload 205 is reconfigured according to the unencrypted host commands and/or the unencrypted hosted commands. The payload antenna 280 then transmits (e.g., in one or more antenna beams 281) payload data to a host receiving antenna 285 and/or the hosted receiving antenna 290 on the ground.

Also, it should be noted that, although in FIG. 2A, antenna beams 281 is shown to include a plurality of circular spot beams; in other embodiments, antenna beams 281 may include more or less number of beams than is shown in FIG. 2A (e.g., antenna beams 281 may only include a single beam), and antenna beams 281 may include beams of different shapes than circular spot beams as is shown in FIG. 2A (e.g., antenna beams 281 may include elliptical beams and/or shaped beams of various different shapes).

It should be noted that in one or more embodiments, the payload antenna 280 may comprise one or more reflector dishes including, but not limited to, parabolic reflectors and/or shaped reflectors. In some embodiments, the payload antenna 280 may comprise one or more multifeed antenna arrays.

The payload 205 transmits 291 unencrypted host telemetry (i.e. unencrypted host TLM, which is telemetry data related to the portion of the payload 205 that is utilized by the host SOC 250) to the first communication security module 262. The first communication security module 262 then encrypts the unencrypted host telemetry utilizing the first COMSEC variety to generate encrypted host telemetry (i.e. encrypted host TLM).

The payload 205 transmits 292 unencrypted hosted telemetry (i.e. unencrypted HoP TLM, which is telemetry data related to the portion of the payload 205 that is leased by the HOC 260) to the second communication security module 265. The second communication security module 265 then encrypts the unencrypted hosted telemetry utilizing the second COMSEC variety to generate encrypted hosted telemetry (i.e. encrypted HoP TLM).

The first communication security module 262 then transmits 293 the encrypted host telemetry to a host telemetry transmitter 289. The host telemetry transmitter 289 then transmits 295 the encrypted host telemetry to the host SOC 250. The host telemetry transmitter 289 transmits 295 the encrypted host telemetry utilizing an out-of-band frequency band(s). The host SOC 250 then decrypts the encrypted host telemetry utilizing the first COMSEC variety to generate the unencrypted host telemetry.

The second communication security module 265 then transmits 296 the encrypted hosted telemetry to a hosted telemetry transmitter 294. The hosted telemetry transmitter 294 then transmits 298 the encrypted hosted telemetry to the host SOC 250. The telemetry transmitter 294 transmits 298 the encrypted hosted telemetry utilizing an out-of-band frequency band(s). The host SOC 250 then transmits 299 the encrypted hosted telemetry to the HOC 260. The HOC 260 then decrypts the encrypted hosted telemetry utilizing the second COMSEC variety to generate the unencrypted hosted telemetry.

Figure 2B:
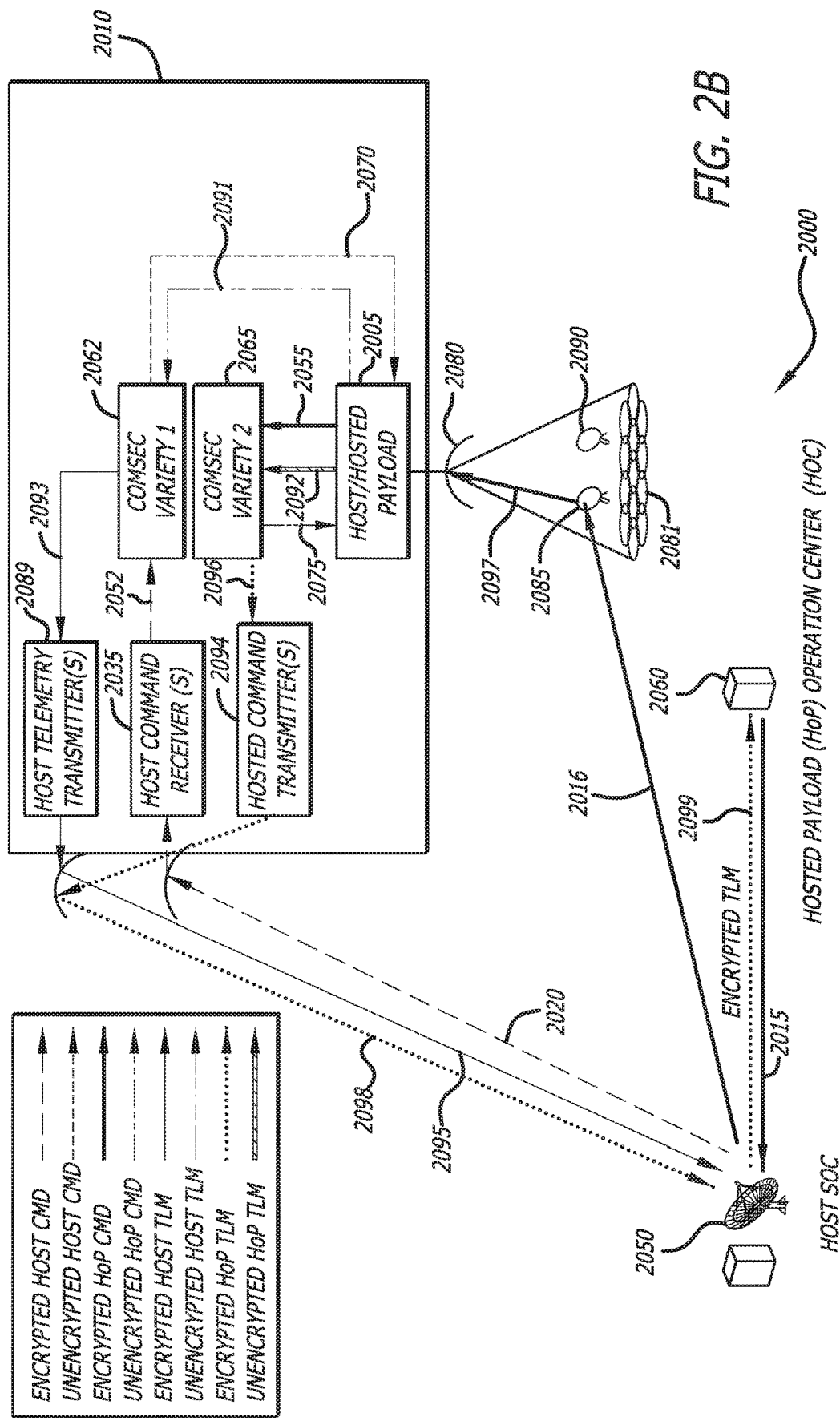
FIG. 2B is a diagram showing the disclosed system for a virtual transponder utilizing inband commanding for the hosted user using a host receiving antenna, in accordance with at least one embodiment of the present disclosure.
Figure 3A:
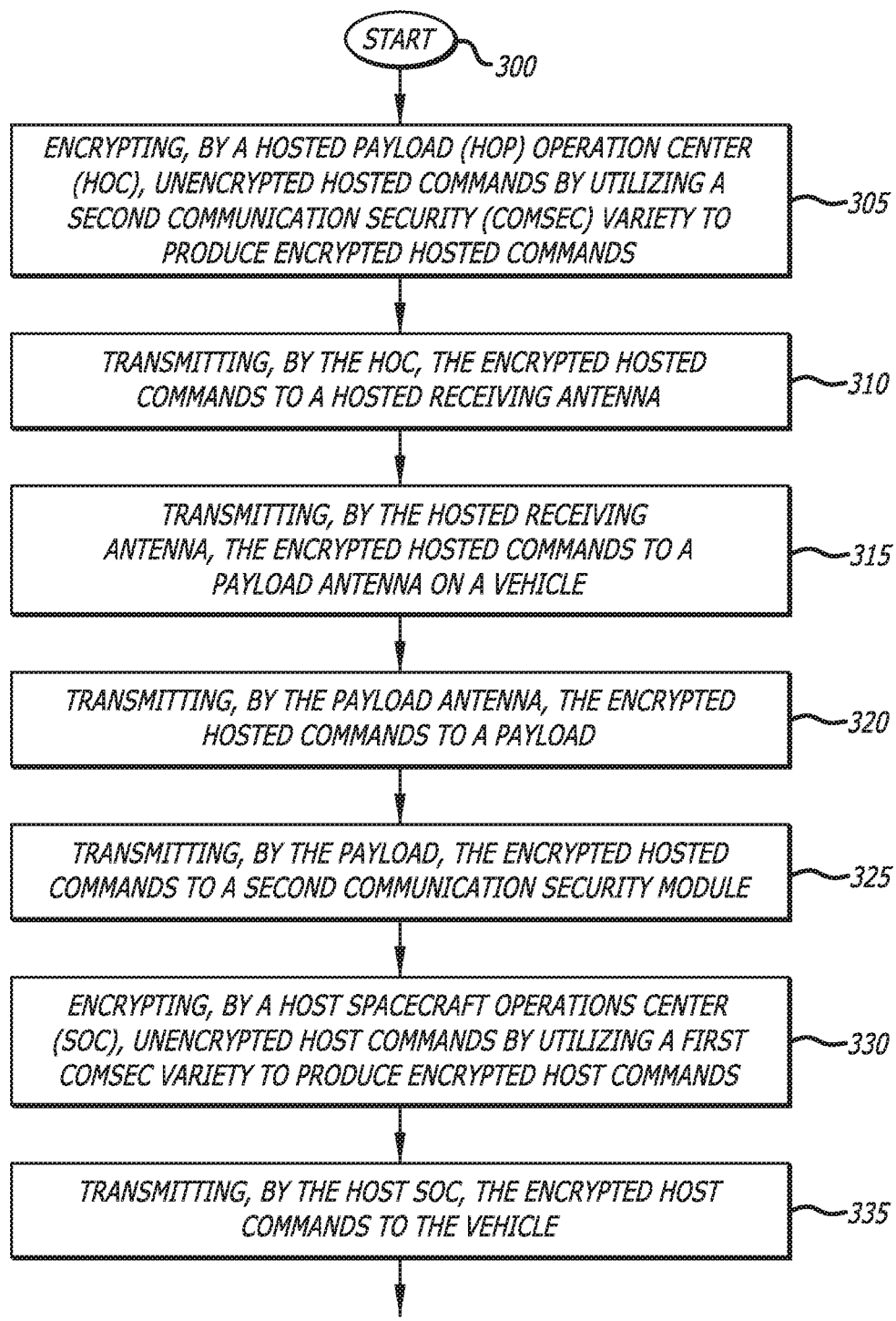
Figure 3C:
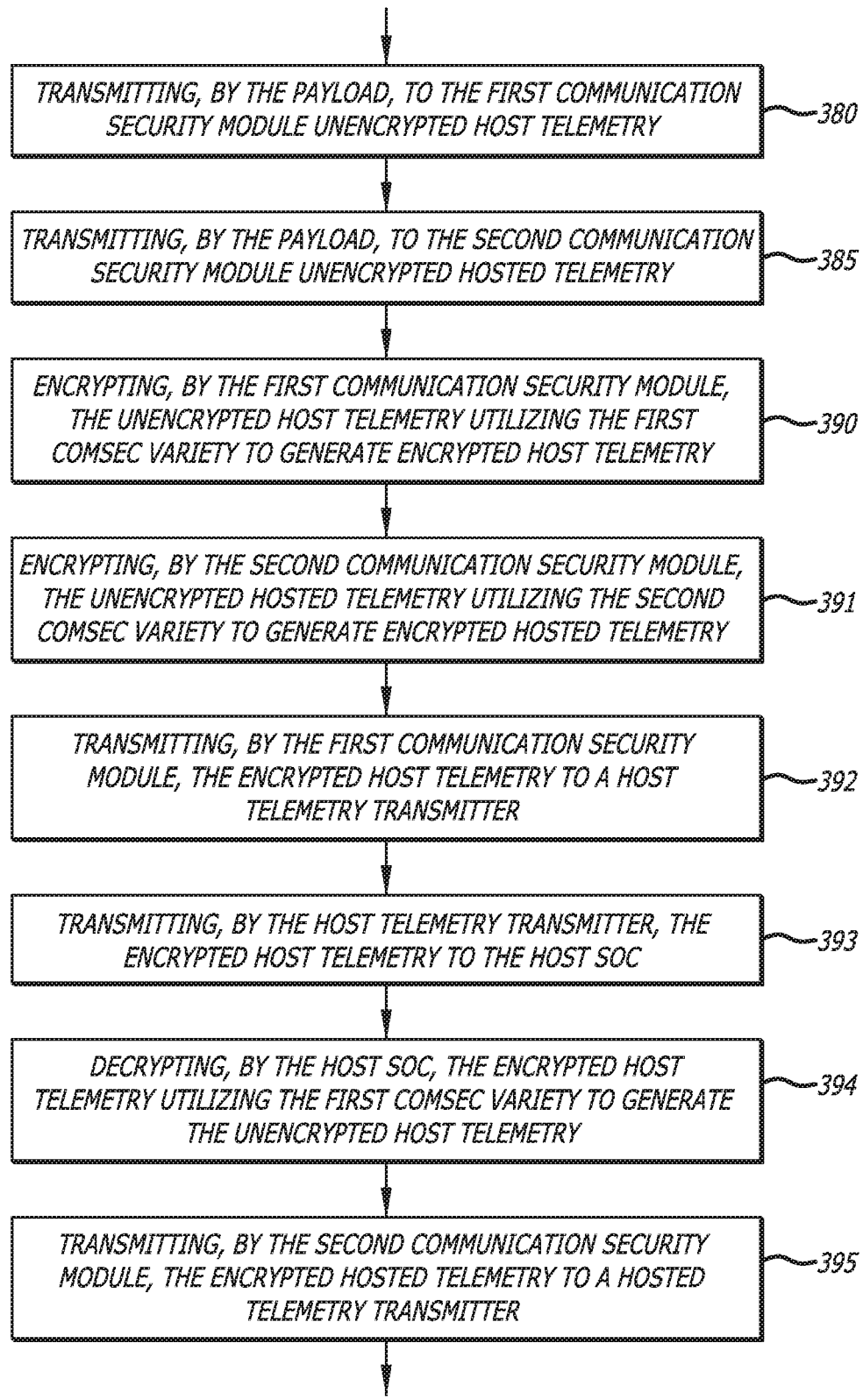
Figure 3D:
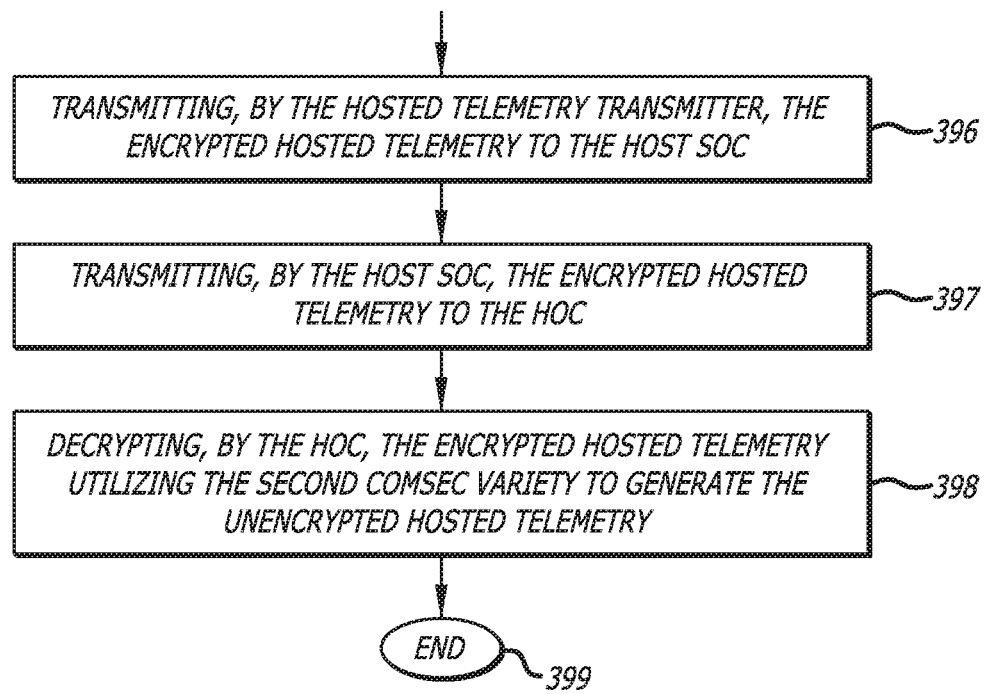
Figure 3E:
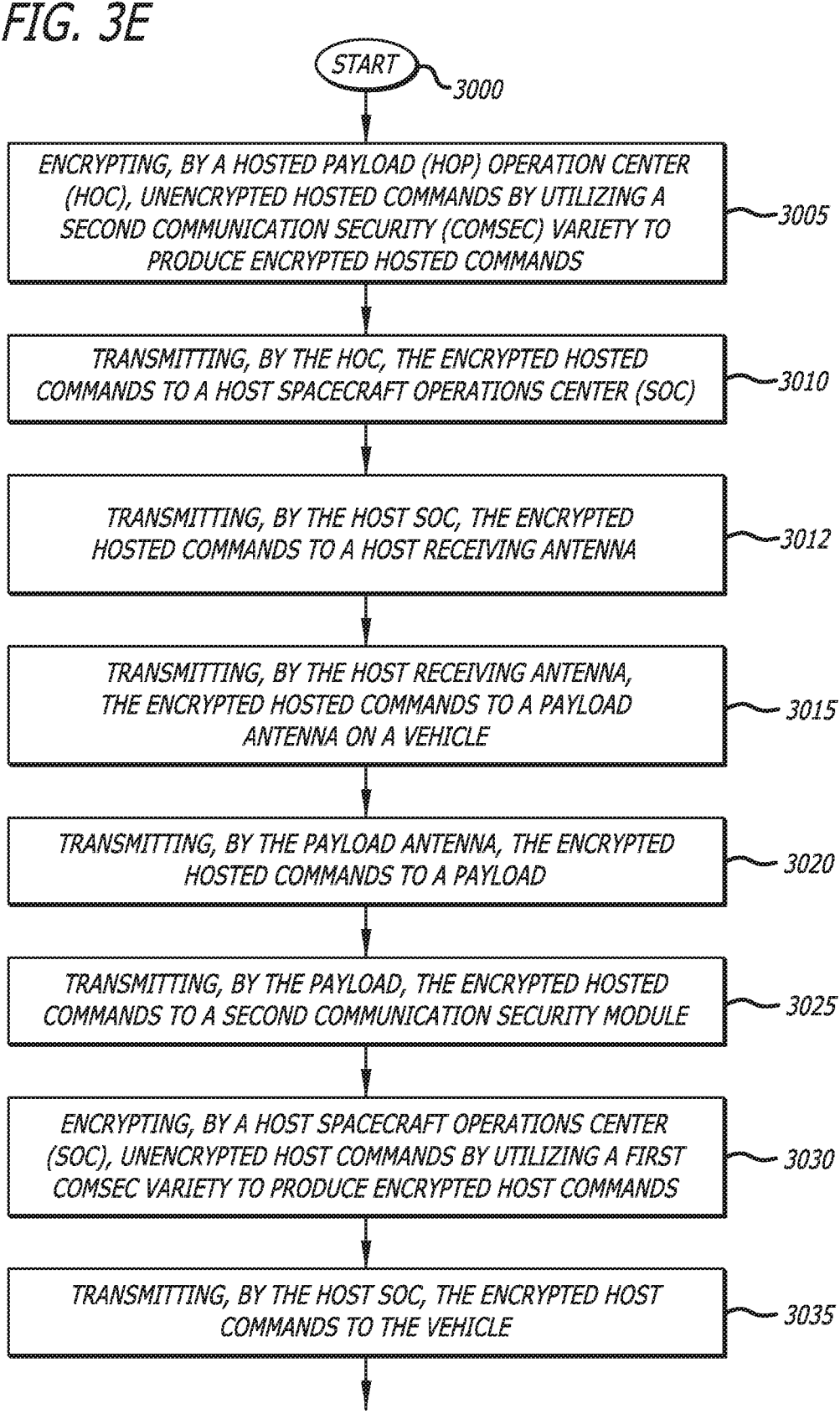
Figure 3G:
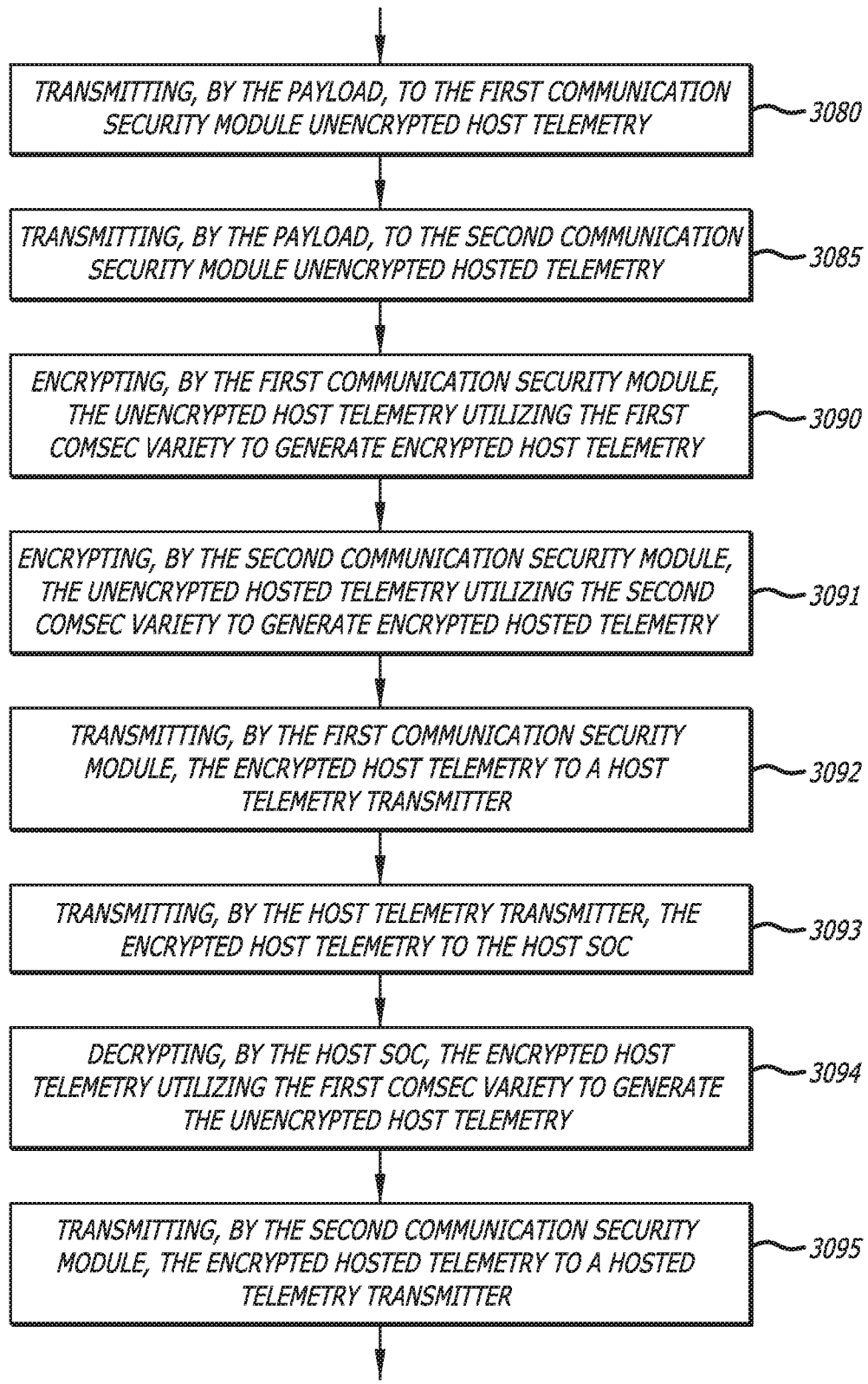

FIG. 2B is a diagram 2000 showing the disclosed system for a virtual transponder utilizing inband commanding for the hosted user (i.e. HOC) 2060 using a host receiving antenna 20085, in accordance with at least one embodiment of the present disclosure. In this figure, a vehicle 2010, a host SOC 2050, and a HOC 2060 are shown. The HOC 2060 has leased at least a portion (e.g., a virtual transponder(s)) of the payload 2005 of the vehicle 2010 from the owner of a satellite (i.e. the host SOC) 2050. It should be noted that in some embodiments, the HOC 2060 may lease all of the payload 2005 of the vehicle 2010 from the owner of a satellite (i.e. the host SOC) 2050. Also, it should be noted that is some embodiments, the HOC 2060 may own the payload 2005 (e.g., a steerable antenna) of the vehicle 2010, and contract the host SOC 2050 to transmit encrypted hosted commands to the vehicle 2010.

During operation, the HOC 2060 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 2005 that the HOC 2060 is leasing from the host SOC 2050. The host SOC 2050 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 2005 that host SOC 2050 is utilizing for itself.

It should be noted that, although in FIG. 2B the host SOC 2050 is depicted to have its ground antenna located right next to its operations building; in other embodiments, the host SOC 2050 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 2060 then transmits 2015 the encrypted hosted commands to the host SOC 2050. Then, the host SOC 2050 transmits 2016 the encrypted hosted commands to a host receiving antenna 2085. After the host receiving antenna 2085 receives the encrypted hosted commands, the host receiving antenna 2085 transmits 2097 the encrypted hosted commands to a payload antenna 2080 on the vehicle 2010. The host receiving antenna 2085 transmits 2097 the encrypted hosted commands utilizing an in-band frequency band(s) (i.e. a frequency band(s) that is the same frequency band(s) utilized to transmit payload data). The payload antenna 2080 transmits the encrypted hosted commands to a payload 2005. The payload 2005 on the vehicle 2010 receives the encrypted hosted commands. The payload 2005 then transmits 2055 the encrypted hosted commands to a second communication security module 2065. The second communication security module 2065 decrypts the encrypted hosted commands utilizing the second COMSEC variety (i.e. COMSEC Variety 2) to generate unencrypted hosted commands.

It should be noted that the second communication security module 2065 may comprise one or more modules. In addition, the second communication security module 2065 may comprise one or more processors.

The host SOC 2050 transmits 2020 the encrypted host commands to the vehicle 2010. The host SOC 2050 transmits 2020 the encrypted host commands utilizing an out-of-band frequency band(s) (i.e. a frequency band(s) that is not the same frequency band(s) utilized to transmit payload data). The host command receiver 2035 on the vehicle 2010 receives the encrypted host commands.

The host command receiver 2035 then transmits 2052 the encrypted host commands to a first communication security module 2062. The first communication security module 2062 decrypts the encrypted host commands utilizing the first COMSEC variety (i.e. COMSEC Variety 1) to generate unencrypted host commands.

It should be noted that the first communication security module 2062 may comprise one or more modules. In addition, the first communication security module 2062 may comprise one or more processors.

The first communication security module 2062 then transmits 2070 the unencrypted host commands to the payload (i.e. the shared host/hosted payload) 2005. The second communication security module 2065 transmits 2075 the unencrypted hosted commands to the payload (i.e. the shared host/hosted payload) 2005. The payload 2005 is reconfigured according to the unencrypted host commands and/or the unencrypted hosted commands. The payload antenna 2080 then transmits (e.g., in one or more antenna beams 2081) payload data to a host receiving antenna 2085 and/or the hosted receiving antenna 2090 on the ground.

Also, it should be noted that, although in FIG. 2B, antenna beams 2081 is shown to include a plurality of circular spot beams; in other embodiments, antenna beams 2081 may include more or less number of beams than is shown in FIG. 2B (e.g., antenna beams 2081 may only include a single beam), and antenna beams 2081 may include beams of different shapes than circular spot beams as is shown in FIG. 2B (e.g., antenna beams 2081 may include elliptical beams and/or shaped beams of various different shapes).

It should be noted that in one or more embodiments, the payload antenna 2080 may comprise one or more reflector dishes including, but not limited to, parabolic reflectors and/or shaped reflectors. In some embodiments, the payload antenna 2080 may comprise one or more multifeed antenna arrays.

The payload 2005 transmits 2091 unencrypted host telemetry (i.e. unencrypted host TLM, which is telemetry data related to the portion of the payload 2005 that is utilized by the host SOC 2050) to the first communication security module 2062. The first communication security module 2062 then encrypts the unencrypted host telemetry utilizing the first COMSEC variety to generate encrypted host telemetry (i.e. encrypted host TLM).

The payload 2005 transmits 2092 unencrypted hosted telemetry (i.e. unencrypted HoP TLM, which is telemetry data related to the portion of the payload 2005 that is leased by the HOC 2060) to the second communication security module 2065. The second communication security module 2065 then encrypts the unencrypted hosted telemetry utilizing the second COMSEC variety to generate encrypted hosted telemetry (i.e. encrypted HoP TLM).

The first communication security module 2062 then transmits 2093 the encrypted host telemetry to a host telemetry transmitter 2089. The host telemetry transmitter 2089 then transmits 2095 the encrypted host telemetry to the host SOC 2050. The host telemetry transmitter 2089 transmits 2095 the encrypted host telemetry utilizing an out-of-band frequency band(s). The host SOC 2050 then decrypts the encrypted host telemetry utilizing the first COMSEC variety to generate the unencrypted host telemetry.

The second communication security module 2065 then transmits 2096 the encrypted hosted telemetry to a hosted telemetry transmitter 2094. The hosted telemetry transmitter 2094 then transmits 2098 the encrypted hosted telemetry to the host SOC 2050. The telemetry transmitter 2094 transmits 2098 the encrypted hosted telemetry utilizing an out-of-band frequency band(s). The host SOC 2050 then transmits 2099 the encrypted hosted telemetry to the HOC 2060. The HOC 2060 then decrypts the encrypted hosted telemetry utilizing the second COMSEC variety to generate the unencrypted hosted telemetry.

FIGS. 3A, 3B, 3C, and 3D together show a flow chart for the disclosed method for a virtual transponder utilizing inband commanding for the hosted user using a hosted receiving antenna, in accordance with at least one embodiment of the present disclosure. At the start 300 of the method, a hosted payload (HoP) operation center (HOC) encrypts unencrypted hosted commands by utilizing a second communication security (COMSEC) variety to produce encrypted hosted commands 305. Then, the HOC transmits the encrypted hosted commands to a hosted receiving antenna 310. The hosted receiving antenna then transmits the encrypted hosted commands to a payload antenna on a vehicle 315. Then, the payload antenna transmits the encrypted hosted commands to a payload 320. The payload then transmits the encrypted hosted commands to a second communication security module 325.

Then, a host spacecraft operations center (SOC) encrypts unencrypted host commands by utilizing a first COMSEC variety to produce encrypted host commands 330. The host SOC then transmits the encrypted host commands to the vehicle 335. Then, a host command receiver on the vehicle receives the encrypted host commands 340. The host command receiver then transmits the encrypted host commands to a first communication security module 345. Then, the first communication security module decrypts the encrypted host commands utilizing the first COMSEC variety to generate the unencrypted host commands 350. The second communication security module decrypts the encrypted hosted commands utilizing the second COMSEC variety to generate the unencrypted hosted commands 355. Then, the first communication security module transmits the unencrypted host commands to the payload 360. The second communication security module transmits the unencrypted hosted commands to the payload 365.

Then, the payload is reconfigured according to the unencrypted host commands and/or the unencrypted hosted commands 370. The payload antenna then transmits payload data to a host receiving antenna and/or the hosted receiving antenna 375. Then, the payload transmits to the first communication security module unencrypted host telemetry 380. The payload transmits to the second communication security module unencrypted hosted telemetry 385. Then, the first communication security module encrypts the unencrypted host telemetry utilizing the first COMSEC variety to generate encrypted host telemetry 390. The second communication security module encrypts the unencrypted hosted telemetry utilizing the second COMSEC variety to generate encrypted hosted telemetry 391.

Then, the first communication security module transmits the encrypted host telemetry to a host telemetry transmitter 392. The host telemetry transmitter then transmits the encrypted host telemetry to the host SOC 393. Then, the host SOC decrypts the encrypted host telemetry utilizing the first COMSEC variety to generate the unencrypted host telemetry 394.

Then, the second communication security module transmits the encrypted hosted telemetry to a hosted telemetry transmitter 395. The hosted telemetry transmitter then transmits the encrypted hosted telemetry to the host SOC 396. Then, the host SOC transmits the encrypted hosted telemetry to the HOC 397. The HOC then decrypts the encrypted hosted telemetry utilizing the second COMSEC variety to generate the unencrypted hosted telemetry 398. Then, the method ends 399.

FIGS. 3E, 3F, 3G, and 3H together show a flow chart for the disclosed method for a virtual transponder utilizing inband commanding for the hosted user using a host receiving antenna, in accordance with at least one embodiment of the present disclosure. At the start 3000 of the method, a hosted payload (HoP) operation center (HOC) encrypts unencrypted hosted commands by utilizing a second communication security (COMSEC) variety to produce encrypted hosted commands 3005. Then, the HOC transmits the encrypted hosted commands to a host spacecraft operations center (SOC) 3010. The host SOC then transmits the encrypted hosted commands to a host receiving antenna 3012. The host receiving antenna then transmits the encrypted hosted commands to a payload antenna on a vehicle 3015. Then, the payload antenna transmits the encrypted hosted commands to a payload 3020. The payload then transmits the encrypted hosted commands to a second communication security module 3025.

Then, a host SOC encrypts unencrypted host commands by utilizing a first COMSEC variety to produce encrypted host commands 3030. The host SOC then transmits the encrypted host commands to the vehicle 3035. Then, a host command receiver on the vehicle receives the encrypted host commands 3040. The host command receiver then transmits the encrypted host commands to a first communication security module 3045. Then, the first communication security module decrypts the encrypted host commands utilizing the first COMSEC variety to generate the unencrypted host commands 3050. The second communication security module decrypts the encrypted hosted commands utilizing the second COMSEC variety to generate the unencrypted hosted commands 3055. Then, the first communication security module transmits the unencrypted host commands to the payload 3060. The second communication security module transmits the unencrypted hosted commands to the payload 3065.

Then, the payload is reconfigured according to the unencrypted host commands and/or the unencrypted hosted commands 3070. The payload antenna then transmits payload data to a host receiving antenna and/or the hosted receiving antenna 3075. Then, the payload transmits to the first communication security module unencrypted host telemetry 3080. The payload transmits to the second communication security module unencrypted hosted telemetry 3085. Then, the first communication security module encrypts the unencrypted host telemetry utilizing the first COMSEC variety to generate encrypted host telemetry 3090. The second communication security module encrypts the unencrypted hosted telemetry utilizing the second COMSEC variety to generate encrypted hosted telemetry 3091.

Then, the first communication security module transmits the encrypted host telemetry to a host telemetry transmitter 3092. The host telemetry transmitter then transmits the encrypted host telemetry to the host SOC 3093. Then, the host SOC decrypts the encrypted host telemetry utilizing the first COMSEC variety to generate the unencrypted host telemetry 3094.

Then, the second communication security module transmits the encrypted hosted telemetry to a hosted telemetry transmitter 3095. The hosted telemetry transmitter then transmits the encrypted hosted telemetry to the host SOC 3096. Then, the host SOC transmits the encrypted hosted telemetry to the HOC 3097. The HOC then decrypts the encrypted hosted telemetry utilizing the second COMSEC variety to generate the unencrypted hosted telemetry 3098. Then, the method ends 3099.

FIG. 4 is a diagram 400 showing the disclosed system for a virtual transponder utilizing inband commanding for the host user (i.e. host SOC) 450, in accordance with at least one embodiment of the present disclosure. In this figure, a vehicle 410, a host SOC 450, and a HOC 460 are shown. The HOC 460 has leased at least a portion (e.g., a virtual transponder(s)) of the payload 405 of the vehicle 410 from the owner of a satellite (i.e. the host SOC) 450. It should be noted that in some embodiments, the HOC 460 may lease all of the payload 405 of the vehicle 410 from the owner of a satellite (i.e. the host SOC) 450. Also, it should be noted that is some embodiments, the HOC 460 may own the payload 405 (e.g., a steerable antenna) of the vehicle 410, and contract the host SOC 450 to transmit encrypted hosted commands to the vehicle 410.

During operation, the HOC 460 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 405 that the HOC 460 is leasing from the host SOC 450. The host SOC 450 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 405 that host SOC 450 is utilizing for itself.

It should be noted that, although in FIG. 4 the host SOC 450 is depicted to have its ground antenna located right next to its operations building; in other embodiments, the host SOC 450 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The host SOC 450 then transmits 420 the encrypted host commands to a host receiving antenna 485. After the host receiving antenna 485 receives the encrypted host commands, the host receiving antenna 485 transmits 497 the encrypted host commands to a payload antenna 480 on the vehicle 410. The host receiving antenna 485 transmits 497 the encrypted host commands utilizing an in-band frequency band(s) (i.e. a frequency band(s) that is the same frequency band(s) utilized to transmit payload data). The payload antenna 480 transmits the encrypted host commands to a payload 405. The payload 405 on the vehicle 410 receives the encrypted host commands. The payload 405 then transmits 452 the encrypted host commands to a first communication security module 462. The first communication security module 462 decrypts the encrypted host commands utilizing the first COMSEC variety (i.e. COMSEC Variety 1) to generate unencrypted host commands.

It should be noted that the first communication security module 462 may comprise one or more modules. In addition, the first communication security module 462 may comprise one or more processors.

The HOC 460 transmits 415 the encrypted hosted commands to the host SOC 450. The host SOC 450 transmits 425 the encrypted hosted commands to the vehicle 410. The host SOC 450 transmits 425 the encrypted hosted commands utilizing an out-of-band frequency band(s) (i.e. a frequency band(s) that is not the same frequency band(s) utilized to transmit payload data). The hosted command receiver 435 on the vehicle 410 receives the encrypted host commands.

The hosted command receiver 435 then transmits 455 the encrypted hosted commands to a second communication security module 465. The second communication security module 465 decrypts the encrypted hosted commands utilizing the second COMSEC variety (i.e. COMSEC Variety 2) to generate unencrypted hosted commands.

It should be noted that the second communication security module 465 may comprise one or more modules. In addition, the second communication security module 465 may comprise one or more processors.

The first communication security module 462 then transmits 470 the unencrypted host commands to the payload (i.e. the shared host/hosted payload) 405. The second communication security module 465 transmits 475 the unencrypted hosted commands to the payload (i.e. the shared host/hosted payload) 405. The payload 405 is reconfigured according to the unencrypted host commands and/or the unencrypted hosted commands. The payload antenna 480 then transmits (e.g., in one or more antenna beams 481) payload data to a host receiving antenna 485 and/or the hosted receiving antenna 490 on the ground.

Also, it should be noted that, although in FIG. 4, antenna beams 481 is shown to include a plurality of circular spot beams; in other embodiments, antenna beams 481 may include more or less number of beams than is shown in FIG. 4 (e.g., antenna beams 481 may only include a single beam), and antenna beams 481 may include beams of different shapes than circular spot beams as is shown in FIG. 4 (e.g., antenna beams 481 may include elliptical beams and/or shaped beams of various different shapes).

It should be noted that in one or more embodiments, the payload antenna 480 may comprise one or more reflector dishes including, but not limited to, parabolic reflectors and/or shaped reflectors. In some embodiments, the payload antenna 480 may comprise one or more multifeed antenna arrays.

The payload 405 transmits 491 unencrypted host telemetry (i.e. unencrypted host TLM, which is telemetry data related to the portion of the payload 405 that is utilized by the host SOC 450) to the first communication security module 462. The first communication security module 462 then encrypts the unencrypted host telemetry utilizing the first COMSEC variety to generate encrypted host telemetry (i.e. encrypted host TLM).

The payload 405 transmits 492 unencrypted hosted telemetry (i.e. unencrypted HoP TLM, which is telemetry data related to the portion of the payload 405 that is leased by the HOC 460) to the second communication security module 465. The second communication security module 465 then encrypts the unencrypted hosted telemetry utilizing the second COMSEC variety to generate encrypted hosted telemetry (i.e. encrypted HoP TLM).

The first communication security module 462 then transmits 493 the encrypted host telemetry to a host telemetry transmitter 489. The host telemetry transmitter 489 then transmits 495 the encrypted host telemetry to the host SOC 450. The host telemetry transmitter 489 transmits 495 the encrypted host telemetry utilizing an out-of-band frequency band(s). The host SOC 450 then decrypts the encrypted host telemetry utilizing the first COMSEC variety to generate the unencrypted host telemetry.

The second communication security module 465 then transmits 496 the encrypted hosted telemetry to a hosted telemetry transmitter 494. The hosted telemetry transmitter 494 then transmits 498 the encrypted hosted telemetry to the host SOC 450. The telemetry transmitter 494 transmits 498 the encrypted hosted telemetry utilizing an out-of-band frequency band(s). The host SOC 450 then transmits 499 the encrypted hosted telemetry to the HOC 460. The HOC 460 then decrypts the encrypted hosted telemetry utilizing the second COMSEC variety to generate the unencrypted hosted telemetry.

FIGS. 5A, 5B, 5C, and 5D together show a flow chart for the disclosed method for a virtual transponder utilizing inband commanding for the host user, in accordance with at least one embodiment of the present disclosure. At the start 500 of the method, a hosted payload (HoP) operation center (HOC) encrypts unencrypted hosted commands by utilizing a second communication security (COMSEC) variety to produce encrypted hosted commands 505. Then, the HOC transmits the encrypted hosted commands to a host spacecraft operations center (SOC) 510. The host SOC then transmits the encrypted hosted commands to a vehicle 515. Then, a hosted command receiver on the vehicle receives the encrypted hosted commands 520. The hosted command receiver then transmits the encrypted hosted commands to a second communication security module 525.

Then, the host SOC encrypts unencrypted host commands by utilizing a first COMSEC variety to produce encrypted host commands 530. The host SOC then transmits the encrypted host commands to a host receiving antenna 535. Then, the host receiving antenna transmits the encrypted host commands to a payload antenna on the vehicle 540. The payload antenna then transmits the encrypted host commands to a payload on the vehicle 545. Then, the payload transmits the encrypted host commands to a first communication security module 550. The first communication security module then decrypts the encrypted host commands utilizing the first COMSEC variety to generate the unencrypted host commands 555. The second communication security module decrypts the encrypted hosted commands utilizing the second COMSEC variety to generate the unencrypted hosted commands 560. Then, the first communication security module transmits the unencrypted host commands to the payload 565. The second communication security module transmits the unencrypted hosted commands to the payload 570.

Then, the payload is reconfigured according to the unencrypted host commands and/or the unencrypted hosted commands 575. The payload antenna then transmits payload data to the host receiving antenna and/or a hosted receiving antenna 580. Then, the payload transmits to the first communication security module unencrypted host telemetry 585. The payload transmits to the second communication security module unencrypted hosted telemetry 590. Then, the first communication security module encrypts the unencrypted host telemetry utilizing the first COMSEC variety to generate encrypted host telemetry 591. The second communication security module encrypts the unencrypted hosted telemetry utilizing the second COMSEC variety to generate encrypted hosted telemetry 592.

Then, the first communication security module transmits the encrypted host telemetry to a host telemetry transmitter 593. The host telemetry transmitter then transmits the encrypted host telemetry to the host SOC 594. Then, the host SOC decrypts the encrypted host telemetry utilizing the first COMSEC variety to generate the unencrypted host telemetry 595.

Then, the second communication security module transmits the encrypted hosted telemetry to a hosted telemetry transmitter 596. The hosted telemetry transmitter then transmits the encrypted hosted telemetry to the host SOC 597. Then, the host SOC transmits the encrypted hosted telemetry to the HOC 598. The HOC then decrypts the encrypted hosted telemetry utilizing the second COMSEC variety to generate the unencrypted hosted telemetry 599. Then, the method ends 501.

FIG. 6A is a diagram 600 showing the disclosed system for a virtual transponder utilizing inband commanding for the host user (i.e. host SOC) 650 and the hosted user (i.e. HOC) 660 using two receiving antennas and employing two communication security (COMSEC) varieties for telemetry, in accordance with at least one embodiment of the present disclosure. In this figure, a vehicle 610, a host SOC 650, and a HOC 660 are shown. The HOC 660 has leased at least a portion (e.g., a virtual transponder(s)) of the payload 605 of the vehicle 610 from the owner of a satellite (i.e. the host SOC) 650. It should be noted that in some embodiments, the HOC 660 may lease all of the payload 605 of the vehicle 610 from the owner of a satellite (i.e. the host SOC) 650. Also, it should be noted that is some embodiments, the HOC 660 may own the payload 605 (e.g., a steerable antenna) of the vehicle 610, and contract the host SOC 650 to transmit encrypted hosted commands to the vehicle 610.

During operation, the HOC 660 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 605 that the HOC 660 is leasing from the host SOC 650. The host SOC 650 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 605 that host SOC 650 is utilizing for itself.

It should be noted that, although in FIG. 6A the host SOC 650 is depicted to have its ground antenna located right next to its operations building; in other embodiments, the host SOC 650 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The host SOC 650 then transmits 620 the encrypted host commands to a host receiving antenna 685. After the host receiving antenna 685 receives the encrypted host commands, the host receiving antenna 685 transmits 621 the encrypted host commands to a payload antenna 680 on the vehicle 610. The host receiving antenna 685 transmits 621 the encrypted host commands utilizing an in-band frequency band(s) (i.e. a frequency band(s) that is the same frequency band(s) utilized to transmit payload data). The payload antenna 680 transmits the encrypted host commands to a payload 605. The payload 605 on the vehicle 610 receives the encrypted host commands. The payload 605 then transmits 652 the encrypted host commands to a first communication security module 662. The first communication security module 662 decrypts the encrypted host commands utilizing the first COMSEC variety (i.e. COMSEC Variety 1) to generate unencrypted host commands.

It should be noted that the first communication security module 662 may comprise one or more modules. In addition, the first communication security module 662 may comprise one or more processors.

The HOC 660 then transmits 615 the encrypted hosted commands to a hosted receiving antenna 690. After the hosted receiving antenna 690 receives the encrypted hosted commands, the hosted receiving antenna 690 transmits 697 the encrypted hosted commands to a payload antenna 680 on the vehicle 610. The hosted receiving antenna 690 transmits 697 the encrypted hosted commands utilizing an in-band frequency band(s) (i.e. a frequency band(s) that is the same frequency band(s) utilized to transmit payload data). The payload antenna 680 transmits the encrypted hosted commands to a payload 605. The payload 605 on the vehicle 610 receives the encrypted hosted commands. The payload 605 then transmits 655 the encrypted hosted commands to a second communication security module 665. The second communication security module 665 decrypts the encrypted hosted commands utilizing the second COMSEC variety (i.e. COMSEC Variety 2) to generate unencrypted hosted commands.

It should be noted that the second communication security module 665 may comprise one or more modules. In addition, the second communication security module 665 may comprise one or more processors.

The first communication security module 662 then transmits 670 the unencrypted host commands to the payload (i.e. the shared host/hosted payload) 605. The second communication security module 665 transmits 675 the unencrypted hosted commands to the payload (i.e. the shared host/hosted payload) 605. The payload 605 is reconfigured according to the unencrypted host commands and/or the unencrypted hosted commands. The payload antenna 680 then transmits (e.g., in one or more antenna beams 681) payload data to the host receiving antenna 685 and/or the hosted receiving antenna 690 on the ground.

Also, it should be noted that, although in FIG. 6A, antenna beams 681 is shown to include a plurality of circular spot beams; in other embodiments, antenna beams 681 may include more or less number of beams than is shown in FIG. 6A (e.g., antenna beams 681 may only include a single beam), and antenna beams 681 may include beams of different shapes than circular spot beams as is shown in FIG. 6A (e.g., antenna beams 681 may include elliptical beams and/or shaped beams of various different shapes).

It should be noted that in one or more embodiments, the payload antenna 680 may comprise one or more reflector dishes including, but not limited to, parabolic reflectors and/or shaped reflectors. In some embodiments, the payload antenna 680 may comprise one or more multifeed antenna arrays.

The payload 605 transmits 691 unencrypted host telemetry (i.e. unencrypted host TLM, which is telemetry data related to the portion of the payload 605 that is utilized by the host SOC 650) to the first communication security module 662. The first communication security module 662 then encrypts the unencrypted host telemetry utilizing the first COMSEC variety to generate encrypted host telemetry (i.e. encrypted host TLM).

The payload 605 transmits 692 unencrypted hosted telemetry (i.e. unencrypted HoP TLM, which is telemetry data related to the portion of the payload 605 that is leased by the HOC 660) to the second communication security module 665. The second communication security module 665 then encrypts the unencrypted hosted telemetry utilizing the second COMSEC variety to generate encrypted hosted telemetry (i.e. encrypted HoP TLM).

The first communication security module 662 then transmits 693 the encrypted host telemetry to a host telemetry transmitter 689. The host telemetry transmitter 689 then transmits 695 the encrypted host telemetry to the host SOC 650. The host telemetry transmitter 689 transmits 695 the encrypted host telemetry utilizing an out-of-band frequency band(s). The host SOC 650 then decrypts the encrypted host telemetry utilizing the first COMSEC variety to generate the unencrypted host telemetry.

The second communication security module 665 then transmits 696 the encrypted hosted telemetry to a hosted telemetry transmitter 694. The hosted telemetry transmitter 694 then transmits 698 the encrypted hosted telemetry to the host SOC 650. The telemetry transmitter 694 transmits 698 the encrypted hosted telemetry utilizing an out-of-band frequency band(s). The host SOC 650 then transmits 699 the encrypted hosted telemetry to the HOC 660. The HOC 660 then decrypts the encrypted hosted telemetry utilizing the second COMSEC variety to generate the unencrypted hosted telemetry.

FIG. 6B is a diagram 6000 showing the disclosed system for a virtual transponder utilizing inband commanding for the host user (i.e. host SOC) 6050 and the hosted user (i.e.

HOC) 6060 using one receiving antenna and employing two communication security (COMSEC) varieties for telemetry, in accordance with at least one embodiment of the present disclosure. In this figure, a vehicle 6010, a host SOC 6050, and a HOC 6060 are shown. The HOC 6060 has leased at least a portion (e.g., a virtual transponder(s)) of the payload 6005 of the vehicle 6010 from the owner of a satellite (i.e. the host SOC) 6050. It should be noted that in some embodiments, the HOC 6060 may lease all of the payload 6005 of the vehicle 6010 from the owner of a satellite (i.e. the host SOC) 6050. Also, it should be noted that is some embodiments, the HOC 6060 may own the payload 6005 (e.g., a steerable antenna) of the vehicle 6010, and contract the host SOC 6050 to transmit encrypted hosted commands to the vehicle 6010.

During operation, the HOC 6060 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 6005 that the HOC 6060 is leasing from the host SOC 6050. The host SOC 6050 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 6005 that host SOC 6050 is utilizing for itself.

It should be noted that, although in FIG. 6B the host SOC 6050 is depicted to have its ground antenna located right next to its operations building; in other embodiments, the host SOC 6050 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 6060 transmits 6015 the encrypted hosted commands to the host SOC 6050. The host SOC 6050 then transmits 6020, 6025 the encrypted host commands and the encrypted hosted commands to a host receiving antenna 6085. After the host receiving antenna 6085 receives the encrypted host commands and the encrypted hosted commands, the host receiving antenna 6085 transmits 6097, 6021 the encrypted host commands and the encrypted hosted commands to a payload antenna 6080 on the vehicle 6010. The host receiving antenna 6085 transmits 6097, 6021 the encrypted host commands and the encrypted hosted commands utilizing an in-band frequency band(s) (i.e. a frequency band(s) that is the same frequency band(s) utilized to transmit payload data). The payload antenna 6080 transmits the encrypted host commands and the encrypted hosted commands to a payload 6005. The payload 6005 on the vehicle 6010 receives the encrypted host commands and the encrypted hosted commands. The payload 6005 then transmits 6052 the encrypted host commands to a first communication security module 6062. The first communication security module 6062 decrypts the encrypted host commands utilizing the first COMSEC variety (i.e. COMSEC Variety 1) to generate unencrypted host commands.

It should be noted that the first communication security module 6062 may comprise one or more modules. In addition, the first communication security module 6062 may comprise one or more processors.

The payload 6005 then transmits 6055 the encrypted hosted commands to a second communication security module 6065. The second communication security module 6065 decrypts the encrypted hosted commands utilizing the second COMSEC variety (i.e. COMSEC Variety 2) to generate unencrypted hosted commands.

It should be noted that the second communication security module 6065 may comprise one or more modules. In addition, the second communication security module 6065 may comprise one or more processors.

The first communication security module 6062 then transmits 6070 the unencrypted host commands to the payload (i.e. the shared host/hosted payload) 6005. The second communication security module 6065 transmits 6075 the unencrypted hosted commands to the payload (i.e. the shared host/hosted payload) 6005. The payload 6005 is reconfigured according to the unencrypted host commands and/or the unencrypted hosted commands. The payload antenna 6080 then transmits (e.g., in one or more antenna beams 6081) payload data to a host receiving antenna 6085 and/or the hosted receiving antenna 6090 on the ground.

Also, it should be noted that, although in FIG. 6B, antenna beams 6081 is shown to include a plurality of circular spot beams; in other embodiments, antenna beams 6081 may include more or less number of beams than is shown in FIG. 6B (e.g., antenna beams 6081 may only include a single beam), and antenna beams 6081 may include beams of different shapes than circular spot beams as is shown in FIG. 6B (e.g., antenna beams 6081 may include elliptical beams and/or shaped beams of various different shapes).

It should be noted that in one or more embodiments, the payload antenna 6080 may comprise one or more reflector dishes including, but not limited to, parabolic reflectors and/or shaped reflectors. In some embodiments, the payload antenna 6080 may comprise one or more multifeed antenna arrays.

The payload 6005 transmits 6091 unencrypted host telemetry (i.e. unencrypted host TLM, which is telemetry data related to the portion of the payload 6005 that is utilized by the host SOC 6050) to the first communication security module 6062. The first communication security module 6062 then encrypts the unencrypted host telemetry utilizing the first COMSEC variety to generate encrypted host telemetry (i.e. encrypted host TLM).

The payload 6005 transmits 6092 unencrypted hosted telemetry (i.e. unencrypted HoP TLM, which is telemetry data related to the portion of the payload 6005 that is leased by the HOC 6060) to the second communication security module 6065. The second communication security module 6065 then encrypts the unencrypted hosted telemetry utilizing the second COMSEC variety to generate encrypted hosted telemetry (i.e. encrypted HoP TLM).

The first communication security module 6062 then transmits 6093 the encrypted host telemetry to a host telemetry transmitter 6089. The host telemetry transmitter 6089 then transmits 6095 the encrypted host telemetry to the host SOC 6050. The host telemetry transmitter 6089 transmits 6095 the encrypted host telemetry utilizing an out-of-band frequency band(s). The host SOC 6050 then decrypts the encrypted host telemetry utilizing the first COMSEC variety to generate the unencrypted host telemetry.

The second communication security module 6065 then transmits 6096 the encrypted hosted telemetry to a hosted telemetry transmitter 6094. The hosted telemetry transmitter 6094 then transmits 6098 the encrypted hosted telemetry to the host SOC 6050. The telemetry transmitter 6094 transmits 6098 the encrypted hosted telemetry utilizing an out-of-band frequency band(s). The host SOC 6050 then transmits 6099 the encrypted hosted telemetry to the HOC 6060. The HOC 6060 then decrypts the encrypted hosted telemetry utilizing the second COMSEC variety to generate the unencrypted hosted telemetry.

FIGS. 7A, 7B, 7C, and 7D together show a flow chart for the disclosed method for a virtual transponder utilizing inband commanding for the host user and the hosted user using two receiving antennas and employing two COMSEC varieties for telemetry, in accordance with at least one embodiment of the present disclosure. At the start 700 of the method, a hosted payload (HoP) operation center (HOC) encrypts unencrypted hosted commands by utilizing a second communication security (COMSEC) variety to produce encrypted hosted commands 705. Then, the HOC transmits the encrypted hosted commands to a hosted receiving antenna 710. The hosted receiving antenna then transmits the encrypted hosted commands to a payload antenna on a vehicle 715. Then, the payload antenna transmits the encrypted hosted commands to a payload on the vehicle 720. The payload then transmits the encrypted hosted commands to a second communication security module 725.

Then, a host spacecraft operations center (SOC) encrypts unencrypted host commands by utilizing a first COMSEC variety to produce encrypted host commands 730. The host SOC then transmits the encrypted host commands to a host receiving antenna 735. Then, the host receiving antenna transmits the encrypted host commands to a payload antenna on the vehicle 740. The payload antenna then transmits the encrypted host commands to the payload 745. Then, the payload transmits the encrypted host commands to a first communication security module 750. The first communication security module then decrypts the encrypted host commands utilizing the first COMSEC variety to generate the unencrypted host commands 755. The second communication security module decrypts the encrypted hosted commands utilizing the second COMSEC variety to generate the unencrypted hosted commands 760. Then, the first communication security module transmits the unencrypted host commands to the payload 765. The second communication security module then transmits the unencrypted hosted commands to the payload 770.

Then, the payload is reconfigured according to the unencrypted host commands and/or the unencrypted hosted commands 775. The payload antenna then transmits payload data to the host receiving antenna and/or the hosted receiving antenna 780. Then, the payload transmits to the first communication security module unencrypted host telemetry 785. The payload then transmits to the second communication security module unencrypted hosted telemetry 790. Then, the first communication security module encrypts the unencrypted host telemetry utilizing the first COMSEC variety to generate encrypted host telemetry 791. The second communication security module encrypts the unencrypted hosted telemetry utilizing the second COMSEC variety to generate encrypted hosted telemetry 792.

Then, the first communication security module transmits the encrypted host telemetry to a host telemetry transmitter 793. The host telemetry transmitter then transmits the encrypted host telemetry to the host SOC 794. Then, the host SOC decrypts the encrypted host telemetry utilizing the first COMSEC variety to generate the unencrypted host telemetry 795.

Then, the second communication security module transmits the encrypted hosted telemetry to a hosted telemetry transmitter 796. The hosted telemetry transmitter then transmits the encrypted hosted telemetry to the host SOC 797. Then, the host SOC transmits the encrypted hosted telemetry to the HOC 798. The HOC then decrypts the encrypted hosted telemetry utilizing the second COMSEC variety to generate the unencrypted hosted telemetry 799. Then, the method ends 701.

FIGS. 7E, 7F, 7G, and 7H together show a flow chart for the disclosed method for a virtual transponder utilizing inband commanding for the host user and the hosted user using one receiving antenna and employing two communication security (COMSEC) varieties for telemetry, in accordance with at least one embodiment of the present disclosure. At the start 70000 of the method, a hosted payload (HoP) operation center (HOC) encrypts unencrypted hosted commands by utilizing a second communication security (COMSEC) variety to produce encrypted hosted commands 70005. Then, the HOC transmits the encrypted hosted commands to a host spacecraft operations center (SOC) 70010. The host SOC encrypts unencrypted host commands by utilizing a first COMSEC variety to produce encrypted host commands 70015. The host SOC then transmits the encrypted host commands and the encrypted hosted commands to a host receiving antenna 70020. Then, the host receiving antenna transmits the encrypted host commands and the encrypted hosted commands to a payload antenna on the vehicle 70025. The payload antenna then transmits the encrypted host commands and the encrypted hosted commands to a payload on the vehicle 70030. Then, the payload transmits the encrypted host commands to a first communication security module 70035. The payload then transmits the encrypted hosted commands to a second communication security module 70040.

The first communication security module then decrypts the encrypted host commands utilizing the first COMSEC variety to generate the unencrypted host commands 70045. The second communication security module decrypts the encrypted hosted commands utilizing the second COMSEC variety to generate the unencrypted hosted commands 70050. Then, the first communication security module transmits the unencrypted host commands to the payload 70055. The second communication security module transmits the unencrypted hosted commands to the payload 70060.

Then, the payload is reconfigured according to the unencrypted host commands and/or the unencrypted hosted commands 70065. The payload antenna then transmits payload data to the host receiving antenna and/or a hosted receiving antenna 70070. Then, the payload transmits to the first communication security module unencrypted host telemetry 70075. The payload transmits to the second communication security module unencrypted hosted telemetry 70080. Then, the first communication security module encrypts the unencrypted host telemetry utilizing the first COMSEC variety to generate encrypted host telemetry 70085. The second communication security module encrypts the unencrypted hosted telemetry utilizing the second COMSEC variety to generate encrypted hosted telemetry 70090.

Then, the first communication security module transmits the encrypted host telemetry to a host telemetry transmitter 70091. The host telemetry transmitter then transmits the encrypted host telemetry to the host SOC 70092. Then, the host SOC decrypts the encrypted host telemetry utilizing the first COMSEC variety to generate the unencrypted host telemetry 70093.

Then, the second communication security module transmits the encrypted hosted telemetry to a hosted telemetry transmitter 70094. The hosted telemetry transmitter then transmits the encrypted hosted telemetry to the host SOC 70095. Then, the host SOC transmits the encrypted hosted telemetry to the HOC 70096. The HOC then decrypts the encrypted hosted telemetry utilizing the second COMSEC variety to generate the unencrypted hosted telemetry 70097. Then, the method ends 70098.

FIG. 8A is a diagram 800 showing the disclosed system for a virtual transponder utilizing inband commanding for the host user (i.e. host SOC) 850 and the hosted user (i.e. HOC) 860 using two receiving antennas and employing one COMSEC variety for telemetry, in accordance with at least one embodiment of the present disclosure. In this figure, a vehicle 810, a host SOC 850, and a HOC 860 are shown. The HOC 860 has leased at least a portion (e.g., a virtual transponder(s)) of the payload 805 of the vehicle 810 from the owner of a satellite (i.e. the host SOC) 850. It should be noted that in some embodiments, the HOC 860 may lease all of the payload 805 of the vehicle 810 from the owner of a satellite (i.e. the host SOC) 850. Also, it should be noted that is some embodiments, the HOC 860 may own the payload 805 (e.g., a steerable antenna) of the vehicle 810, and contract the host SOC 850 to transmit encrypted hosted commands to the vehicle 810.

During operation, the HOC 860 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 805 that the HOC 860 is leasing from the host SOC 850. The host SOC 850 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 805 that host SOC 850 is utilizing for itself.

It should be noted that, although in FIG. 8A the host SOC 850 is depicted to have its ground antenna located right next to its operations building; in other embodiments, the host SOC 850 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The host SOC 850 then transmits 820 the encrypted host commands to a host receiving antenna 885. After the host receiving antenna 885 receives the encrypted host commands, the host receiving antenna 885 transmits 821 the encrypted host commands to a payload antenna 880 on the vehicle 810. The host receiving antenna 885 transmits 821 the encrypted host commands utilizing an in-band frequency band(s) (i.e. a frequency band(s) that is the same frequency band(s) utilized to transmit payload data). The payload antenna 880 transmits the encrypted host commands to a payload 805. The payload 805 on the vehicle 810 receives the encrypted host commands. The payload 805 then transmits 852 the encrypted host commands to a first communication security module 862. The first communication security module 862 decrypts the encrypted host commands utilizing the first COMSEC variety (i.e. COMSEC Variety 1) to generate unencrypted host commands.

It should be noted that the first communication security module 862 may comprise one or more modules. In addition, the first communication security module 862 may comprise one or more processors.

The HOC 860 then transmits 815 the encrypted hosted commands to a hosted receiving antenna 890. After the hosted receiving antenna 890 receives the encrypted hosted commands, the hosted receiving antenna 890 transmits 897 the encrypted hosted commands to a payload antenna 880 on the vehicle 810. The hosted receiving antenna 890 transmits 897 the encrypted hosted commands utilizing an in-band frequency band(s) (i.e. a frequency band(s) that is the same frequency band(s) utilized to transmit payload data). The payload antenna 880 transmits the encrypted hosted commands to a payload 805. The payload 805 on the vehicle 810 receives the encrypted hosted commands. The payload 805 then transmits 855 the encrypted hosted commands to a second communication security module 865. The second communication security module 865 decrypts the encrypted hosted commands utilizing the second COMSEC variety (i.e. COMSEC Variety 2) to generate unencrypted hosted commands.

It should be noted that the second communication security module 865 may comprise one or more modules. In addition, the second communication security module 865 may comprise one or more processors.

The first communication security module 862 then transmits 870 the unencrypted host commands to the payload (i.e. the shared host/hosted payload) 805. The second communication security module 865 transmits 875 the unencrypted hosted commands to the payload (i.e. the shared host/hosted payload) 805. The payload 805 is reconfigured according to the unencrypted host commands and/or the unencrypted hosted commands. The payload antenna 880 then transmits (e.g., in one or more antenna beams 881) payload data to the host receiving antenna 885 and/or the hosted receiving antenna 890 on the ground.

Also, it should be noted that, although in FIG. 8A, antenna beams 881 is shown to include a plurality of circular spot beams; in other embodiments, antenna beams 881 may include more or less number of beams than is shown in FIG. 8A (e.g., antenna beams 881 may only include a single beam), and antenna beams 881 may include beams of different shapes than circular spot beams as is shown in FIG. 8A (e.g., antenna beams 881 may include elliptical beams and/or shaped beams of various different shapes).

It should be noted that in one or more embodiments, the payload antenna 880 may comprise one or more reflector dishes including, but not limited to, parabolic reflectors and/or shaped reflectors. In some embodiments, the payload antenna 880 may comprise one or more multifeed antenna arrays.

The payload 805 transmits 891 unencrypted telemetry (i.e. unencrypted host TLM, which is telemetry data related to the portion of the payload 805 that is utilized by the host SOC 850; and unencrypted HoP TLM, which is telemetry data related to the portion of the payload 805 that is leased by the HOC 860) to the first communication security module 862. The first communication security module 862 then encrypts the unencrypted telemetry utilizing the first COMSEC variety to generate encrypted telemetry (i.e. encrypted TLM).

The first communication security module 862 then transmits 893 the encrypted telemetry to a telemetry transmitter 889. The telemetry transmitter 889 then transmits 895 the encrypted telemetry to the host SOC 850. The host telemetry transmitter 889 transmits 895 the encrypted telemetry utilizing an out-of-band frequency band(s).

The host SOC 850 then decrypts the encrypted telemetry utilizing the first COMSEC variety to generate the unencrypted telemetry. The host SOC 850 then utilizes a database that comprises host payload decommutated information and does not comprise hosted payload decommutated information (i.e. a database without hosted payload decommutated information) to read to unencrypted telemetry to determine the telemetry data related to the portion of the payload 805 that is utilized by the host SOC 850.

The host SOC 850 then transmits 899 the encrypted telemetry to the HOC 860. The HOC 860 then decrypts the encrypted telemetry utilizing the first COMSEC variety to generate the unencrypted telemetry. The HOC 860 then utilizes a database that comprises hosted payload decommutated information and does not comprise host payload decommutated information (i.e. a database without host payload decommutated information) to read to unencrypted telemetry to determine the telemetry data related to the portion of the payload 805 that is utilized by the HOC 860.

FIG. 8B is a diagram 8000 showing the disclosed system for a virtual transponder utilizing inband commanding for the host user (i.e. host SOC) 8050 and the hosted user (i.e. HOC) 8060 using one receiving antenna and employing one COMSEC variety for telemetry, in accordance with at least one embodiment of the present disclosure. In this figure, a vehicle 8010, a host SOC 8050, and a HOC 8060 are shown. The HOC 8060 has leased at least a portion (e.g., a virtual transponder(s)) of the payload 8005 of the vehicle 8010 from the owner of a satellite (i.e. the host SOC) 8050. It should be noted that in some embodiments, the HOC 8060 may lease all of the payload 8005 of the vehicle 8010 from the owner of a satellite (i.e. the host SOC) 8050. Also, it should be noted that is some embodiments, the HOC 8060 may own the payload 8005 (e.g., a steerable antenna) of the vehicle 8010, and contract the host SOC 8050 to transmit encrypted hosted commands to the vehicle 8010.

During operation, the HOC 8060 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 8005 that the HOC 8060 is leasing from the host SOC 8050. The host SOC 8050 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 8005 that host SOC 8050 is utilizing for itself.

It should be noted that, although in FIG. 8B the host SOC 8050 is depicted to have its ground antenna located right next to its operations building; in other embodiments, the host SOC 8050 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The host SOC 8050 then transmits 8020 the encrypted host commands to a host receiving antenna 8085. After the host receiving antenna 8085 receives the encrypted host commands, the host receiving antenna 8085 transmits 8021 the encrypted host commands to a payload antenna 8080 on the vehicle 8010. The host receiving antenna 8085 transmits 8021 the encrypted host commands utilizing an in-band frequency band(s) (i.e. a frequency band(s) that is the same frequency band(s) utilized to transmit payload data). The payload antenna 8080 transmits the encrypted host commands to a payload 8005. The payload 8005 on the vehicle 8010 receives the encrypted host commands. The payload 8005 then transmits 8052 the encrypted host commands to a first communication security module 8062. The first communication security module 8062 decrypts the encrypted host commands utilizing the first COMSEC variety (i.e. COMSEC Variety 1) to generate unencrypted host commands.

It should be noted that the first communication security module 8062 may comprise one or more modules. In addition, the first communication security module 8062 may comprise one or more processors.

The HOC 8060 then transmits 8015 the encrypted hosted commands to the host SOC 8050. The host SOC 8050 then transmits 8016 the encrypted hosted commands to a host receiving antenna 8085. After the host receiving antenna 8085 receives the encrypted hosted commands, the host receiving antenna 8085 transmits 8097 the encrypted hosted commands to a payload antenna 8080 on the vehicle 8010. The host receiving antenna 8085 transmits 8097 the encrypted hosted commands utilizing an in-band frequency band(s) (i.e. a frequency band(s) that is the same frequency band(s) utilized to transmit payload data). The payload antenna 8080 transmits the encrypted hosted commands to a payload 8005. The payload 8005 on the vehicle 8010 receives the encrypted hosted commands. The payload 8005 then transmits 8055 the encrypted hosted commands to a second communication security module 8065. The second communication security module 8065 decrypts the encrypted hosted commands utilizing the second COMSEC variety (i.e. COMSEC Variety 2) to generate unencrypted hosted commands.

It should be noted that the second communication security module 8065 may comprise one or more modules. In addition, the second communication security module 8065 may comprise one or more processors.

The first communication security module 8062 then transmits 8070 the unencrypted host commands to the payload (i.e. the shared host/hosted payload) 8005. The second communication security module 8065 transmits 8075 the unencrypted hosted commands to the payload (i.e. the shared host/hosted payload) 8005. The payload 8005 is reconfigured according to the unencrypted host commands and/or the unencrypted hosted commands. The payload antenna 8080 then transmits (e.g., in one or more antenna beams 8081) payload data to the host receiving antenna 8085 and/or the hosted receiving antenna 8090 on the ground.

Also, it should be noted that, although in FIG. 8B, antenna beams 8081 is shown to include a plurality of circular spot beams; in other embodiments, antenna beams 8081 may include more or less number of beams than is shown in FIG. 8B (e.g., antenna beams 8081 may only include a single beam), and antenna beams 8081 may include beams of different shapes than circular spot beams as is shown in FIG. 8B (e.g., antenna beams 8081 may include elliptical beams and/or shaped beams of various different shapes).

It should be noted that in one or more embodiments, the payload antenna 8080 may comprise one or more reflector dishes including, but not limited to, parabolic reflectors and/or shaped reflectors. In some embodiments, the payload antenna 8080 may comprise one or more multifeed antenna arrays.

The payload 8005 transmits 8091 unencrypted telemetry (i.e. unencrypted host TLM, which is telemetry data related to the portion of the payload 8005 that is utilized by the host SOC 8050; and unencrypted HoP TLM, which is telemetry data related to the portion of the payload 8005 that is leased by the HOC 8060) to the first communication security module 8062. The first communication security module 8062 then encrypts the unencrypted telemetry utilizing the first COMSEC variety to generate encrypted telemetry (i.e. encrypted TLM).

The first communication security module 8062 then transmits 8093 the encrypted telemetry to a telemetry transmitter 8089. The telemetry transmitter 8089 then transmits 8095 the encrypted telemetry to the host SOC 8050. The host telemetry transmitter 8089 transmits 8095 the encrypted telemetry utilizing an out-of-band frequency band(s).

The host SOC 8050 then decrypts the encrypted telemetry utilizing the first COMSEC variety to generate the unencrypted telemetry. The host SOC 8050 then utilizes a database that comprises host payload decommutated information and does not comprise hosted payload decommutated information (i.e. a database without hosted payload decommutated information) to read to unencrypted telemetry to determine the telemetry data related to the portion of the payload 8005 that is utilized by the host SOC 8050.

The host SOC 8050 then transmits 8099 the encrypted telemetry to the HOC 8060. The HOC 8060 then decrypts the encrypted telemetry utilizing the first COMSEC variety to generate the unencrypted telemetry. The HOC 8060 then utilizes a database that comprises hosted payload decommutated information and does not comprise host payload decommutated information (i.e. a database without host payload decommutated information) to read to unencrypted telemetry to determine the telemetry data related to the portion of the payload 8005 that is utilized by the HOC 8060.

FIGS. 9A, 9B, 9C, and 9D together show a flow chart for the disclosed method for a virtual transponder utilizing inband commanding for the host user and the hosted user using two receiving antennas and employing one COMSEC variety for telemetry, in accordance with at least one embodiment of the present disclosure. At the start 900 of the method, a hosted payload (HoP) operation center (HOC) encrypts unencrypted hosted commands by utilizing a second communication security (COMSEC) variety to produce encrypted hosted commands 905. Then, the HOC transmits the encrypted hosted commands to a hosted receiving antenna 910. The hosted receiving antenna then transmits the encrypted hosted commands to a payload antenna on a vehicle 915. Then, the payload antenna transmits the encrypted hosted commands to a payload on the vehicle 920. The payload then transmits the encrypted hosted commands to a second communication security module 925.

Then, a host spacecraft operations center (SOC) encrypts unencrypted host commands by utilizing a first COMSEC variety to produce encrypted host commands 930. The host SOC then transmits the encrypted host commands to a host receiving antenna 935. Then, the host receiving antenna transmits the encrypted host commands to a payload antenna on the vehicle 940. The payload antenna then transmits the encrypted host commands to the payload 945. Then, the payload transmits the encrypted host commands to a first communication security module 950. The first communication security module then decrypts the encrypted host commands utilizing the first COMSEC variety to generate the unencrypted host commands 955. Then, the second communication security module decrypts the encrypted hosted commands utilizing the second COMSEC variety to generate the unencrypted hosted commands 960. The first communication security module then transmits the unencrypted host commands to the payload 965. Then, the second communication security module transmits the unencrypted hosted commands to the payload 970.

Then, the payload is reconfigured according to the unencrypted host commands and/or the unencrypted hosted commands 975. The payload antenna then transmits payload data to the host receiving antenna and/or the hosted receiving antenna 980. Then, the payload transmits to the first communication security module unencrypted telemetry 985. The first communication security module then encrypts the unencrypted telemetry utilizing the first COMSEC variety to generate encrypted telemetry 990.

Then, the first communication security module transmits the encrypted telemetry to a telemetry transmitter 991. The telemetry transmitter then transmits the encrypted telemetry to the host SOC 992. Then, the host SOC decrypts the encrypted telemetry utilizing the first COMSEC variety to generate the unencrypted host telemetry 993. The host SOC then determining telemetry data related to a portion of the payload utilized by the host SOC by using a database without hosted decommutated information to read the unencrypted telemetry 994. Then, the host SOC transmits the encrypted telemetry to the HOC 995. The HOC then decrypts the encrypted telemetry utilizing the first COMSEC variety to generate the unencrypted telemetry 996. Then, the HOC determines telemetry data related to a portion of the payload utilized by the HOC by using a database without host decommutated information to read the unencrypted telemetry 997. Then, the method ends 998.

FIGS. 9E, 9F, 9G, and 9H together show a flow chart for the disclosed method for a virtual transponder utilizing inband commanding for the host user and the hosted user using one receiving antenna and employing one COMSEC variety for telemetry, in accordance with at least one embodiment of the present disclosure. At the start 9000 of the method, a hosted payload (HoP) operation center (HOC) encrypts unencrypted hosted commands by utilizing a second communication security (COMSEC) variety to produce encrypted hosted commands 9005. Then, the HOC transmits the encrypted hosted commands to a host spacecraft operations center (SOC) 9010. The host SOC then transmits the encrypted hosted commands to a host receiving antenna 9012. The host receiving antenna then transmits the encrypted hosted commands to a payload antenna on a vehicle 9015. Then, the payload antenna transmits the encrypted hosted commands to a payload on the vehicle 9020. The payload then transmits the encrypted hosted commands to a second communication security module 9025.

Then, a host spacecraft operations center (SOC) encrypts unencrypted host commands by utilizing a first COMSEC variety to produce encrypted host commands 9030. The host SOC then transmits the encrypted host commands to a host receiving antenna 9035. Then, the host receiving antenna transmits the encrypted host commands to a payload antenna on the vehicle 9040. The payload antenna then transmits the encrypted host commands to the payload 9045. Then, the payload transmits the encrypted host commands to a first communication security module 9050. The first communication security module then decrypts the encrypted host commands utilizing the first COMSEC variety to generate the unencrypted host commands 9055. Then, the second communication security module decrypts the encrypted hosted commands utilizing the second COMSEC variety to generate the unencrypted hosted commands 9060. The first communication security module then transmits the unencrypted host commands to the payload 9065. Then, the second communication security module transmits the unencrypted hosted commands to the payload 9070.

Then, the payload is reconfigured according to the unencrypted host commands and/or the unencrypted hosted commands 9075. The payload antenna then transmits payload data to the host receiving antenna and/or the hosted receiving antenna 9080. Then, the payload transmits to the first communication security module unencrypted telemetry 9085. The first communication security module then encrypts the unencrypted telemetry utilizing the first COMSEC variety to generate encrypted telemetry 9090.

Then, the first communication security module transmits the encrypted telemetry to a telemetry transmitter 9091. The telemetry transmitter then transmits the encrypted telemetry to the host SOC 9092. Then, the host SOC decrypts the encrypted telemetry utilizing the first COMSEC variety to generate the unencrypted host telemetry 9093. The host SOC then determining telemetry data related to a portion of the payload utilized by the host SOC by using a database without hosted decommutated information to read the unencrypted telemetry 9094. Then, the host SOC transmits the encrypted telemetry to the HOC 9095. The HOC then decrypts the encrypted telemetry utilizing the first COMSEC variety to generate the unencrypted telemetry 9096. Then, the HOC determines telemetry data related to a portion of the payload utilized by the HOC by using a database without host decommutated information to read the unencrypted telemetry 9097. Then, the method ends 9098.

FIG. 10A is a diagram 1000 showing the disclosed system for a virtual transponder utilizing inband telemetry and commanding for the host user (i.e. host SOC) 1050 and the hosted user (i.e. HOC) 1060 using two receiving antennas and employing two COMSEC varieties for telemetry, in accordance with at least one embodiment of the present disclosure. In this figure, a vehicle 1010, a host SOC 1050, and a HOC 1060 are shown. The HOC 1060 has leased at least a portion (e.g., a virtual transponder(s)) of the payload 1005 of the vehicle 1010 from the owner of a satellite (i.e. the host SOC) 1050. It should be noted that in some embodiments, the HOC 1060 may lease all of the payload 1005 of the vehicle 1010 from the owner of a satellite (i.e. the host SOC) 1050. Also, it should be noted that is some embodiments, the HOC 1060 may own the payload 1005 (e.g., a steerable antenna) of the vehicle 1010, and contract the host SOC 1050 to transmit encrypted hosted commands to the vehicle 1010.

During operation, the HOC 1060 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 1005 that the HOC 1060 is leasing from the host SOC 1050. The host SOC 1050 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 1005 that host SOC 1050 is utilizing for itself.

It should be noted that, although in FIG. 10A the host SOC 1050 is depicted to have its ground antenna located right next to its operations building; in other embodiments, the host SOC 1050 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The host SOC 1050 then transmits 1020 the encrypted host commands to a host receiving antenna 1085. After the host receiving antenna 1085 receives the encrypted host commands, the host receiving antenna 1085 transmits 1021 the encrypted host commands to a payload antenna 1080 on the vehicle 1010. The host receiving antenna 1085 transmits 1021 the encrypted host commands utilizing an in-band frequency band(s) (i.e. a frequency band(s) that is the same frequency band(s) utilized to transmit payload data). The payload antenna 1080 transmits the encrypted host commands to a payload 1005. The payload 1005 on the vehicle 1010 receives the encrypted host commands. The payload 1005 then transmits 1052 the encrypted host commands to a first communication security module 1062. The first communication security module 1062 decrypts the encrypted host commands utilizing the first COMSEC variety (i.e. COMSEC Variety 1) to generate unencrypted host commands.

It should be noted that the first communication security module 1062 may comprise one or more modules. In addition, the first communication security module 1062 may comprise one or more processors.

The HOC 1060 then transmits 1015 the encrypted hosted commands to a hosted receiving antenna 1090. After the hosted receiving antenna 1090 receives the encrypted hosted commands, the hosted receiving antenna 1090 transmits 1097 the encrypted hosted commands to a payload antenna 1080 on the vehicle 1010. The hosted receiving antenna 1090 transmits 1097 the encrypted hosted commands utilizing an in-band frequency band(s) (i.e. a frequency band(s) that is the same frequency band(s) utilized to transmit payload data). The payload antenna 1080 transmits the encrypted hosted commands to a payload 1005. The payload 1005 on the vehicle 1010 receives the encrypted hosted commands. The payload 1005 then transmits 1055 the encrypted hosted commands to a second communication security module 1065. The second communication security module 1065 decrypts the encrypted hosted commands utilizing the second COMSEC variety (i.e. COMSEC Variety 2) to generate unencrypted hosted commands.

It should be noted that the second communication security module 1065 may comprise one or more modules. In addition, the second communication security module 1065 may comprise one or more processors.

The first communication security module 1062 then transmits 1070 the unencrypted host commands to the payload (i.e. the shared host/hosted payload) 1005. The second communication security module 1065 transmits 1075 the unencrypted hosted commands to the payload (i.e. the shared host/hosted payload) 1005. The payload 1005 is reconfigured according to the unencrypted host commands and/or the unencrypted hosted commands. The payload antenna 1080 then transmits (e.g., in one or more antenna beams 1081) payload data to the host receiving antenna 1085 and/or the hosted receiving antenna 1090 on the ground.

Also, it should be noted that, although in FIG. 10A, antenna beams 1081 is shown to include a plurality of circular spot beams; in other embodiments, antenna beams 1081 may include more or less number of beams than is shown in FIG. 10A (e.g., antenna beams 1081 may only include a single beam), and antenna beams 1081 may include beams of different shapes than circular spot beams as is shown in FIG. 10A (e.g., antenna beams 1081 may include elliptical beams and/or shaped beams of various different shapes).

It should be noted that in one or more embodiments, the payload antenna 1080 may comprise one or more reflector dishes including, but not limited to, parabolic reflectors and/or shaped reflectors. In some embodiments, the payload antenna 1080 may comprise one or more multifeed antenna arrays.

The payload 1005 transmits 1091 unencrypted host telemetry (i.e. unencrypted host TLM, which is telemetry data related to the portion of the payload 1005 that is utilized by the host SOC 1050) to the first communication security module 1062. The first communication security module 1062 then encrypts the unencrypted host telemetry utilizing the first COMSEC variety to generate encrypted host telemetry (i.e. encrypted host TLM).

The payload 1005 transmits 1092 unencrypted hosted telemetry (i.e. unencrypted HoP TLM, which is telemetry data related to the portion of the payload 1005 that is leased by the HOC 1060) to the second communication security module 1065. The second communication security module 1065 then encrypts the unencrypted hosted telemetry utilizing the second COMSEC variety to generate encrypted hosted telemetry (i.e. encrypted HoP TLM).

The first communication security module 1062 then transmits 1093 the encrypted host telemetry to the payload 1005. The payload 1005 then transmits the encrypted host telemetry to the payload antenna 1080. The payload antenna 1080 transmits 1095 the encrypted host telemetry to the host receiving antenna 1085. The payload antenna 1080 transmits 1095 the encrypted host telemetry utilizing an in-band frequency band(s). The host receiving antenna 1085 then transmits 1094 the encrypted host telemetry to the host SOC 1050. The host SOC 1050 then decrypts the encrypted host telemetry utilizing the first COMSEC variety to generate the unencrypted host telemetry.

The second communication security module 1065 then transmits 1096 the encrypted hosted telemetry to the payload 1005. The payload 1005 then transmits the encrypted hosted telemetry to the payload antenna 1080. The payload antenna 1080 transmits 1098 the encrypted hosted telemetry to the hosted receiving antenna 1090.

The payload antenna 1080 transmits 1098 the encrypted hosted telemetry utilizing an in-band frequency band(s). The hosted receiving antenna 1090 then transmits 1099 the encrypted hosted telemetry to the HOC 1060. The HOC 1060 then decrypts the encrypted hosted telemetry utilizing the second COMSEC variety to generate the unencrypted hosted telemetry.

FIG. 10B is a diagram 10000 showing the disclosed system for a virtual transponder utilizing inband telemetry and commanding for the host user (i.e. host SOC) 10050 and the hosted user (i.e. HOC) 10060 using one receiving antenna and employing two COMSEC varieties for telemetry, in accordance with at least one embodiment of the present disclosure. In this figure, a vehicle 10010, a host SOC 10050, and a HOC 10060 are shown. The HOC 10060 has leased at least a portion (e.g., a virtual transponder(s)) of the payload 10005 of the vehicle 10010 from the owner of a satellite (i.e. the host SOC) 10050. It should be noted that in some embodiments, the HOC 10060 may lease all of the payload 10005 of the vehicle 10010 from the owner of a satellite (i.e. the host SOC) 10050. Also, it should be noted that is some embodiments, the HOC 10060 may own the payload 10005 (e.g., a steerable antenna) of the vehicle 10010, and contract the host SOC 10050 to transmit encrypted hosted commands to the vehicle 10010.

During operation, the HOC 10060 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 10005 that the HOC 10060 is leasing from the host SOC 10050. The host SOC 10050 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 10005 that host SOC 10050 is utilizing for itself.

It should be noted that, although in FIG. 10B the host SOC 10050 is depicted to have its ground antenna located right next to its operations building; in other embodiments, the host SOC 10050 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The host SOC 10050 then transmits 10020 the encrypted host commands to a host receiving antenna 10085. After the host receiving antenna 10085 receives the encrypted host commands, the host receiving antenna 10085 transmits 10021 the encrypted host commands to a payload antenna 10080 on the vehicle 10010. The host receiving antenna 10085 transmits 10021 the encrypted host commands utilizing an in-band frequency band(s) (i.e. a frequency band(s) that is the same frequency band(s) utilized to transmit payload data). The payload antenna 10080 transmits the encrypted host commands to a payload 10005. The payload 10005 on the vehicle 10010 receives the encrypted host commands. The payload 10005 then transmits 10052 the encrypted host commands to a first communication security module 10062. The first communication security module 10062 decrypts the encrypted host commands utilizing the first COMSEC variety (i.e. COMSEC Variety 1) to generate unencrypted host commands.

It should be noted that the first communication security module 10062 may comprise one or more modules. In addition, the first communication security module 10062 may comprise one or more processors.

The HOC 10060 then transmits 10015 the encrypted hosted commands to the host SOC 10050. The host SOC 10050 then transmits 10087 the encrypted hosted commands to the host receiving antenna 10085. After the host receiving antenna 10085 receives the encrypted hosted commands, the host receiving antenna 10085 transmits 10097 the encrypted hosted commands to a payload antenna 10080 on the vehicle 10010. The host receiving antenna 10085 transmits 10097 the encrypted hosted commands utilizing an in-band frequency band(s) (i.e. a frequency band(s) that is the same frequency band(s) utilized to transmit payload data). The payload antenna 10080 transmits the encrypted hosted commands to a payload 10005. The payload 10005 on the vehicle 10010 receives the encrypted hosted commands. The payload 10005 then transmits 10055 the encrypted hosted commands to a second communication security module 10065. The second communication security module 10065 decrypts the encrypted hosted commands utilizing the second COMSEC variety (i.e. COMSEC Variety 2) to generate unencrypted hosted commands.

It should be noted that the second communication security module 10065 may comprise one or more modules. In addition, the second communication security module 10065 may comprise one or more processors.

The first communication security module 10062 then transmits 10070 the unencrypted host commands to the payload (i.e. the shared host/hosted payload) 10005. The second communication security module 10065 transmits 10075 the unencrypted hosted commands to the payload (i.e. the shared host/hosted payload) 10005. The payload 10005 is reconfigured according to the unencrypted host commands and/or the unencrypted hosted commands. The payload antenna 10080 then transmits (e.g., in one or more antenna beams 10081) payload data to the host receiving antenna 10085 and/or the hosted receiving antenna 10090 on the ground.

Also, it should be noted that, although in FIG. 10B, antenna beams 10081 is shown to include a plurality of circular spot beams; in other embodiments, antenna beams 10081 may include more or less number of beams than is shown in FIG. 10B (e.g., antenna beams 10081 may only include a single beam), and antenna beams 10081 may include beams of different shapes than circular spot beams as is shown in FIG. 10B (e.g., antenna beams 10081 may include elliptical beams and/or shaped beams of various different shapes).

It should be noted that in one or more embodiments, the payload antenna 10080 may comprise one or more reflector dishes including, but not limited to, parabolic reflectors and/or shaped reflectors. In some embodiments, the payload antenna 10080 may comprise one or more multifeed antenna arrays.

The payload 10005 transmits 10091 unencrypted host telemetry (i.e. unencrypted host TLM, which is telemetry data related to the portion of the payload 10005 that is utilized by the host SOC 10050) to the first communication security module 10062. The first communication security module 10062 then encrypts the unencrypted host telemetry utilizing the first COMSEC variety to generate encrypted host telemetry (i.e. encrypted host TLM).

The payload 10005 transmits 10092 unencrypted hosted telemetry (i.e. unencrypted HoP TLM, which is telemetry data related to the portion of the payload 10005 that is leased by the HOC 10060) to the second communication security module 10065. The second communication security module 10065 then encrypts the unencrypted hosted telemetry utilizing the second COMSEC variety to generate encrypted hosted telemetry (i.e. encrypted HoP TLM).

The first communication security module 10062 then transmits 10093 the encrypted host telemetry to the payload 10005. The payload 10005 then transmits the encrypted host telemetry to the payload antenna 10080. The payload antenna 10080 transmits 10095 the encrypted host telemetry to the host receiving antenna 10085. The payload antenna 10080 transmits 10095 the encrypted host telemetry utilizing an in-band frequency band(s). The host receiving antenna 10085 then transmits 10094 the encrypted host telemetry to the host SOC 10050. The host SOC 10050 then decrypts the encrypted host telemetry utilizing the first COMSEC variety to generate the unencrypted host telemetry.

The second communication security module 10065 then transmits 10096 the encrypted hosted telemetry to the payload 10005. The payload 10005 then transmits the encrypted hosted telemetry to the payload antenna 10080. The payload antenna 10080 transmits 10098 the encrypted hosted telemetry to the host receiving antenna 10085. The payload antenna 10080 transmits 10098 the encrypted hosted telemetry utilizing an in-band frequency band(s). The host receiving antenna 10085 then transmits 10086 the encrypted hosted telemetry to the host SOC 10050. The host SOC 10050 then transmits 10099 the encrypted hosted telemetry to the HOC 10060. The HOC 10060 then decrypts the encrypted hosted telemetry utilizing the second COMSEC variety to generate the unencrypted hosted telemetry.

FIGS. 11A, 11B, 11C, and 11D together show a flow chart for the disclosed method for a virtual transponder utilizing inband telemetry and commanding for the host user and the hosted user using two receiving antennas and employing two COMSEC varieties for telemetry, in accordance with at least one embodiment of the present disclosure. At the start 1100 of the method, a hosted payload (HoP) operation center (HOC) encrypts unencrypted hosted commands by utilizing a second communication security (COMSEC) variety to produce encrypted hosted commands 1105. Then, the HOC transmits the encrypted hosted commands to a hosted receiving antenna 1110. The hosted receiving antenna then transmits the encrypted hosted commands to a payload antenna on a vehicle 1115. Then, the payload antenna transmits the encrypted hosted commands to a payload on the vehicle 1120. The payload then transmits the encrypted hosted commands to a second communication security module 1125.

Then, a host spacecraft operations center (SOC) encrypts unencrypted host commands by utilizing a first COMSEC variety to produce encrypted host commands 1130. The host SOC then transmits the encrypted host commands to a host receiving antenna 1135. Then, the host receiving antenna transmits the encrypted host commands to the payload antenna 1140. The payload antenna then transmits the encrypted host commands to the payload 1145. Then, the payload transmits the encrypted host commands to a first communication security module 1150. The first communication security module then decrypts the encrypted host commands utilizing the first COMSEC variety to generate the unencrypted host commands 1155. Then, the second communication security module decrypts the encrypted hosted commands utilizing the second COMSEC variety to generate the unencrypted hosted commands 1160. Then, the first communication security module transmits the unencrypted host commands to the payload 1165. The second communication security module then transmits the unencrypted hosted commands to the payload 1170.

Then, the payload is reconfigured according to the unencrypted host commands and/or the unencrypted hosted commands 1175. The payload antenna then transmits payload data to the host receiving antenna and/or the hosted receiving antenna 1180. Then, the payload transmits to the first communication security module unencrypted host telemetry 1185. The payload then transmits to the second communication security module unencrypted hosted telemetry 1190. Then, the first communication security module encrypts the unencrypted host telemetry utilizing the first COMSEC variety to generate encrypted host telemetry 1191. The second communication security module then encrypts the unencrypted hosted telemetry utilizing the second COMSEC variety to generate encrypted hosted telemetry 1192.

Then, the first communication security module transmits the encrypted host telemetry to the payload 1193. The payload then transmits the encrypted host telemetry to the payload antenna 1194. Then, the payload antenna transmits the encrypted host telemetry to the host receiving antenna 1195. The host receiving antenna transmits the encrypted host telemetry to the host SOC 1196. Then, the host SOC decrypts the encrypted host telemetry utilizing the first COMSEC variety to generate the unencrypted host telemetry 1197.

Then, the second communication security module transmits the encrypted hosted telemetry to the payload 1198. The payload then transmits the encrypted hosted telemetry to the payload antenna 1199. Then, the payload antenna transmits the encrypted hosted telemetry to the hosted receiving antenna 1101. The hosted receiving antenna transmits the encrypted hosted telemetry to the HOC 1102. Then, the HOC decrypts the encrypted hosted telemetry utilizing the second COMSEC variety to generate the unencrypted hosted telemetry 1103. Then, the method ends 1104.

FIGS. 11E, 11F, 11G, and 11H together show a flow chart for the disclosed method for a virtual transponder utilizing inband telemetry and commanding for the host user and the hosted user using one receiving antenna and employing two COMSEC varieties for telemetry, in accordance with at least one embodiment of the present disclosure. At the start 11000 of the method, a hosted payload (HoP) operation center (HOC) encrypts unencrypted hosted commands by utilizing a second communication security (COMSEC) variety to produce encrypted hosted commands 11005. Then, the HOC transmits the encrypted hosted commands to a host spacecraft operations center (SOC) 11010. The host SOC then transmits the encrypted hosted commands to a host receiving antenna 11012. The host receiving antenna then transmits the encrypted hosted commands to a payload antenna on a vehicle 11015. Then, the payload antenna transmits the encrypted hosted commands to a payload on the vehicle 11020. The payload then transmits the encrypted hosted commands to a second communication security module 11025.

Then, a host spacecraft operations center (SOC) encrypts unencrypted host commands by utilizing a first COMSEC variety to produce encrypted host commands 11030. The host SOC then transmits the encrypted host commands to a host receiving antenna 11035. Then, the host receiving antenna transmits the encrypted host commands to the payload antenna 11040. The payload antenna then transmits the encrypted host commands to the payload 11045. Then, the payload transmits the encrypted host commands to a first communication security module 11050. The first communication security module then decrypts the encrypted host commands utilizing the first COMSEC variety to generate the unencrypted host commands 11055. Then, the second communication security module decrypts the encrypted hosted commands utilizing the second COMSEC variety to generate the unencrypted hosted commands 11060. Then, the first communication security module transmits the unencrypted host commands to the payload 11065. The second communication security module then transmits the unencrypted hosted commands to the payload 11070.

Then, the payload is reconfigured according to the unencrypted host commands and/or the unencrypted hosted commands 11075. The payload antenna then transmits payload data to the host receiving antenna and/or the hosted receiving antenna 11080. Then, the payload transmits to the first communication security module unencrypted host telemetry 11085. The payload then transmits to the second communication security module unencrypted hosted telemetry 11090. Then, the first communication security module encrypts the unencrypted host telemetry utilizing the first COMSEC variety to generate encrypted host telemetry 11091. The second communication security module then encrypts the unencrypted hosted telemetry utilizing the second COMSEC variety to generate encrypted hosted telemetry 11092.

Then, the first communication security module transmits the encrypted host telemetry to the payload 11093. The payload then transmits the encrypted host telemetry to the payload antenna 11094. Then, the payload antenna transmits the encrypted host telemetry to the host receiving antenna 11095. The host receiving antenna transmits the encrypted host telemetry to the host SOC 11096. Then, the host SOC decrypts the encrypted host telemetry utilizing the first COMSEC variety to generate the unencrypted host telemetry 11097.

Then, the second communication security module transmits the encrypted hosted telemetry to the payload 11098. The payload then transmits the encrypted hosted telemetry to the payload antenna 11099. Then, the payload antenna transmits the encrypted hosted telemetry to the host receiving antenna 11001. The host receiving antenna transmits the encrypted hosted telemetry to the host SOC 11002. The host SOC then transmits the encrypted hosted telemetry to the HOC 11003. Then, the HOC decrypts the encrypted hosted telemetry utilizing the second COMSEC variety to generate the unencrypted hosted telemetry 11004. Then, the method ends 11005.

FIG. 12A is a diagram 1200 showing the disclosed system for a virtual transponder utilizing inband telemetry and commanding for the host user (i.e. host SOC) 1250 and the hosted user (i.e. HOC) 1260 using two receiving antennas and employing one COMSEC variety for telemetry, in accordance with at least one embodiment of the present disclosure. In this figure, a vehicle 1210, a host SOC 1250, and a HOC 1260 are shown. The HOC 1260 has leased at least a portion (e.g., a virtual transponder(s)) of the payload 1205 of the vehicle 1210 from the owner of a satellite (i.e. the host SOC) 1250. It should be noted that in some embodiments, the HOC 1260 may lease all of the payload 1205 of the vehicle 1210 from the owner of a satellite (i.e. the host SOC) 1250. Also, it should be noted that is some embodiments, the HOC 1260 may own the payload 1205 (e.g., a steerable antenna) of the vehicle 1210, and contract the host SOC 1250 to transmit encrypted hosted commands to the vehicle 1210.

During operation, the HOC 1260 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 1205 that the HOC 1260 is leasing from the host SOC 1250. The host SOC 1250 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 1205 that host SOC 1250 is utilizing for itself.

It should be noted that, although in FIG. 12A the host SOC 1250 is depicted to have its ground antenna located right next to its operations building; in other embodiments, the host SOC 1250 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The host SOC 1250 then transmits 1220 the encrypted host commands to a host receiving antenna 1285. After the host receiving antenna 1285 receives the encrypted host commands, the host receiving antenna 1285 transmits 1221 the encrypted host commands to a payload antenna 1280 on the vehicle 1210. The host receiving antenna 1285 transmits 1221 the encrypted host commands utilizing an in-band frequency band(s) (i.e. a frequency band(s) that is the same frequency band(s) utilized to transmit payload data). The payload antenna 1280 transmits the encrypted host commands to a payload 1205. The payload 1205 on the vehicle 1210 receives the encrypted host commands. The payload 1205 then transmits 1252 the encrypted host commands to a first communication security module 1262. The first communication security module 1262 decrypts the encrypted host commands utilizing the first COMSEC variety (i.e. COMSEC Variety 1) to generate unencrypted host commands.

It should be noted that the first communication security module 1262 may comprise one or more modules. In addition, the first communication security module 1262 may comprise one or more processors.

The HOC 1260 then transmits 1215 the encrypted hosted commands to a hosted receiving antenna 1290. After the hosted receiving antenna 1290 receives the encrypted hosted commands, the hosted receiving antenna 1290 transmits 1297 the encrypted hosted commands to a payload antenna 1280 on the vehicle 1210. The hosted receiving antenna 1290 transmits 1297 the encrypted hosted commands utilizing an in-band frequency band(s) (i.e. a frequency band(s) that is the same frequency band(s) utilized to transmit payload data). The payload antenna 1280 transmits the encrypted hosted commands to a payload 1205. The payload 1205 on the vehicle 1210 receives the encrypted hosted commands. The payload 1205 then transmits 1255 the encrypted hosted commands to a second communication security module 1265. The second communication security module 1265 decrypts the encrypted hosted commands utilizing the second COMSEC variety (i.e. COMSEC Variety 2) to generate unencrypted hosted commands.

It should be noted that the second communication security module 1265 may comprise one or more modules. In addition, the second communication security module 1265 may comprise one or more processors.

The first communication security module 1262 then transmits 1270 the unencrypted host commands to the payload (i.e. the shared host/hosted payload) 1205. The second communication security module 1265 transmits 1275 the unencrypted hosted commands to the payload (i.e. the shared host/hosted payload) 1205. The payload 1205 is reconfigured according to the unencrypted host commands and/or the unencrypted hosted commands. The payload antenna 1280 then transmits (e.g., in one or more antenna beams 1281) payload data to the host receiving antenna 1285 and/or the hosted receiving antenna 1290 on the ground.

Also, it should be noted that, although in FIG. 12A, antenna beams 1281 is shown to include a plurality of circular spot beams; in other embodiments, antenna beams 1281 may include more or less number of beams than is shown in FIG. 12A (e.g., antenna beams 1281 may only include a single beam), and antenna beams 1281 may include beams of different shapes than circular spot beams as is shown in FIG. 12A (e.g., antenna beams 1281 may include elliptical beams and/or shaped beams of various different shapes).

It should be noted that in one or more embodiments, the payload antenna 1280 may comprise one or more reflector dishes including, but not limited to, parabolic reflectors and/or shaped reflectors. In some embodiments, the payload antenna 1280 may comprise one or more multifeed antenna arrays.

The payload 1205 transmits 1291 unencrypted telemetry (i.e. unencrypted host TLM, which is telemetry data related to the portion of the payload 1205 that is utilized by the host SOC 1250; and unencrypted HoP TLM, which is telemetry data related to the portion of the payload 1205 that is leased by the HOC 1260) to the first communication security module 1262. The first communication security module 1262 then encrypts the unencrypted telemetry utilizing the first COMSEC variety to generate encrypted telemetry (i.e. encrypted TLM). The first communication security module 1262 then transmits 1293 the encrypted telemetry to the payload 1205. The payload 1205 then transmits the encrypted telemetry to the payload antenna 1280.

The payload antenna 1280 transmits 1295 the encrypted telemetry to the host receiving antenna 1285. The payload antenna 1280 transmits 1295 the encrypted telemetry utilizing an in-band frequency band(s). The host receiving antenna 1285 then transmits 1294 the encrypted telemetry to the host SOC 1250. The host SOC 1250 then decrypts the encrypted telemetry utilizing the first COMSEC variety to generate the unencrypted telemetry. The host SOC 1250 then utilizes a database that comprises host payload decommutated information and does not comprise hosted payload decommutated information (i.e. a database without hosted payload decommutated information) to read to unencrypted telemetry to determine the telemetry data related to the portion of the payload 1205 that is utilized by the host SOC 1250.

The payload antenna 1280 transmits 1298 the encrypted telemetry to the hosted receiving antenna 1290. The payload antenna 1280 transmits 1298 the encrypted telemetry utilizing an in-band frequency band(s). The hosted receiving antenna 1290 then transmits 1299 the encrypted telemetry to the HOC 1260. The HOC 1260 then decrypts the encrypted telemetry utilizing the first COMSEC variety to generate the unencrypted telemetry. The HOC 1260 then utilizes a database that comprises hosted payload decommutated information and does not comprise host payload decommutated information (i.e. a database without host payload decommutated information) to read to unencrypted telemetry to determine the telemetry data related to the portion of the payload 1205 that is utilized by the HOC 1260.

FIG. 12B is a diagram 12000 showing the disclosed system for a virtual transponder utilizing inband telemetry and commanding for the host user (i.e. host SOC) 12050 and the hosted user (i.e. HOC) 12060 using one receiving antenna and employing one COMSEC variety for telemetry, in accordance with at least one embodiment of the present disclosure. In this figure, a vehicle 12010, a host SOC 12050, and a HOC 12060 are shown. The HOC 12060 has leased at least a portion (e.g., a virtual transponder(s)) of the payload 12005 of the vehicle 12010 from the owner of a satellite (i.e. the host SOC) 12050. It should be noted that in some embodiments, the HOC 12060 may lease all of the payload 12005 of the vehicle 12010 from the owner of a satellite (i.e. the host SOC) 12050. Also, it should be noted that is some embodiments, the HOC 12060 may own the payload 12005 (e.g., a steerable antenna) of the vehicle 12010, and contract the host SOC 12050 to transmit encrypted hosted commands to the vehicle 12010.

During operation, the HOC 12060 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (e.g., a virtual transponder(s)) of the payload 12005 that the HOC 12060 is leasing from the host SOC 12050. The host SOC 12050 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 12005 that host SOC 12050 is utilizing for itself.

It should be noted that, although in FIG. 12B the host SOC 12050 is depicted to have its ground antenna located right next to its operations building; in other embodiments, the host SOC 12050 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The host SOC 12050 then transmits 12020 the encrypted host commands to a host receiving antenna 12085. After the host receiving antenna 12085 receives the encrypted host commands, the host receiving antenna 12085 transmits 12021 the encrypted host commands to a payload antenna 12080 on the vehicle 12010. The host receiving antenna 12085 transmits 12021 the encrypted host commands utilizing an in-band frequency band(s) (i.e. a frequency band(s) that is the same frequency band(s) utilized to transmit payload data). The payload antenna 12080 transmits the encrypted host commands to a payload 12005. The payload 12005 on the vehicle 12010 receives the encrypted host commands. The payload 12005 then transmits 12052 the encrypted host commands to a first communication security module 12062. The first communication security module 12062 decrypts the encrypted host commands utilizing the first COMSEC variety (i.e. COMSEC Variety 1) to generate unencrypted host commands.

It should be noted that the first communication security module 12062 may comprise one or more modules. In addition, the first communication security module 12062 may comprise one or more processors.

The HOC 12060 then transmits 12015 the encrypted hosted commands to the host SOC 12050. The host SOC 12050 then transmits 12098 the encrypted hosted commands to the host receiving antenna 12085. After the host receiving antenna 12085 receives the encrypted hosted commands, the host receiving antenna 12085 transmits 12097 the encrypted hosted commands to a payload antenna 12080 on the vehicle 12010. The host receiving antenna 12085 transmits 12097 the encrypted hosted commands utilizing an in-band frequency band(s) (i.e. a frequency band(s) that is the same frequency band(s) utilized to transmit payload data). The payload antenna 12080 transmits the encrypted hosted commands to a payload 12005. The payload 12005 on the vehicle 12010 receives the encrypted hosted commands. The payload 12005 then transmits 12055 the encrypted hosted commands to a second communication security module 12065. The second communication security module 12065 decrypts the encrypted hosted commands utilizing the second COMSEC variety (i.e. COMSEC Variety 2) to generate unencrypted hosted commands.

It should be noted that the second communication security module 12065 may comprise one or more modules. In addition, the second communication security module 12065 may comprise one or more processors.

The first communication security module 12062 then transmits 12070 the unencrypted host commands to the payload (i.e. the shared host/hosted payload) 12005. The second communication security module 12065 transmits 12075 the unencrypted hosted commands to the payload (i.e. the shared host/hosted payload) 12005. The payload 12005 is reconfigured according to the unencrypted host commands and/or the unencrypted hosted commands. The payload antenna 12080 then transmits (e.g., in one or more antenna beams 12081) payload data to the host receiving antenna 12085 and/or the hosted receiving antenna 12090 on the ground.

Also, it should be noted that, although in FIG. 12B, antenna beams 12081 is shown to include a plurality of circular spot beams; in other embodiments, antenna beams 12081 may include more or less number of beams than is shown in FIG. 12B (e.g., antenna beams 12081 may only include a single beam), and antenna beams 12081 may include beams of different shapes than circular spot beams as is shown in FIG. 12B (e.g., antenna beams 12081 may include elliptical beams and/or shaped beams of various different shapes).

It should be noted that in one or more embodiments, the payload antenna 12080 may comprise one or more reflector dishes including, but not limited to, parabolic reflectors and/or shaped reflectors. In some embodiments, the payload antenna 12080 may comprise one or more multifeed antenna arrays.

The payload 12005 transmits 12091 unencrypted telemetry (i.e. unencrypted host TLM, which is telemetry data related to the portion of the payload 12005 that is utilized by the host SOC 12050; and unencrypted HoP TLM, which is telemetry data related to the portion of the payload 12005 that is leased by the HOC 12060) to the first communication security module 12062. The first communication security module 12062 then encrypts the unencrypted telemetry utilizing the first COMSEC variety to generate encrypted telemetry (i.e. encrypted TLM). The first communication security module 12062 then transmits 12093 the encrypted telemetry to the payload 12005. The payload 12005 then transmits the encrypted telemetry to the payload antenna 12080.

The payload antenna 12080 transmits 12095 the encrypted telemetry to the host receiving antenna 12085. The payload antenna 12080 transmits 12095 the encrypted telemetry utilizing an in-band frequency band(s). The host receiving antenna 12085 then transmits 12094 the encrypted telemetry to the host SOC 12050. The host SOC 12050 then decrypts the encrypted telemetry utilizing the first COMSEC variety to generate the unencrypted telemetry. The host SOC 12050 then utilizes a database that comprises host payload decommutated information and does not comprise hosted payload decommutated information (i.e. a database without hosted payload decommutated information) to read to unencrypted telemetry to determine the telemetry data related to the portion of the payload 12005 that is utilized by the host SOC 12050.

The host SOC 12050 then transmits 12099 the encrypted telemetry to the HOC 12060. The HOC 12060 then decrypts the encrypted telemetry utilizing the first COMSEC variety to generate the unencrypted telemetry. The HOC 12060 then utilizes a database that comprises hosted payload decommutated information and does not comprise host payload decommutated information (i.e. a database without host payload decommutated information) to read to unencrypted telemetry to determine the telemetry data related to the portion of the payload 12005 that is utilized by the HOC 12060.

FIGS. 13A, 13B, 13C, and 13D together show a flow chart for the disclosed method for a virtual transponder utilizing inband telemetry and commanding for the host user and the hosted user using two receiving antennas and employing one COMSEC variety, in accordance with at least one embodiment of the present disclosure. At the start 1300 of the method, a hosted payload (HoP) operation center (HOC) encrypts unencrypted hosted commands by utilizing a second communication security (COMSEC) variety to produce encrypted hosted commands 1305. Then, the HOC transmits the encrypted hosted commands to a hosted receiving antenna 1310. The hosted receiving antenna then transmits the encrypted hosted commands to a payload antenna on a vehicle 1315. Then, the payload antenna transmits the encrypted hosted commands to a payload on the vehicle 1320. The payload then transmits the encrypted hosted commands to a second communication security module 1325.

Then, a host spacecraft operations center (SOC) encrypts unencrypted host commands by utilizing a first COMSEC variety to produce encrypted host commands 1330. The host SOC then transmits the encrypted host commands to a host receiving antenna 1335. Then, the host receiving antenna transmits the encrypted host commands to the payload antenna 1340. Then, the payload antenna transmits the encrypted host commands to the payload 1345. The payload then transmits the encrypted host commands to a first communication security module 1350. Then, the first communication security module decrypts the encrypted host commands utilizing the first COMSEC variety to generate the unencrypted host commands 1355. The second communication security module then decrypts the encrypted hosted commands utilizing the second COMSEC variety to generate the unencrypted hosted commands 1360. Then, the first communication security module transmits the unencrypted host commands to the payload 1365. The second communication security module then transmits the unencrypted hosted commands to the payload 1370.

Then, the payload is reconfigured according to the unencrypted host commands and/or the unencrypted hosted commands 1375. The payload antenna then transmits payload data to the host receiving antenna and/or the hosted receiving antenna 1380. Then, the payload transmits to the first communication security module unencrypted telemetry 1385. The first communication security module then encrypts the unencrypted telemetry utilizing the first COMSEC variety to generate encrypted telemetry 1390.

Then, the first communication security module transmits the encrypted telemetry to the payload 1391. The payload then transmits the encrypted telemetry to the payload antenna 1392. Then, the payload antenna transmits the encrypted telemetry to the host receiving antenna 1393. The host receiving antenna then transmits the encrypted telemetry to the host SOC 1394. Then, the host SOC decrypts the encrypted telemetry utilizing the first COMSEC variety to generate the unencrypted telemetry 1395. The host SOC then determines telemetry data related to a portion of the payload utilized by the host SOC by using a database without hosted decommutated information to read the unencrypted telemetry 1396.

Then, the payload antenna transmits the encrypted telemetry to the hosted receiving antenna 1397. The hosted receiving antenna then transmits the encrypted telemetry to the HOC 1398. Then, the HOC decrypts the encrypted telemetry utilizing the first COMSEC variety to generate the unencrypted telemetry 1399. The HOC then determines telemetry data related to a portion of the payload utilized by the HOC by using a database without host decommutated information to read the unencrypted telemetry 1301. Then, the method ends 1302.

FIGS. 13E, 13F, 13G, and 13H together show a flow chart for the disclosed method for a virtual transponder utilizing inband telemetry and commanding for the host user and the hosted user using one receiving antenna and employing one COMSEC variety, in accordance with at least one embodiment of the present disclosure. At the start 13000 of the method, a hosted payload (HoP) operation center (HOC) encrypts unencrypted hosted commands by utilizing a second communication security (COMSEC) variety to produce encrypted hosted commands 13005. Then, the HOC transmits the encrypted hosted commands to a host spacecraft operations center (SOC) 13010. The host SOC then transmits the encrypted hosted commands to a host receiving antenna 13012. The host receiving antenna then transmits the encrypted hosted commands to a payload antenna on a vehicle 13015. Then, the payload antenna transmits the encrypted hosted commands to a payload on the vehicle 13020. The payload then transmits the encrypted hosted commands to a second communication security module 13025.

Then, a host spacecraft operations center (SOC) encrypts unencrypted host commands by utilizing a first COMSEC variety to produce encrypted host commands 13030. The host SOC then transmits the encrypted host commands to a host receiving antenna 13035. Then, the host receiving antenna transmits the encrypted host commands to the payload antenna 13040. Then, the payload antenna transmits the encrypted host commands to the payload 13045. The payload then transmits the encrypted host commands to a first communication security module 13050. Then, the first communication security module decrypts the encrypted host commands utilizing the first COMSEC variety to generate the unencrypted host commands 13055. The second communication security module then decrypts the encrypted hosted commands utilizing the second COMSEC variety to generate the unencrypted hosted commands 13060. Then, the first communication security module transmits the unencrypted host commands to the payload 13065. The second communication security module then transmits the unencrypted hosted commands to the payload 13070.

Then, the payload is reconfigured according to the unencrypted host commands and/or the unencrypted hosted commands 13075. The payload antenna then transmits payload data to the host receiving antenna and/or the hosted receiving antenna 13080. Then, the payload transmits to the first communication security module unencrypted telemetry 13085. The first communication security module then encrypts the unencrypted telemetry utilizing the first COMSEC variety to generate encrypted telemetry 13090.

Then, the first communication security module transmits the encrypted telemetry to the payload 13091. The payload then transmits the encrypted telemetry to the payload antenna 13092. Then, the payload antenna transmits the encrypted telemetry to the host receiving antenna 13093. The host receiving antenna then transmits the encrypted telemetry to the host SOC 13094. Then, the host SOC decrypts the encrypted telemetry utilizing the first COMSEC variety to generate the unencrypted telemetry 13095. The host SOC then determines telemetry data related to a portion of the payload utilized by the host SOC by using a database without hosted decommutated information to read the unencrypted telemetry 13096.

The host SOC then transmits the encrypted telemetry to the HOC 13098. Then, the HOC decrypts the encrypted telemetry utilizing the first COMSEC variety to generate the unencrypted telemetry 13099. The HOC then determines telemetry data related to a portion of the payload utilized by the HOC by using a database without host decommutated information to read the unencrypted telemetry 13001. Then, the method ends 13002.

FIGS. 14-19B show exemplary systems and methods for a virtual transponder, in accordance with at least one embodiment of the present disclosure.

FIG. 14 is a diagram 1400 showing the disclosed system for a virtual transponder on a vehicle 1610, in accordance with at least one embodiment of the present disclosure. In this figure, a computing device 1410 is shown. The computing device 1410 may be located at a station (e.g., a host station or a hosted station). When the computing device 1410 is located at a host station (i.e. a station operated by a host user (Host SOC)), the computing device 1410 is referred to as a host computing device. And, when the computing device 1410 is located at a hosted station (i.e. a station operated by a hosted user (HOC)), the computing device 1410 is referred to as a hosted computing device. In one or more embodiments, the station is a ground station 1415, a terrestrial vehicle (e.g., a military jeep) 1420, an airborne vehicle (e.g., an aircraft) 1425, or a marine vehicle (e.g., a ship) 1430.

During operation, a user (e.g., a host user or a hosted user) 1405 selects, via a graphical user interface (GUI) (e.g., a host GUI or a hosted GUI) 1435 displayed on a screen of the computing device 1410 (e.g., a host computing device or a hosted computing device), an option (e.g., a value) for each of at least one different variable for a portion of the payload 1680 on the vehicle 1610 utilized by the user 1405. It should be noted that the details of payload 1680 as is illustrated in FIG. 16 is depicted on the GUI 1435, which is displayed on the screen of the computing device 1410.

Refer FIG. 16 to view the different variables of the payload 1680 on the vehicle 1610 that may be selected by the user 1405 by using the GUI 1435 that is displayed to the user 1405. Also, refer to FIG. 17 to view the different variables of the digital channelizer 1670 of the payload 1680 that may be selected by the user 1405 by using the GUI 1435 that is displayed to the user 1405. In one or more embodiments, various different variables may be presented by the GUI 1435 to be selected including, but not limited to, at least one transponder power, at least one transponder spectrum, at least one transponder gain setting, at least one transponder limiter setting, at least one transponder automatic level control setting, at least one transponder phase setting, at least one internal gain generation, bandwidth for at least one beam, at least one frequency band for at least one beam, at least one transponder beamforming setting, effective isotropic radiation power (EIRP) for at least one beam, at least one transponder channel, and/or beam steering for at least one beam. It should be noted that the user 1405 may select an option by clicking on the associated variable (e.g., clicking on one of the mixers 1665 to change the frequency band of the mixer's associated transmit antenna 1655) in the payload 1680 by using the GUI 1435, and by either typing in a value or selecting a value from a drop down menu (e.g., by typing in a desired transmission frequency band for the associated transmit antenna 1655). It should be noted that the payload 1680 depicted in FIG. 16 is an exemplary payload, and the depiction does not show all possible different variables that may be selected by user 1405 by using the GUI 1435.

After the user 1405 has selected, via the GUI 1435 displayed on the computing device 1410, an option for each of at least one variable for the portion of the payload 1680 on the vehicle 1610 utilized by the user 1405, the option(s) is transmitted 1440 to a configuration algorithm (CA) 1445 (e.g., an algorithm contained in an XML file, such as CAConfig.xml 1450). The CA 1445 then generates a configuration for the portion of the payload 1680 on the vehicle 1610 utilized by the user 1405 by using the option(s). Then, the CA 1445 transmits 1455 the configuration to a command generator (e.g., a host command generator or a hosted command generator) 1460. Optionally, the CA 1445 also stores the configuration in a report file 1465.

After the command generator 1460 has received the configuration, the command generator 1460 generates commands (e.g., host commands or hosted commands) for reconfiguring the portion of the payload 1680 on the vehicle 1610 utilized by the user 1405 by using the configuration. Then, the commands are transmitted 1470 to an encryption module 1475. After receiving the commands, the encryption module 1475 then encrypts the commands (e.g., by utilizing a first COMSEC variety or a second COMSEC variety) to generate encrypted commands (e.g., host encrypted commands or hosted encrypted commands).

Then, the encrypted commands are transmitted 1480 from the station (e.g., a ground station 1415, a terrestrial vehicle (e.g., a military jeep) 1420, an airborne vehicle (e.g., an aircraft) 1425, or a marine vehicle (e.g., a ship) 1430) to the vehicle 1410. It should be noted that, in one or more embodiments, the computing device 1410, the CA 1445, the command generator 1460, and the encryption module 1475 are all located at the station (e.g., the host station or the hosted station). In other embodiments, some or more of these items may be located in different locations. In addition, in one or more embodiments, the vehicle 1610 is an airborne vehicle (e.g., a satellite, an aircraft, an unmanned vehicle (UAV), or a space plane).

After the vehicle 1610 has received the encrypted commands, the vehicle decrypts the commands to generated unencrypted commands (e.g., host unencrypted commands or hosted unencrypted commands). Then, the portion of the payload 1680 on the vehicle 1610 utilized by the user 1405 is reconfigured by using the unencrypted commands. In one or more embodiments, the reconfiguring of the payload 1680 may comprise reconfiguring at least one antenna 1615, 1655 (refer to FIG. 16), at least one analog-to-digital converter, at least one digital-to-analog converter, at least one beamformer, at least one digital channelizer 1710 (refer to FIG. 17), at least one demodulator, at least one modulator, at least one digital switch matrix 1720 (refer to FIG. 17), and/or at least one digital combiner 1730 (refer to FIG. 17). It should be noted that in other embodiments, the reconfiguring of the payload 1680 may comprise reconfiguring at least one analog switch matrix.

FIG. 15 is a diagram 1500 showing an exemplary allocation of bandwidth amongst a plurality of beams (U1-U45) when utilizing the disclosed virtual transponder, in accordance with at least one embodiment of the present disclosure. In this figure, the bandwidth of each of the beams (U1-U45) is illustrated as a bar.

On the left side 1510 of the diagram 1500, a portion of the bandwidth of each of the beams (U1-U45) is shown to be utilized by only the host user (i.e. the owner of the vehicle). For this example, the host user is not leasing out any portion of the payload to a hosted user (i.e. a customer).

On the right side 1520 of the diagram 1500, a portion of the bandwidth of each of the beams is shown to be utilized by the host user (i.e. the owner of the vehicle). Also, at least some (if not all) of the portion of the bandwidth of each of the beams (U1-U45) not utilized by the host user, is shown to be utilized by the hosted user (i.e. a customer). For this example, the host user is leasing out a portion of the payload to a hosted user (i.e. a customer). Specifically, the host user is leasing out a portion the bandwidth of each of the beams (U1-U45) to the hosted user.

It should be noted that in other embodiments, the host user may lease out the entire bandwidth of some (if not all) of beam(s) to the hosted user. For these, embodiments, the hosted user alone will utilize the bandwidth of these leased beam(s).

FIG. 16 is a diagram 1600 showing the switch architecture for a flexible allocation of bandwidth amongst a plurality of beams (U1-UN) (i.e. including uplink and downlink beams) when utilizing the disclosed virtual transponder, in accordance with at least one embodiment of the present disclosure. In this figure, details of a payload 1680 on a vehicle 1610 are shown. In particular, each of a plurality (i.e. N number) of receive antennas 1615, on the vehicle 1610, is shown to be receiving one of the uplink beams (U1-UN). As such, for example, receive antenna 1615 connected to input port 1 receives uplink beam U6, receive antenna 1615 connected to input port 2 receives uplink beam U14, and receive antenna 1615 connected to input port N receives uplink beam U34. Each receive antenna 1615 is shown to be followed by a polarizer (i.e. pol) 1620 and a waveguide filter (i.e. WG Filter) 1625.

Also, in this figure, each of a plurality (i.e. N number) of transmit antennas 1655, on the vehicle 1610, is shown to be receiving one of the downlink beams (U1-UN). As such, for example, transmit antenna 1655 connected to output port 1 receives downlink beam U19, transmit antenna 1655 connected to output port 2 receives downlink beam U6, and transmit antenna 1655 connected to output port N receives downlink beam U1. Each transmit antenna 1655 is shown to be preceded by a polarizer (i.e. pol) 1645 and a waveguide filter (i.e. WG Filter) 1650.

It should be noted that, in one or more embodiments, various different types of antennas may be employed for the receive antennas 1615 and the transmit antennas 1655 including, but not limited to, parabolic reflector antennas, shaped reflector antennas, multifeed array antennas, phase array antennas, and/or any combination thereof.

During operation, a host user 1605 encrypts unencrypted host commands to produce encrypted host commands. Also, a hosted user 1630 encrypts unencrypted hosted commands to produce encrypted hosted commands. The hosted user 1630 transmits 1635 the encrypted hosted commands to the host user 1605. The host user 1605 transmits 1640 the encrypted host commands and the encrypted hosted commands to the vehicle 1610. The encrypted host commands and encrypted hosted commands are decrypted on the vehicle 1610 to produce the unencrypted host commands and unencrypted hosted commands.

Then, the payload on the vehicle 1610 receives the unencrypted host commands and unencrypted hosted commands. The digital channelizer 1670 then reconfigures the channels of the uplink beams (U1-UN) and downlink beams (U1-UN) according to the unencrypted host commands and unencrypted hosted commands. The configuring of the channels allocates the bandwidth of the uplink beams (U1-UN) and downlink beams (U1-UN) amongst the host user 1605 and the hosted user 1630.

Also, the transmit antennas 1655 and the receive antennas 1615 are configured according to the unencrypted host commands and/or unencrypted hosted commands. For example, some, if not all, of the transmit antennas 1655 and/or the receive antennas 1615 may be gimbaled to project their beams on different locations on the ground. Also, for example, some, if not all, of the transmit antennas 1655 and/or the receive antennas 1615 may have their phase changed such that (1) the shape of the beam is changed (e.g., has the effect of changing the coverage area of the beam, changing the peak(s) amplitude of the beam, and/or the changing the peak(s) amplitude location on the ground), and/or (2) the beam is projected on a different location on the ground (i.e. has the same effect as gimbaling the antenna 1615, 1655).

Additionally, the mixers 1660 on the input ports and/or the mixers 1665 on the output ports are configured according to the unencrypted host commands and/or unencrypted hosted commands. For example, some, if not all, of the mixers 1660 on the input ports and/or the mixers 1665 on the output ports may mix in different frequency bands to change the frequency band(s) of the beams (U1-UN).

FIG. 17 is a diagram 1700 showing details of the digital channelizer 1670 of FIG. 16, in accordance with at least one embodiment of the present disclosure. In this figure, the digital channelizer 1670 is shown to include three main parts, which are the channelizer 1710, the switch matrix 1720, and the combiner 1730. The digital channelizer 1710 divides the input beam spectrum (i.e. frequency band) from each input port into input subchannels (i.e. frequency slices). In this figure, each beam spectrum (i.e. frequency band) is shown to be divided into twelve (12) input subchannels (i.e. frequency slices). It should be noted that in other embodiments, each input beam spectrum may be divided into more or less than twelve (12) input subchannels, as is shown in FIG. 17.

The switch matrix 1720 routes the input subchannels from the input ports to their assigned respective output ports, where they are referred to as output subchannels. In this figure, five (5) exemplary types of routing that may be utilized by the switch matrix 1720 are shown, which include direct mapping 1740, in-beam multicast 1750, cross-beam multicast 1760, cross-beam mapping 1770, and cross-beam point-to-point routing 1780. The combiner 1730 combines the output subchannels to create an output beam spectrum for each output port. As previously mentioned above, during the reconfiguring of the payload 1680, the channelizer 1710, the switch matrix 1720, and/or the combiner 1730 of the digital channelizer 1670 may be reconfigured a various different number of ways (e.g., changing the dividing of the input beam spectrums into input subchannels, changing the routing of the input subchannels, and/or changing the combining of the output subchannels to create the output beam spectrums).

FIG. 18 is a diagram 1800 showing exemplary components on the vehicle (e.g., satellite) 1810 that may be utilized by the disclosed virtual transponder, in accordance with at least one embodiment of the present disclosure. In this figure, various components, on the vehicle 1810, are shown that may be configured according to the unencrypted host commands (e.g., the host channel 1830) and/or unencrypted hosted commands (e.g., the hosted channel 1820).

In this figure, the uplink antenna 1840, the downlink antenna 1850, and various components of the all-digital payload 1860 (including the analog-to-digital (A/D) converter 1865, the digital channelizer 1875, the digital switch matrix 1895, the digital combiner 1815, and the digital-to-analog (D/A) converter 1835) are shown that may be configured according to the unencrypted host commands (e.g., the host channel 1830) and/or unencrypted hosted commands (e.g., the hosted channel 1820). In addition, some other components of the all-digital payload 1860 (including the uplink beamforming 1870, the demodulator 1880, the modulator 1890, and the downlink beamforming 1825) may optionally be configured according to the unencrypted host commands (e.g., the host channel 1830) and/or unencrypted hosted commands (e.g., the hosted channel 1820).

FIGS. 19A and 19B together show a flow chart for the disclosed method for a virtual transponder on a vehicle, in accordance with at least one embodiment of the present disclosure. At the start 1900 of the method, a host user, with a host graphical user interface (GUI) on a host computing device, selects an option for each of at least one variable for a portion of a payload on the vehicle utilized by the host user 1905. Also, a hosted user, with a hosted GUI on a hosted computing device, selects an option for each of at least one variable for a portion of the payload on the vehicle utilized by the hosted user 1910. Then, a configuration algorithm (CA) generates a configuration for the portion of the payload on the vehicle utilized by the host user by using the option for each of at least one variable for the portion of the payload on the vehicle utilized by the host user 1915. Also, the CA generates a configuration for the portion of the payload on the vehicle utilized by the hosted user by using an option for each of at least one variable for the portion of the payload on the vehicle utilized by the hosted user 1920.

A host command generator then generates host commands for reconfiguring the portion of the payload on the vehicle utilized by the host user by using the configuration for the portion of the payload on the vehicle utilized by the host user 1925. And, a hosted command generator generates hosted commands for reconfiguring the portion of the payload on the vehicle utilized by the hosted user by using the configuration for the portion of the payload on the vehicle utilized by the hosted user 1930. Then, the host commands and the hosted commands are transmitted to the vehicle 1935. The portion of the payload on the vehicle utilized by the host user is then reconfigured by using the host commands 1940. Also, the portion of the payload on the vehicle utilized by the hosted user is reconfigured by using the hosted commands 1945. Then, the method ends 1950.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system for a virtual transponder utilizing inband commanding, the system comprising:
    a hosted payload (HoP) operation center (HOC) to transmit encrypted hosted commands to a hosted receiving antenna, wherein the encrypted hosted commands are encrypted utilizing a second communication security (COMSEC) variety;
    the hosted receiving antenna to transmit the encrypted hosted commands to a payload antenna on a vehicle;
    a host spacecraft operations center (SOC) to transmit encrypted host commands to the vehicle, wherein the encrypted host commands are encrypted utilizing a first COMSEC variety;
    a first communication security module to decrypt the encrypted host commands utilizing the first COMSEC variety to generate unencrypted host commands;
    a second communication security module to decrypt the encrypted hosted commands utilizing the second COMSEC variety to generate unencrypted hosted commands;
    a payload on the vehicle reconfigured according to at least one of the unencrypted host commands or the unencrypted hosted commands;
    the payload antenna to transmit payload data to at least one of a host receiving antenna or the hosted receiving antenna;
    the first communication security module to encrypt unencrypted host telemetry utilizing the first COMSEC variety to generate encrypted host telemetry;
    the second communication security module to encrypt unencrypted hosted telemetry utilizing the second COMSEC variety to generate encrypted hosted telemetry;

a host telemetry transmitter to transmit the encrypted host telemetry to the host SOC;

a hosted telemetry transmitter to transmit the encrypted hosted telemetry to the host SOC; and the host SOC to transmit the encrypted hosted telemetry to the HOC.

2. The system of claim 1, wherein the payload is reconfigured according to at least one of the unencrypted host commands or the unencrypted hosted commands by adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

3. The system of claim 1, wherein the payload is reconfigured according to at least one of the unencrypted host commands or the unencrypted hosted commands by reconfiguring at least one of: at least one antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

4. The system of claim 1, wherein the vehicle is an airborne vehicle.

5. The system of claim 4, wherein the airborne vehicle is one of a satellite, aircraft, unmanned aerial vehicle (UAV), or space plane.

6. A system for a virtual transponder utilizing inband commanding, the system comprising:

a hosted payload (HoP) operation center (HOC) to transmit encrypted hosted commands to a hosted receiving antenna, wherein the encrypted hosted commands are encrypted utilizing a second communication security (COMSEC) variety;

the hosted receiving antenna to transmit the encrypted hosted commands to a payload antenna on a vehicle;

a host spacecraft operations center (SOC) to transmit encrypted host commands to a host receiving antenna, wherein the encrypted host commands are encrypted utilizing a first COMSEC variety;

the host receiving antenna to transmit the encrypted host commands to a payload antenna on the vehicle;

a first communication security module to decrypt the encrypted host commands utilizing the first COMSEC variety to generate unencrypted host commands;

a second communication security module to decrypt the encrypted hosted commands utilizing the second COMSEC variety to generate unencrypted hosted commands;

a payload on the vehicle reconfigured according to at least one of the unencrypted host commands or the unencrypted hosted commands;

the payload antenna to transmit payload data to at least one of the host receiving antenna or the hosted receiving antenna;

the first communication security module to encrypt unencrypted host telemetry utilizing the first COMSEC variety to generate encrypted host telemetry;

the second communication security module to encrypt unencrypted hosted telemetry utilizing the second COMSEC variety to generate encrypted hosted telemetry;

a host telemetry transmitter to transmit the encrypted host telemetry to the host SOC;

a hosted telemetry transmitter to transmit the encrypted hosted telemetry to the host SOC; and the host SOC to transmit the encrypted hosted telemetry to the HOC.

7. The system of claim 6, wherein the payload is reconfigured according to at least one of the unencrypted host commands or the unencrypted hosted commands by adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

8. The system of claim 6, wherein the payload is reconfigured according to at least one of the unencrypted host commands or the unencrypted hosted commands by reconfiguring at least one of: at least one antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

9. The system of claim 6, wherein the vehicle is an airborne vehicle.

10. The system of claim 9, wherein the airborne vehicle is one of a satellite, aircraft, unmanned aerial vehicle (UAV), or space plane.

11. A system for a virtual transponder utilizing inband commanding, the system comprising:

a hosted payload (HoP) operation center (HOC) to transmit encrypted hosted commands to a hosted receiving antenna, wherein the encrypted hosted commands are encrypted utilizing a second communication security (COMSEC) variety;

the hosted receiving antenna to transmit the encrypted hosted commands to a payload antenna on a vehicle;

a host spacecraft operations center (SOC) to transmit encrypted host commands to a host receiving antenna, wherein the encrypted host commands are encrypted utilizing a first COMSEC variety;

the host receiving antenna to transmit the encrypted host commands to the payload antenna on the vehicle;

a first communication security module to decrypt the encrypted host commands utilizing the first COMSEC variety to generate unencrypted host commands;

a second communication security module to decrypt the encrypted hosted commands utilizing the second COMSEC variety to generate unencrypted hosted commands;

a payload on the vehicle reconfigured according to at least one of the unencrypted host commands or the unencrypted hosted commands;

transmitting, by the payload antenna, payload data to at least one of the host receiving antenna or the hosted receiving antenna;

the first communication security module to encrypt unencrypted telemetry utilizing the first COMSEC variety to generate encrypted telemetry;

a telemetry transmitter to transmit the encrypted telemetry to the host SOC; and the host SOC to transmit the encrypted telemetry to the HOC.

12. The system of claim 11, wherein the payload is reconfigured according to at least one of the unencrypted host commands or the unencrypted hosted commands by adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

13. The system of claim 11, wherein the payload is reconfigured according to at least one of the unencrypted host commands or the unencrypted hosted commands by reconfiguring at least one of: at least one antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

14. The system of claim 11, wherein the vehicle is an airborne vehicle.

15. The system of claim 14, wherein the airborne vehicle is one of a satellite, aircraft, unmanned aerial vehicle (UAV), or space plane.

16. A system for a virtual transponder utilizing inband commanding, the system comprising:
- a hosted payload (HoP) operation center (HOC) to transmit encrypted hosted commands to a hosted receiving antenna, wherein the encrypted hosted commands are encrypted utilizing a second communication security (COMSEC) variety;
- the hosted receiving antenna to transmit the encrypted hosted commands to a payload antenna on a vehicle;
- a host spacecraft operations center (SOC) to transmit encrypted host commands to a host receiving antenna, wherein the encrypted host commands are encrypted utilizing a first COMSEC variety;
- the host receiving antenna to transmit the encrypted host commands to the payload antenna;
- a first communication security module to decrypt the encrypted host commands utilizing the first COMSEC variety to generate unencrypted host commands;
- a second communication security module to decrypt the encrypted hosted commands utilizing the second COMSEC variety to generate unencrypted hosted commands;
- a payload on the vehicle reconfigured according to at least one of the unencrypted host commands or the unencrypted hosted commands;
- the payload antenna to transmit payload data to at least one of the host receiving antenna or the hosted receiving antenna;
- the first communication security module to encrypt unencrypted host telemetry utilizing the first COMSEC variety to generate encrypted host telemetry;
- the second communication security module to encrypt unencrypted hosted telemetry utilizing the second COMSEC variety to generate encrypted hosted telemetry;
- the payload antenna to transmit the encrypted host telemetry to the host receiving antenna;
- the host receiving antenna to transmit the encrypted host telemetry to the host SOC;
- the payload antenna to transmit the encrypted hosted telemetry to the hosted receiving antenna; and
- the hosted receiving antenna to transmit the encrypted hosted telemetry to the HOC.

17. The system of claim 16, wherein the payload is reconfigured according to at least one of the unencrypted host commands or the unencrypted hosted commands by adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

18. The system of claim 16, wherein the payload is reconfigured according to at least one of the unencrypted host commands or the unencrypted hosted commands by reconfiguring at least one of: at least one antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

19. The system of claim 16, wherein the vehicle is an airborne vehicle.

20. A system for a virtual transponder utilizing inband commanding, the system comprising:
- a hosted payload (HoP) operation center (HOC) to transmit encrypted hosted commands to a hosted receiving antenna, wherein the encrypted hosted commands are encrypted utilizing a second communication security (COMSEC) variety;
- the hosted receiving antenna to transmit the encrypted hosted commands to a payload antenna on a vehicle;
- a host spacecraft operations center (SOC) to transmit encrypted host commands to a host receiving antenna, wherein the encrypted host commands are encrypted utilizing a first COMSEC variety;
- the host receiving antenna to transmit the encrypted host commands to the payload antenna;
- a first communication security module to decrypt the encrypted host commands utilizing the first COMSEC variety to generate unencrypted host commands;
- a second communication security module to decrypt the encrypted hosted commands utilizing the second COMSEC variety to generate unencrypted hosted commands;
- a payload on the vehicle reconfigured according to at least one of the unencrypted host commands or the unencrypted hosted commands;
- the payload antenna to transmit payload data to at least one of the host receiving antenna or the hosted receiving antenna;
- the first communication security module to encrypt unencrypted host telemetry utilizing the first COMSEC variety to generate encrypted telemetry;
- the payload antenna to transmit the encrypted telemetry to the host receiving antenna;
- the host receiving antenna to transmit the encrypted telemetry to the host SOC;
- the payload antenna to transmit the encrypted telemetry to the hosted receiving antenna; and
- the hosted receiving antenna to transmit the encrypted telemetry to the HOC.

* * * * *